(12) United States Patent
Becken et al.

(10) Patent No.: US 9,022,560 B2
(45) Date of Patent: May 5, 2015

(54) METHOD FOR DETERMINING A BASE SYSTEM OF DIFFRACTION GRATINGS FOR COLOR FRINGE CORRECTION OF SPECTACLE LENSES

(75) Inventors: Wolfgang Becken, Munich (DE); Gregor Esser, Munich (DE); Helmut Altheimer, Baisweil-Lauchdorf (DE); Edda Wehner, Emmering (DE); Stephan Trumm, Munich (DE); Werner Mueller, Oetisheim (DE); Dietmar Uttenweiler, Icking (DE)

(73) Assignee: Rodenstock GmbH, Munich (DE)

( * ) Notice: Subject to any disclaimer, the term of this patent is extended or adjusted under 35 U.S.C. 154(b) by 57 days.

(21) Appl. No.: 13/988,239

(22) PCT Filed: Nov. 16, 2011

(86) PCT No.: PCT/EP2011/005779
§ 371 (c)(1),
(2), (4) Date: May 17, 2013

(87) PCT Pub. No.: WO2012/065735
PCT Pub. Date: May 24, 2012

(65) Prior Publication Data
US 2013/0235337 A1    Sep. 12, 2013

(30) Foreign Application Priority Data

Nov. 17, 2010 (DE) .......................... 10 2010 051 637

(51) Int. Cl.
*G02C 7/06* (2006.01)
*G02C 7/02* (2006.01)

(52) U.S. Cl.
CPC *G02C 7/022* (2013.01); *G02C 7/02* (2013.01);
*G02C 7/028* (2013.01); *G02C 7/068* (2013.01);
*G02C 2202/20* (2013.01); *G02C 2202/22* (2013.01); *G02C 7/024* (2013.01); *G02C 7/06* (2013.01); *G02C 7/061* (2013.01)

(58) Field of Classification Search
USPC ............. 351/159.01, 159.42, 159.44, 159.75, 351/159.76; 700/95
See application file for complete search history.

(56) References Cited

U.S. PATENT DOCUMENTS

| 5,016,977 | A | 5/1991 | Baude et al. |
| 6,070,980 | A | 6/2000 | Obara et al. |

(Continued)

FOREIGN PATENT DOCUMENTS

| DE | 19701312 | 7/1998 |
| EP | 0382620 | 8/1990 |

(Continued)

OTHER PUBLICATIONS

International Search Report issued for PCT/EP2011/005779 date of mailing: Feb. 28, 2012.

*Primary Examiner* — Scott J Sugarman
*Assistant Examiner* — William R Alexander
(74) *Attorney, Agent, or Firm* — Schiff Hardin LLP

(57) ABSTRACT

A method for producing a series of base lenses, which cover a predetermined power range, wherein each base lens of the series has a base power different from the base powers of the other base lenses of the series, and has at least one diffractive base grating, the method comprising: specifying the base powers of each base lens of the series and calculating the base grating of each base lens of the series so as to minimize the color fringe of the respective base lens with the specified base power in a predetermined region of the spectacle lens.

34 Claims, 14 Drawing Sheets

(56) References Cited

U.S. PATENT DOCUMENTS

Figure 1:
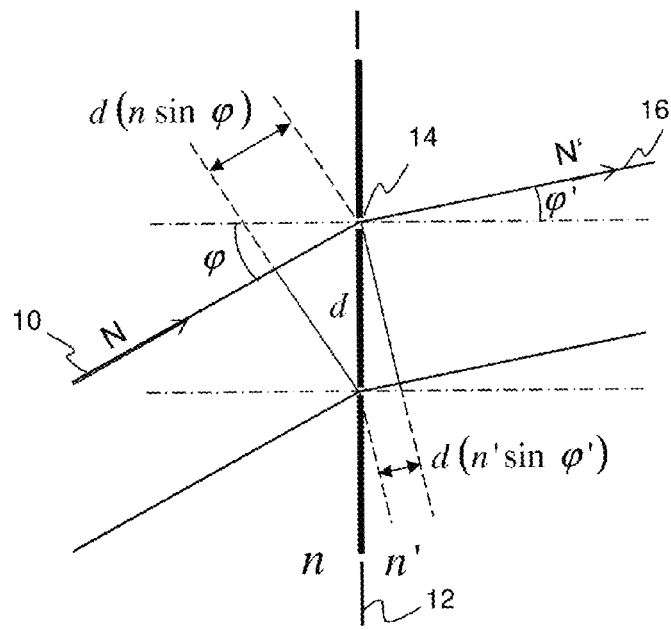

| | | |
|---|---|---|
| 6,089,713 A | 7/2000 | Hof et al. |
| 6,619,799 B1 | 9/2003 | Blum et al. |
| 2004/0080710 A1* | 4/2004 | Wooley et al. ............... 351/159 |
| 2012/0200823 A1* | 8/2012 | Bandhauer et al. ...... 351/159.44 |

FOREIGN PATENT DOCUMENTS

| | | |
|---|---|---|
| EP | 1424049 | 6/2004 |
| EP | 2108993 | 10/2009 |
| WO | WO 2005/098518 | 10/2005 |
| WO | WO 2009/005822 | 1/2009 |

\* cited by examiner

METHOD FOR DETERMINING A BASE SYSTEM OF DIFFRACTION GRATINGS FOR COLOR FRINGE CORRECTION OF SPECTACLE LENSES

A spectacle lens other than a piano lens always has a prismatic power in addition to the dioptric power, except in the optical center. If the lens is made of a uniform material, this prismatic power always involves a more or less strong color fringe, i.e. a lateral chromatic aberration, depending on the material and its Abbe number. It is all the more strong the greater the power of the lens is, the further the observation point is away from the optical center, and the smaller the Abbe number is. The color fringe particularly occurs in optical materials having a higher refractive index, which are often used to reduce the thickness of the spectacle lenses. Since this color fringe influences the image formation quality, one is interested in correcting it. A correction of the color fringe can be obtained with a diffraction grating.

It is an object of the invention to provide an efficient, cost-saving, and fast method for producing spectacle lenses with corrected color fringe, as well as to provide corresponding devices. Moreover, it is an object of the invention to provide a series of spectacle lenses, with as few grating designs as possible being sufficient to cover the entire power range.

This object is solved by a method for producing a series of base lenses with corrected color fringe including the features of claim 1, a device for producing a series of base lenses with corrected color fringe including the features of claim 11, a series of base lenses including the features of claim 12, a method for producing a spectacle lens including the features of claim 24, a series of spectacle lenses including the features of claim 26, a progressive spectacle lens including the features of claim 32, and an astigmatic spectacle lens including the features of claim 33. Preferred embodiments are subject of the dependent claims.

According to a first aspect of the invention, a method for producing a series of base lenses is suggested, which cover a predetermined power range. Each base lens of the series has a base power different from the base powers of the other base lenses of the series, and has at least one diffractive base grating. The method comprises the steps of:
specifying the base powers of each base lens of the series;
calculating the base grating of each base lens of the series so as to minimize the color fringe (and in particular the lateral chromatic aberration) of the respective base lens with the specified base power in a predetermined region of the spectacle lens.

The color fringe of optical elements (e.g. of spectacle lenses) is particularly caused by the lateral chromatic aberration and is based on the fact that the two combined refractive boundary surfaces of the optical element have a wavelength-dependent prismatic power $Pr_{ref}$. The color fringe width or the size of the color fringe caused by an optical element (e.g. spectacle lens) is indicated as an angle and depends on the prismatic deviation at the penetration point of light and on the Abbe number of the lens material. By means of a diffraction grating, which is applied to at least one of the refractive boundary surfaces of the optical element, it is possible to achieve a color fringe correction. As will be shown in the following, with a suitable design or dimension of the diffraction grating (in particular the period d of the diffraction grating), an almost full correction of the color fringe or lateral chromatic aberration of a spectacle lens can be achieved for a predetermined spherocylindrical power distribution, for a predetermined object distance, and for a predetermined wearing situation in the ideal case. Put differently, the color fringe of a spectacle lens can be compensated for by a grating that is calculated individually for the spectacle lens (in particular the predetermined spherocylindrical power), for the predetermined object distance, and for the predetermined wearing situation. In general, the grating lines of this grating are asymmetric, closed curves.

The invention is based on the surprising finding that even if there are deviations from the predetermined object distance, from the predetermined wearing situation, or from the predetermine spherocylindrical power distribution, or even in the case that the lens is not a single-vision lens but e.g. a progressive lens, one and the same grating can correct the lateral chromatic aberration in a still better way than as if no grating was present at all. In particular, it has surprisingly been shown that deviations in the object distance or in the wearing situation do not remarkably influence the capability of a grating to compensate for the lateral chromatic aberration. Moreover, it has been found that, in contrast, the deviations of the actual spherocylindrical power distribution from the predetermined power distribution for which the grating is designed have to be within certain limits in order to achieve an acceptable color fringe correction.

The invention suggests, by analogy with the blank concept for the production of conventional spectacle lenses, using a limited number of different diffraction gratings to cover a total predetermined power range. The base gratings can be prefabricated, wherein a suitable base grating is selected in the production of a spectacle lens.

With the proposed procedure, a system of a few diffraction gratings or of a few base lenses with gratings (e.g. about 5 to about 20) can be provided, so that its application to one of the boundary surfaces of a base lens compensates for the color fringe (lateral chromatic aberration) ideally for a predetermined dioptric base power, and to a still acceptable extent for neighboring powers. In addition, an arrangement of the grating as an internal structure, for example of a compound system, is possible as well. Thereby, the calculating and/or manufacturing effort for the production of lenses with corrected color fringe can be reduced significantly. Thus, it is possible to produce color fringe-corrected spectacle lenses with an arbitrary power within a relatively broad power range in an efficient, fast, and cost-saving manner. In particular, the spectacle lenses can be single-vision lenses or multifocal lenses, or progressive spectacle lenses. The power range can comprise from −12 dpt to +12 dpt of spherical power and/or up to 6 dpt of astigmatic power (cylinder) and/or an addition of up to 3.5 dpt. The power range may also be a different power range.

It is also possible to provide a series of spectacle lenses, with as few grating designs as possible being sufficient to cover the entire power range.

Within the scope of the present application, the term "diffraction grating" is understood to mean any phase and/or amplitude-modulating or -modifying optical element to which diffraction effects have relevance. In particular, a phase-modifying optical element (POE) is an element that is phase-delaying or phase-modulating such that the change of the optical path length, by adding the element, depends on the penetration point of the ray. The diffraction grating can be realized by a diffractive optical element (DOE) or any other type of phase and/or amplitude modulation(s).

The diffraction grating usually comprises a substantially regular, preferably periodic or quasi-periodic, line-like arrangement of structures or regions in which the light is influenced such that diffraction effects have relevance. The diffraction grating may be both a finely structured diffraction grating and a coarsely structured diffraction grating (such as an MOD=multi order diffraction grating). The diffraction grating may be a transmission grating, a mechanically separated grating, particularly a sawtooth grating or blazed grating, a holographic grating, a grating realized by a thin film or layer with a varying refractive index (gradient-index-material). The structures of the diffraction gratings used can be static or, in particular, electrically switchable. Methods for producing static or switchable diffraction gratings are known in the prior art.

Preferably, use is made of diffraction gratings in which the path difference between two neighboring grating lines typically corresponds to a diffraction order of $|m|=1$ to $|m|=4$. It is also possible to use an MOD grating in which the path difference is typically in the order of $|m|\approx 20$.

The diffraction grating can be used in the first diffraction order. However, it is possible to use the diffraction grating not in the first diffraction order, but in a higher order. The diffraction grating can have a boundary surface that is calculated against air. It is also possible to calculate a boundary surface of the diffraction grating not against air, but against a different material.

The profile of the diffraction grating can be suitably specified or dimensioned. The profile of the diffraction grating is preferably specified such that the diffraction efficiency for a specific diffraction order is at a maximum. Put differently, the profile of the diffraction grating can be specified such that the intensity of the diffracted light concentrates in one diffraction order, if possible. Preferably, the grating profile is sawtooth-shaped or blazed. In particular, a blazed boundary surface can be inserted between a dispersing base material and air. The lateral scale of the grating, i.e. the grating constant, can be in the order of magnitude of the wavelength. However, it is also possible to use diffraction gratings where the grating constant is not in the order of magnitude of the wavelength, but up to a factor of 100 above. The diffraction grating can be overlaid/combined with another grating, e.g. with a Fresnel grating, which has a dioptric power other than zero. As will be explained in the following, the period of the grating can be suitably determined.

The grating can extend substantially across the entire viewing angle region or across the entire angular region of the base lens. The grating can be arranged around a predetermined reference point, particularly around the prism reference point or around the centration or fitting point, or around the geometric center of the raw-round base lens in a centered manner. However, it is also possible to arrange the grating in a decentered manner.

The grating can be applied to one or both refractive boundary surfaces of the base lens. However, it is also possible to provide a compound system composed of a main lens and a cover lens, wherein the grating structures are applied to the protected inner sides of the main lens and/or of the cover lens (i.e. the mutually opposite sides of the main and cover lenses).

Within the scope of the present application, a base lens can be any optical element that has at least one diffraction grating. For example, a base lens can be a so-called "semi-finished spectacle lens" or a blank, wherein only one surface, preferably the surface carrying the grating, is finished, and wherein the opposite surface is processed at a later point depending on prescription data of a specific spectacles wearer. In particular, the opposite surface can be processed such that in at least one predetermined reference point of the spectacle lens (e.g. in a centration or fitting point, in a distance reference point and/or in a near reference point), a target power of the spectacle lens is achieved. The base lens can also be a so-called compound system, which has at least one main lens and one cover lens.

The power of an optical element is understood to be the total dioptric power of the optical element, which is formed by the refractive portion and the diffractive portion (as will be described in detail in the following) and which comprises the total spherical power and/or the astigmatic power and optionally the prismatic power. A measure for the mean spherical portion of the spherocylindrical power of a spectacle lens is the spherical equivalent. Moreover, the spherocylindrical power—as will be described in detail in the following—can be described by means of power vectors.

The refractive power is understood to be the power of an optical element which comes about by surface curvatures. In a rotationally symmetric spectacle lens, the refractive power of the spectacle lens comprises the spherical power of the spectacle lens in a predetermined reference point, e.g. in the vertex. In an astigmatic spectacle lens, the astigmatic refractive power of the spectacle lens is added to the refractive spherical power. The total refractive dioptric power of the spectacle lens can be the refractive spherocylindrical power of the spectacle lens in this case.

Preferably, the base lenses are spherocylindrical or spherical single-vision lenses. Preferably, the diffraction grating is applied to one of the two refractive boundary surfaces (front or back surface) of the base lens. The opposite surface can serve for adaptation to a prescription power, i.e. represent a prescription surface.

Calculating the base grating of each individual spectacle lens can comprise optimizing the grating and/or at least one of the refractive surfaces of the base lens. Preferably, calculating the base grating comprises simultaneously optimizing at least one of the refractive surfaces of the base lens and the base grating. Preferably, the at least one refractive surface is the surface of the base lens which carries the grating. The optimization is preferably performed in a predetermined wearing position of the base lens. The wearing position can particularly be characterized by the face form angle, the forward inclination or pantoscopic angle, the corneal vertex distance, the pupillary distance, and optionally further parameters. The parameters of the wearing position can be average parameters. In addition, preferably, a predetermined object distance, preferably as a function of the viewing direction, is taken into consideration.

Preferably, the optimization is performed such that at least second-order aberrations are minimized. The optimization can comprise a minimization of a polychromatic target function in which the color fringe is taken into account directly as a target variable or indirectly due to a wavelength dependency of the variables taken into account in the target function. The second or higher-order aberrations are preferably determined by means of wavefront tracing taking the base grating and the wearing position of the spectacle lens into account.

The polychromatic target function can be a target function of the type:

$$F_1 = \sum_\lambda F_{monochrom}(\lambda), \qquad \text{Type 1)}$$

$$F_2 = F_{monochrom}(\lambda_0) + \sum_i g_{FLF}(i) \times f(S_{SK}(i, \lambda_2) - S_{Sk}(i, \lambda_1))^2, \qquad \text{Type 2)}$$

$$F_3 = F_{monochrom}(\lambda_0) + \sum_i g_{FQF}(i) \times g(\Delta\varphi_{SK}(i, \lambda_2, \lambda_1))^2, \qquad \text{Type 3)}$$

In the above formula:
$F_{monochrom}(\lambda)$ is a monochromatic target function for the wavelength $\lambda$;

$g_{FLF}(i)$ is the weighting of the longitudinal chromatic aberration at the $i^{th}$ evaluation point of the optical element;

$S_{SK}(i,\lambda_1)$ is the vergence matrix of the wavefront at the vertex sphere for the wavelength $\lambda_1$ and for the $i^{th}$ evaluation point;

$S_{SK}(i,\lambda_2)$ is the vergence matrix of the wavefront at the vertex sphere for the wavelength $\lambda_2$ and for the $i^{th}$ evaluation point; and $f(S_{SK}(i,\lambda_2)-S_{SK}(i,\lambda_1))$ is the function of the difference of the vergence matrices of the wavefront at the vertex sphere for two different wavelengths $\lambda_1$ and $\lambda_2$;

$\Delta\phi_{SK}(i,\lambda_2,\lambda_1)$ is the angle between the object-side main rays for different wavelengths $\lambda_1$ and $\lambda_2$ and $g(\Delta\phi_{SK}(i,\lambda_2,\lambda_1))$ is a function of the angle between the object-side main rays for different wavelengths $\lambda_1$ and $\lambda_2$.

A target function of the first type is in particular achieved since an arbitrary monochromatic target function is understood to be a function of the wavelength and is evaluated for at least two different wavelengths and summed over the set of at least two different wavelengths. As explained above, the chromatic aberrations of the optical element are indirectly taken into account due to the wavelength dependency of the variables taken into account in the target function. The monochromatic target function may be a monochromatic target function known from the prior art.

A target function of the second type is in particular achieved since an arbitrary monochromatic target function is evaluated at a predetermined wavelength $\lambda_0$ (operating wavelength) and since another term is added to this function, which depends on the difference $(S_{SK}(i,\lambda_2)-S_{SK}(i,\lambda_1))$ of the vergence matrices for at least two different wavelengths $\lambda_1$ and $\lambda_2$. The type of dependence can be selected differently. In particular, the function $f$ can be the dioptric distance between the vergence matrices or the difference of the spherical equivalents. In the latter case, the function $f$ represents a penalty term for the longitudinal chromatic aberration. The function $f$ can be an arbitrary function for which $f(0)=0$ is satisfied. Preferably, $f$ is to be selected such that $f(S_{SK}(i,\lambda_2)-S_{SK}(i,\lambda_1))$ is the greater the greater the distance between $S_{SK}(i,\lambda_2)$ and $S_{SK}(i,\lambda_1)$ is. In a further preferred embodiment, $f(S_{SK}(i,\lambda_2)-S_{SK}(i,\lambda_1))$ is the greater the greater the distance between the spherical equivalents of $S_{SK}(i,\lambda_2)$ and $S_{SK}(i,\lambda_1)$ is.

A target function of the third type is in particular achieved since an arbitrary monochromatic target function is evaluated at a predetermined wavelength $\lambda_0$ (operating wavelength) and since another term is added to this function, which depends on the lateral chromatic aberration. Thus, the function $g(\Delta\phi_{SK}(i,\lambda_2,\lambda_1))$ represents a penalty term for the lateral chromatic aberration, which is determined by the angle $\Delta\phi_{SK}(i,\lambda_2,\lambda_1)$ between the object-side main rays for different wavelengths $\lambda_1$ and $\lambda_2$. The function g can be the identity, a trigonometric function, or any other suitable function.

$$F_1 = \sum_{i,\lambda} g_Z(i,\lambda)(Z_\Delta(i,\lambda) - Z_{\Delta,target}(i,\lambda))^2 + \qquad (1a)$$
$$g_S(i,\lambda)(S_\Delta(i,\lambda) - S_{\Delta,target}(i,\lambda))^2$$

$$F_2 = \sum_i (g_Z(i)(Z_\Delta(i,\lambda_0) - Z_{\Delta,target}(i,\lambda_0))^2 + \qquad (2a)$$
$$g_S(i)(S_\Delta(i,\lambda_0) - S_{\Delta,target}(i,\lambda_0))^2 +$$
$$g_{FLF}(i) \times f(S_{SK}(i,\lambda_2) - S_{Sk}(i,\lambda_1))^2)$$

$$F_3 = \sum_i (g_Z(i)(Z_\Delta(i,\lambda_0) - Z_{\Delta,target}(i,\lambda_0))^2 + g_S(i) \qquad (3a)$$
$$(S_\Delta(i,\lambda_0) - S_{\Delta,target}(i,\lambda_0))^2 + g_{FQF}(i) \times g(\Delta\varphi_{SK}(i,\lambda_2,\lambda_1))^2)$$

In the above formula:

$Z_\Delta(i,\lambda)$ is the actual value of the amount of the astigmatic error at the $i^{th}$ evaluation point of the optical element for the wavelength $\lambda$;

$Z_{\Delta,target}(i,\lambda)$ is the target value of the amount of the astigmatic error at the $i^{th}$ evaluation point of the optical element for the wavelength $\lambda$;

$S_\Delta(i,\lambda)$ is the actual value of the refractive error at the $i^{th}$ evaluation point of the optical element for the wavelength $\lambda$;

$S_{\Delta,target}(i,\lambda)$ is the target value of the refractive error at the $i^{th}$ evaluation point of the optical element for the wavelength $\lambda$;

$g_Z(i,\lambda)$ is the weighting of the amount of the astigmatic deviation at the $i^{th}$ evaluation point of the optical element for the wavelength $\lambda$;

$g_S(i,\lambda)$ is the weighting of the refractive error at the $i^{th}$ evaluation point of the optical element for the wavelength $\lambda$.

However, it is also possible to use a different suitable polychromatic target function, e.g. a target function which is a combination of the above-described target functions. In particular, the target function can include terms that depend both on the longitudinal chromatic aberration and on the lateral chromatic aberration. By the simultaneous optimization of at least one of the refractive surfaces of the base lens and the base grating, an optimum correction of the color fringe of the spectacle lens, preferably for all viewing directions, can be achieved.

However, it is possible to determine the grating only depending on the refractive power of the base lens.

In general, the grating lines of the base grating, which are adapted to minimize the color fringe of the respective base lens with the specified base power in a predetermined region of the spectacle lens, are asymmetric, closed curves. Preferably, the grating lines of the base grating are (substantially) perpendicular, or vertical, to the local cylinder axis (base setting) of the prism of the respective base lens.

Preferably, however, base gratings with elliptical grating lines are used. As will be explained in detail in the following, by using gratings with elliptical grating lines, one can obtain an optimum color fringe correction with a minimum number of base gratings also for the case that the predetermined power range also comprises cylindrical powers (i.e. for the production of spherocylindrical spectacle lenses).

Alternatively, the grating lines of the respective base grating can be rotationally symmetric. Surprisingly, it has been shown that by using base gratings with rotationally symmetric (e.g. circular) grating lines, a good color fringe correction can also be obtained for non-rotationally symmetric spectacle lens.

Preferably, the distance $d(r)$ of the grating lines of a base grating with rotationally symmetric grating lines is variable. Preferably, the distance $d(r)$ is a function of the radial distance from the optical or geometric center r:

$$d(r) = \frac{A}{r}$$

where the parameter A depends on the refractive power of the base lens and on the Abbe number of the base lens.

With non-prismatic spectacle lenses, the optical center of the spectacle lens usually coincides with the prism reference point. With prismatic spectacle lenses, the optical center is usually in a point the position of which can generally be determined numerically and which does not have to coincide with any special or mentioned reference point in the spectacle lens. Approximately, the position of the optical center is determined by solving the equation for the total prism, which results according to Prentice's rule for $Pr:=Pr_0-S'_\infty r=0$ (where $Pr_0$ is the prescription prism and $S'_\infty$ is the vertex power matrix), with respect to r to $r=(S'_\infty)^{-1}Pr_0$.

Preferably, the distance of the grating lines of each of the base gratings is calculated as a function of the radial distance d(r) from the optical or geometric center according to the formula $$d(r) = \frac{m(\lambda_F - \lambda_C)v_d}{S_{ref,0}(\lambda_d)} \cdot \frac{1}{r}$$

where
$S_{ref,0}(\lambda_d)$ is the refractive portion of the dioptric power of the base lens at a predetermined wavelength $\lambda_d$ (design wavelength);
$v_d$ is the Abbe number of the base lenses;
$\lambda_F$ is the F-Fraunhofer line, which is taken into account in the definition of the Abbe number;
$\lambda_C$ is the C-Fraunhofer line, which is taken into account in the definition of the Abbe number; and
m is a predetermined diffraction order.

Preferably, the power range comprises astigmatic (cylindrical) powers with a maximum cylinder $cyl_{max}$. The base powers are preferably specified such that the condition $$|\Delta M_{0G}| \leq 2v_d \frac{FS_T}{r_T} - cyl_{max}$$

applies to the maximum distance $|\Delta M_{0G}|$ of the spherical equivalents of the base lenses of the series, where
$v_d$ is the Abbe number of the base lenses;
$FS_T$ is a predetermined threshold;
$2 \cdot r_T$ is the diameter of a predetermined region of the respective base lens in which the maximally admissible color fringe is smaller than or equal to the threshold $FS_T$; and
$cyl_{max}$ is the maximally existing astigmatism in the power range to be covered.

However, it is possible to specify the base powers only on the basis of the spherical power to be covered. Preferably, specifying the base powers is performed such that the condition $$|\Delta M_{0G}| \leq 2v_d \frac{FS_T}{r_T}$$

is satisfied for the maximum distance $|\Delta M_{0G}|$ of the spherical equivalents of the base lenses of the series, where
$v_d$ is the Abbe number of the base lenses;
$FS_T$ is a predetermined threshold;
$2 \cdot r_T$ is the diameter of a predetermined region of the respective base lens in which the maximally admissible color fringe is smaller than or equal to the threshold $FS_T$.

The threshold $FS_T$ represents a perception threshold below which the color fringe is either not perceived or not considered to be disturbing.

Each of the base lenses of the series can be assigned one correction range, wherein the base grating of the base lens in the respective correction range corrects the color fringe of a spectacle lens with a power within this correction range such that the color fringe of the spectacle lens within a predetermined region of the spectacle lens is smaller than or equal to a predetermined threshold. The predetermined threshold preferably corresponds to a perception threshold for the color fringe. The base powers can be specified such that the correction ranges of the individual base lenses cover the predetermined power range.

The correction ranges, i.e. the individual power ranges, which are assigned to the individual base lenses, are preferably centered around the respective base power. Particularly preferably, the base gratings are selected such that by overlapping the correction ranges of the individual base lenses the desired power range with regard to the spherical power or the spherical equivalent is covered. Put differently, the correction ranges assigned to the individual base lenses of the series are preferably adjacent, so that within the entire power range to be covered a reduction of the color fringe within the predetermined region of the spectacle lens below the predetermined threshold can be achieved with a limited number of base gratings.

In particular for spherocylindrical or progressive spectacle lenses, it is possible for the individual correction ranges of the base lenses to not overlap or be adjacent. Here, it is accepted that for specific power, e.g. with high cylinders, which statistically are very rare, a sub-optimum correction of the color fringe is achieved. However, this disadvantage is substantially compensated for by the advantages in the manufacture of the base lenses.

The region within which the maximum color fringe is smaller than or equal to the predetermined threshold is preferably a circular or elliptical region around the geometric center, around the optical center, around the vertex of the spectacle lens, or around another suitable reference point. For example, the optical center coincides with the prism reference point or with the centration or fitting point of the spectacle lens.

Preferably, the predetermined region of the spectacle lens within which the maximum color fringe is smaller than or equal to the predetermined threshold has a diameter of at least 40 mm. Preferably, the predetermined threshold is 0.5 cm/m, preferably 0.4 cm/m, and particularly preferably 0.12 cm/m.

Preferably, the power range to be covered comprises spherical powers of −12 dpt to +12 dpt and/or cylindrical powers of up to 4 dpt, preferably up to 6 dpt.

Further, the method can comprise applying the thus calculated base grating to at least one of the refractive surfaces (front, back or another boundary surface) of the base lens. For example, the base lens can be a conventional blank or semi-finished product. It is also possible that the base lens is a compound system comprising at least one main lens and one cover lens. Methods for applying a diffraction grating to a surface and producing a diffraction grating are known from the prior art.

A further aspect of the invention relates to a device for producing a series of base lenses that cover a predetermined power range, wherein each base lens of the series has a base power different from the base powers of the other base lenses of the series, and has at least one diffractive base grating, wherein the device is adapted to perform a preferred method for producing a series of base lenses. In particular, the device for producing a series of base lenses comprises base grating calculating means adapted to calculate the base grating of each of the spectacle lenses of the series, wherein calculating comprises specifying the base powers of each base lens of the series and is performed so as to minimize the color fringe of the respective base lens with the specified base power in a predetermined region of the spectacle lens.

According to a third aspect of the invention, a series of base lenses comprising at least two base lenses is proposed, wherein
each base lens of the series has a base power different from the base powers of the other base lenses of the series, and has at least one diffractive base grating adapted such that the maximum color fringe within a predetermined region of the base lens with a diameter of at least 40 mm is equal to or smaller than a predetermined threshold of 0.5 cm/m.

The diffraction grating can be a diffraction grating as described above. In particular, the diffraction grating can be applied to the front surface or to the back surface of the base lens. It is also possible to apply diffraction gratings both to the front surface and to the back surface of the spectacle lens. In addition, it is possible to apply the diffraction grating to another boundary surface of the base lens, e.g. to at least one boundary surface in the interior of the compound system.

The diffraction grating of each base lens can be adapted for the power of the base lens such that an optimum correction of the color fringe of the base lens is achieved. In the case of a deviation of the power of the spectacle lens within the power range assigned to the semi-finished spectacle lens, the color fringe will nevertheless be within the predetermined limits. Put differently, the color fringe is within the predetermined region of the spectacle lens below the predetermined threshold. As explained above, the region within which the maximum color fringe is smaller than or equal to the predetermined threshold is preferably a circular or elliptical region around the geometric center, around the optical center, around the vertex of the spectacle lens, or around another suitable reference point.

Preferably, the maximum color fringe within the predetermined region of the spectacle lens is smaller than or equal to 0.4 cm/m, and particularly preferably smaller than or equal to 0.12 cm/m.

Preferably, each of the base lenses of the series is assigned one correction range such that for a spectacle lens with a power within this correction range and with the same grating as the base grating of the base lens assigned to this power range the color fringe within the predetermined region of the spectacle lens is below the predetermined threshold. The power distance of the base lenses of the series is preferably adapted such that the correction ranges of the individual base lenses cover a predetermined power range.

Preferably, the power range covered by the individual correction ranges comprises spherical powers of −12 dpt to +12 dpt and/or cylindrical powers of up to 4 dpt, preferably up to 6 dpt.

The number of base lenses is preferably between 5 and 20.

According to a preferred embodiment, the power range covered by the individual base lenses of the series comprises the spherical power range of −12 dpt to +12 dpt. If the maximum color fringe within a central region of the spectacle lens with a diameter of 40 mm is to be below 0.12 cm/m (i.e. below the perception threshold), for example, and the Abbe number of the spectacle lens is $v_d$=42,41, only 5 different base gratings and correspondingly 5 different base lenses will be sufficient to cover the total power range, since the individual correction ranges are approximately 5 dpt (i.e. ±2.5 dpt around the respective spherical base power).

If, in addition to the spherical power, a cylindrical power with a maximum astigmatism of 4 dpt is to be covered as well, the correction ranges in this example can have a width of approximately 1 dpt (i.e. ±0.5 dpt around the respective base power). Consequently, the total power range with a strongest main portion between −12 dpt and +12 dpt according to this amount can be covered with 20 different base gratings and 20 different base lenses. If in the case of spherocylindrical lenses it is allowed that no full color correction takes place for specific power combinations, the number of different base gratings and correspondingly base lenses can be reduced to 5 for spherocylindrical lenses as well.

The base lenses can be single-vision lenses, multi-focal lenses or progressive lenses. Preferably, the base lenses are rotationally symmetric single-vision lenses, i.e. single-vision lenses with rotationally symmetric (e.g. spherical) surfaces.

As explained above, the diffraction grating can be applied to the front surface and/or to the back surface of each of the base lenses. The base lens can be a so-called compound system, which has at least one main lens and one cover lens. The diffraction grating can be applied to at least one boundary surface in the interior of the compound system.

The base grating can be a diffraction grating with elliptically extending grating lines. Alternatively, the base grating can be a grating with rotationally symmetrically extending grating lines. Preferably, the grating lines are (substantially) circular. Preferably, the distance d(r) of the grating lines of a base grating with rotationally symmetric grating lines is variable, in particular a function of the radial distance from the optical or geometric center r:

$$d(r) = \frac{A}{r}$$

where the parameter A depends on the refractive power of the base lens and the Abbe number of the base lenses.

Preferably, it holds for the distance of the grating lines d(r) from the optical center of the respective base lens that:

$$d(r) = \frac{m(\lambda_F - \lambda_C)v_d}{S_{ref,0}(\lambda_d)} \cdot \frac{1}{r},$$

where
$S_{ref,0}(\lambda_d)$ is the refractive portion of the dioptric power of the base lens at a wavelength $\lambda$;
$v_d$ is the Abbe number of the base lenses;
$\lambda_F$ is the F-Fraunhofer line, which is taken into account in the definition of the Abbe number;
$\lambda_C$ is the C-Fraunhofer line, which is taken into account in the definition of the Abbe number; and
m, m=±1, ±2, . . . is the diffraction order.

All base lenses are of the same material and have the same Abbe number. The diffraction order for which a correction is to be performed is predetermined. For example m=−1.

Moreover, the base grating can be a grating with grating lines (substantially) perpendicular, or vertical, to the local cylinder axis (base setting) of the prism of the respective base lens.

Preferably, the maximally existing distance $|\Delta M_{0G}|$ of the spherical equivalents of the base lenses of the series satisfies the condition $$|\Delta M_{0G}| \leq 2v_d \frac{FS_T}{r_T} - cyl_{max}$$

or $$|\Delta M_{0G}| \leq 2v_d \frac{FS_T}{r_T},$$

where
$v_d$ is the Abbe number of the base lenses;
$FS_T$ is the predetermined threshold;

$2 \cdot r_T$ is the diameter of the predetermined region;
$cyl_{max}$ is the maximally existing astigmatism.

The grating structures of the individual base gratings can be static. However, it is also possible to realize the grating structures of the individual base gratings by switchable structures. Put differently, the individual base gratings can be switchable, e.g. electrically switchable diffraction gratings. Switchable gratings and in particular electrically switchable gratings are known from the prior art.

An exemplary method for producing a spectacle lens can comprise the following steps:
- obtaining prescription data of the spectacle lens;
- determining the target power of the spectacle lens in at least one predetermined reference point of the spectacle lens depending on the obtained prescription data;
- selecting a diffraction grating from a set of base gratings comprising at least two different base gratings, wherein selecting is performed depending on the target power of the spectacle lens in the at least one reference point or depending on the obtained prescription data;
- finishing a spectacle lens with the selected grating such that the power of the finished spectacle lens in the at least one reference point is substantially (i.e. within the scope of the usual tolerances, in particular the usual production tolerances) equal to the target power in said reference point determined before, wherein
- the individual base gratings of the set are adapted for respectively different base powers such that the maximum color fringe of a spectacle lens with the respective base power within a predetermined region of the spectacle lens is below a predetermined threshold.

According to an aspect of the invention, the method for producing a spectacle lens comprises the steps of:
- obtaining prescription data of a spectacles wearer, wherein the prescription data comprises at least one spherical prescription power;
- determining the target power of the spectacle lens in at least one predetermined reference point of the spectacle lens depending on the obtained prescription data;
- selecting a base lens from a series of base lenses with the features according to a preferred example of the invention depending on the obtained prescription data or on the target power of the spectacle lens;
- machining the base lens such that the power of the finished spectacle lens in the at least one reference point is substantially equal to the target power in said reference point determined before.

In particular, by analogy with a conventional base curve system, partial power ranges are assigned to the individual base lenses, wherein the individual partial power ranges cover the predetermined power range. Depending on the obtained prescription data or on the target power of the spectacle lens, a base lens is selected, the partial power range of which corresponding to the obtained prescription data (in particular the spherical prescription power) or the target power of the spectacle lens in the at least one predetermined reference point.

In particular, the selection is made analogously to the selection of a semi-finished product or a blank from a conventional base curve system depending on the spherical and optionally the astigmatic prescription power or depending on the spherical target power and optionally the astigmatic target power the finished spectacle lens is to have in at least one predetermined reference point. The target power can be different from the prescription power.

Thus, the selection can be made on the basis of the target spherical equivalent in the at least one reference point of the spectacle lens or on the basis of the spherical equivalent of the prescription power. The at least one reference point can be a centration or fitting point, a distance reference point, a prism reference point, or a near reference point of the spectacle lens, for example.

The at least one diffractive base grating can be applied to or arranged on a first surface of the base lens. The second surface of the spectacle lens can be determined or calculated depending on the obtained prescription data in a per se known manner. Hence, machining the base lens comprises machining the thus determined second, opposite surface of the base lens. Machining can be performed like in the case of a conventional spectacle lens, e.g. by means of NC machines.

The second surface of the spectacle lens can be determined or calculated by means of an optimization method. Accordingly, the method can further comprise optimizing the second surface of the spectacle lens, wherein the optimization is performed so as to minimize at least second-order aberrations in the wearing position of the spectacle lens. The optimization can be performed in the wearing position of the spectacle lens, wherein the second-order aberrations are determined by means of wavefront tracing taking the base grating and the wearing position of the spectacle lens into consideration. Preferably, optimization is performed by minimizing a monochromatic target function or a polychromatic target function, in which the color fringe is directly or indirectly taken into account by considering a wavelength dependency. It has been shown that it is possible to reduce the second-order or optionally higher-order aberrations by a follow-up optimization of one of the refractive surfaces without affecting the color fringe correction significantly.

According to the above method, a series of (color fringe-corrected) spectacle lenses with different powers can be produced, which cover a total power range, wherein the maximum color fringe of each of the spectacle lenses of the series within a predetermined region with a predetermined range is smaller than or equal to a predetermined threshold of 0.5 cm/m, preferably smaller than or equal to 0.4 cm/m, and particularly preferably smaller than or equal to 0.12 cm/m.

The power range can comprise spherical powers of −12 dpt to +12 dpt and/or cylindrical powers of up to 4 dpt, preferably up to 6 dpt. The predetermined region can be a region with a diameter of at least 40 mm, for example.

According to a further aspect of the invention, a device for producing a spectacle lens is proposed, which is adapted to perform the method for producing a spectacle lens. The device can in particular comprise:
- obtaining means for obtaining prescription data of a spectacles wearer, wherein the prescription data comprises at least one spherical prescription power;
- target power calculating means for determining the target power of the spectacle lens in at least one predetermined reference point of the spectacle lens depending on the obtained prescription data;
- selecting means for selecting a base lens from a series of base lenses according to a preferred example of the invention depending on the obtained prescription data or on the target power of the spectacle lens;
- machining means for machining the base lens such that the power of the finished spectacle lens in the at least one reference point is substantially equal to the target power in said reference point determined before.

According to another aspect of the invention, a series of spectacle lenses with different powers, which cover a power range of at least −12 dpt to +12 dpt of the spherical power, is proposed. However, the series is not limited to the power range of −12 dpt to +12 dpt, but can cover a smaller or a larger power range. Each spectacle lens of the series has at least one diffraction grating. The number of the different gratings of all spectacle lenses of the series is smaller than the number of spectacle lenses. The maximum color fringe of each of the spectacle lenses of the series within a predetermined region with a diameter of at least 40 mm is equal to or smaller than a predetermined threshold of 0.5 cm/m. Preferably, the maximum color fringe within the predetermined region of the spectacle lens is smaller than or equal to 0.4 cm/m, and particularly preferably smaller than or equal to 0.12 cm/m.

The power distance between two neighboring powers or the gradation of the powers of the spectacle lenses of the series can be 0.5 dpt, preferably 0.25 dpt, for example. The distance can as well be smaller than 0.25 dpt, e.g. 0.125 dpt.

Further, the predetermined power range can comprise cylindrical powers of up to 4 dpt, preferably of up to 6 dpt. The distance between two neighboring spherocylindrical powers can be 0.5 dpt, for example. Preferably, the distance between two neighboring spherocylindrical powers is 0.25 dpt. The distance can as well be smaller than 0.25 dpt, e.g. 0.125 dpt.

Preferably, the number of different gratings in the series is between 5 and 20.

The spectacle lenses can be single-vision lenses, multifocal lenses, or progressive spectacle lenses.

The at least one diffraction grating of each spectacle lens of the series can be applied to the front surface and/or to the back surface and/or another boundary surface of the spectacle lens. As described above, the boundary surface can be a boundary surface in the interior of a compound system comprising a main lens and a cover lens.

The limited number of different gratings, which the spectacle lenses of the series have, are calculated or optimized for a limited number of spectacle lenses (base lenses) with predetermined, different base powers. Preferably, the individual gratings are calculated or optimized such as to minimize the color fringe of the respective spectacle lens with the predetermined base power. In general, the grating lines of the individual gratings are aspherical curves.

Preferably, the grating lines of the individual gratings extend elliptically. Alternatively, the grating lines can extend rotationally symmetrically, e.g. (substantially) circularly. Preferably, the distance d(r) of the grating lines of a base grating with rotationally symmetric grating lines is variable, in particular a function of the radial distance from the optical or geometric center r:

$$d(r) = \frac{A}{r}$$

where the parameter A depends on the refractive power of the corresponding base lens and on the Abbe number of the base lens.

For the grating distance as a function of the radial distance d(r) from the optical center of the spectacle lens it preferably holds that:

$$d(r) = \frac{m(\lambda_F - \lambda_C)v_d}{S_{ref,0}(\lambda_d)} \cdot \frac{1}{r},$$

where
$S_{ref,0}(\lambda_d)$ is the refractive portion of the dioptric power of the corresponding base lens at a predetermined wavelength $\lambda_d$;

$v_d$ is the Abbe number of the base lenses;
$\lambda_F$ is the F-Fraunhofer line, which is taken into account in the definition of the Abbe number;
$\lambda_C$ is the C-Fraunhofer line, which is taken into account in the definition of the Abbe number; and
m, m=±1, ±2, . . . is the diffraction order.

The grating structures of the individual gratings can be static. Alternatively, the grating structures of the individual gratings can be realized by, in particular, electrically switchable structures.

A further aspect of the invention relates to a progressive spectacle lens with at least one rotationally symmetric or elliptical diffraction grating, wherein the maximum color fringe of the progressive spectacle lens within a (substantially) circular region of the progressive spectacle lens with a diameter of d≤40 mm is smaller than or equal to 0.5 cm/m, preferably smaller than or equal to 0.4 cm/m, and particularly preferably smaller than or equal to 0.12 cm/m.

Moreover, a further aspect of the invention relates to an astigmatic spectacle lens with at least one rotationally symmetric or elliptical grating, wherein the maximum color fringe of the progressive spectacle lens within a (substantially) circular region of the progressive spectacle lens with a diameter of d≤40 mm is smaller than or equal to 0.5 cm/m, preferably smaller than or equal to 0.4 cm/m, and particularly preferably smaller than or equal to 0.12 cm/m.

Preferably, the grating is rotationally symmetric in both cases, wherein the distance between the grating lines is variable. Preferably, the variable distance of the grating lines is a function of the radial distance from the optical or geometric center r:

$$d(r) = \frac{A}{r}$$

where the parameter A depends on the refractive power of the base lens and on the Abbe number of the base lens.

Preferably, it holds for the distance of the grating lines d(r) from the optical center that:

$$d(r) = \frac{m(\lambda_F - \lambda_C)v_d}{S_{ref,0}(\lambda_d)} \cdot \frac{1}{r},$$

where
$S_{ref,0}(\lambda_d)$ is the refractive portion of the dioptric power of a predetermined base lens with a predetermined base power at a predetermined wavelength $\lambda_d$;
$v_d$ is the Abbe number of the base lens;
$\lambda_F$ is the F-Fraunhofer line, which is taken into account in the definition of the Abbe number;
$\lambda_C$ is the C-Fraunhofer line, which is taken into account in the definition of the Abbe number; and
m, m=±1, ±2, . . . is the diffraction order.

Figure 2:
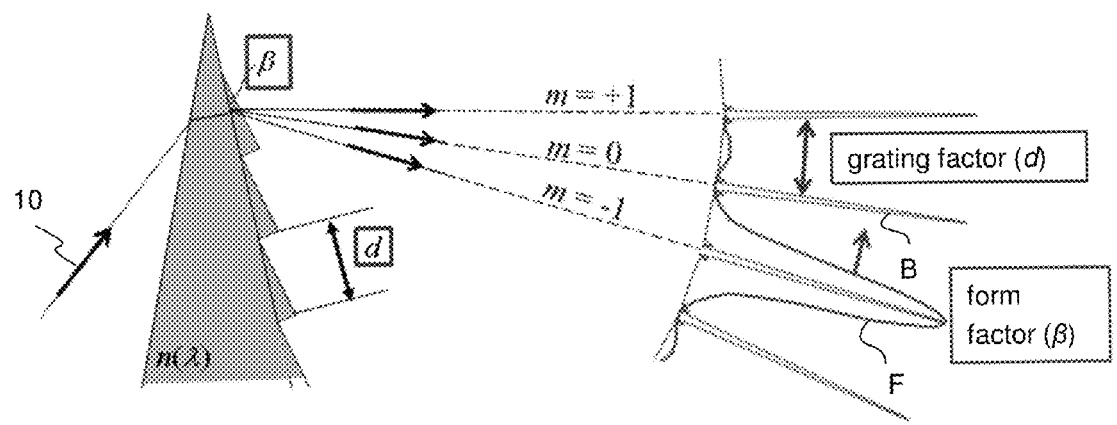
Figure 4:
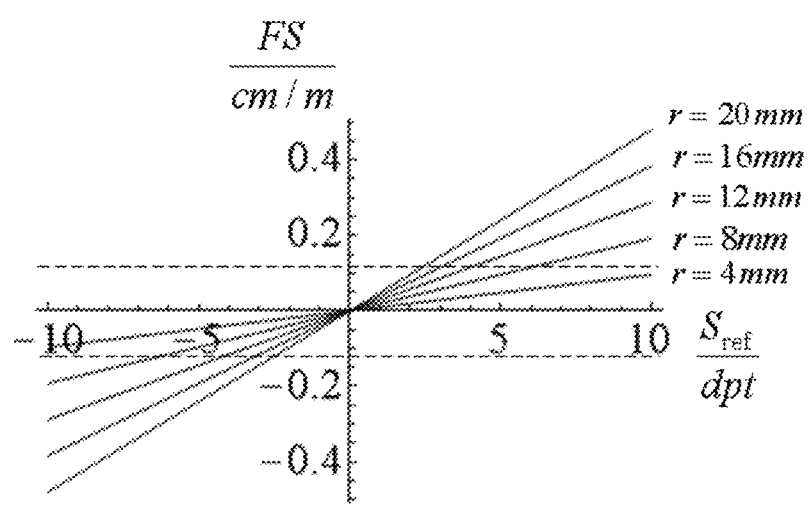
Figure 6:
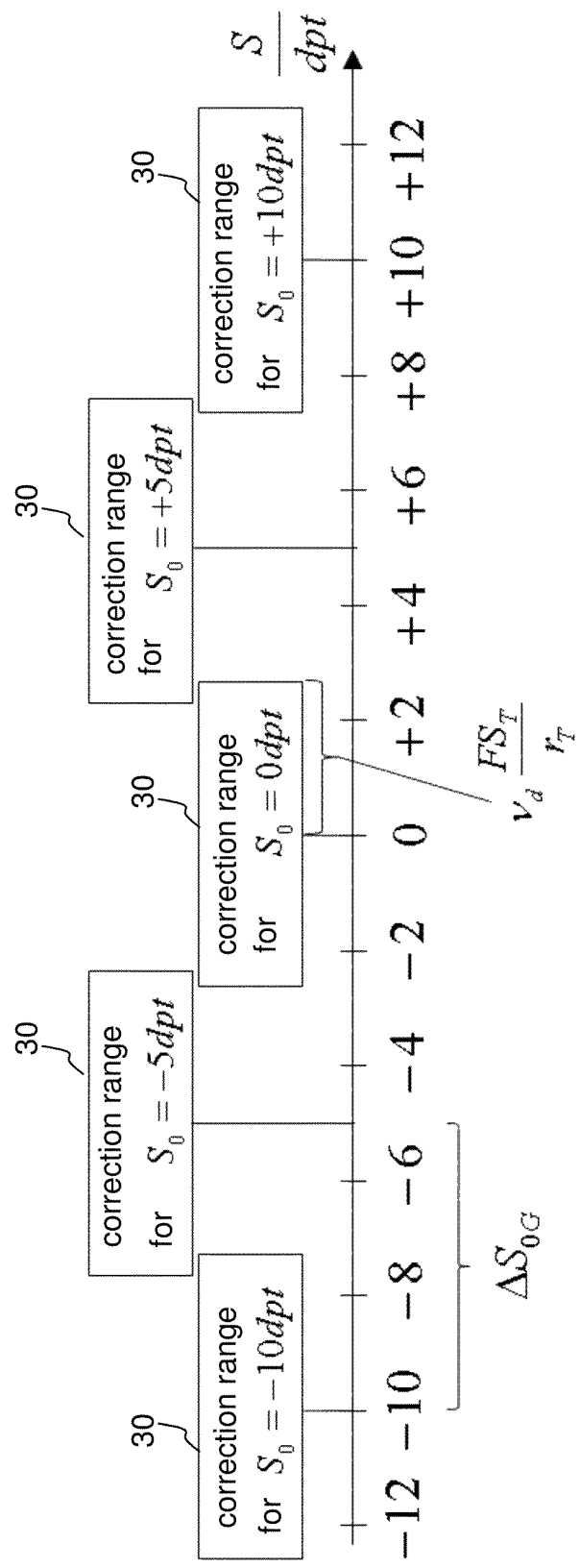
Figure 7:
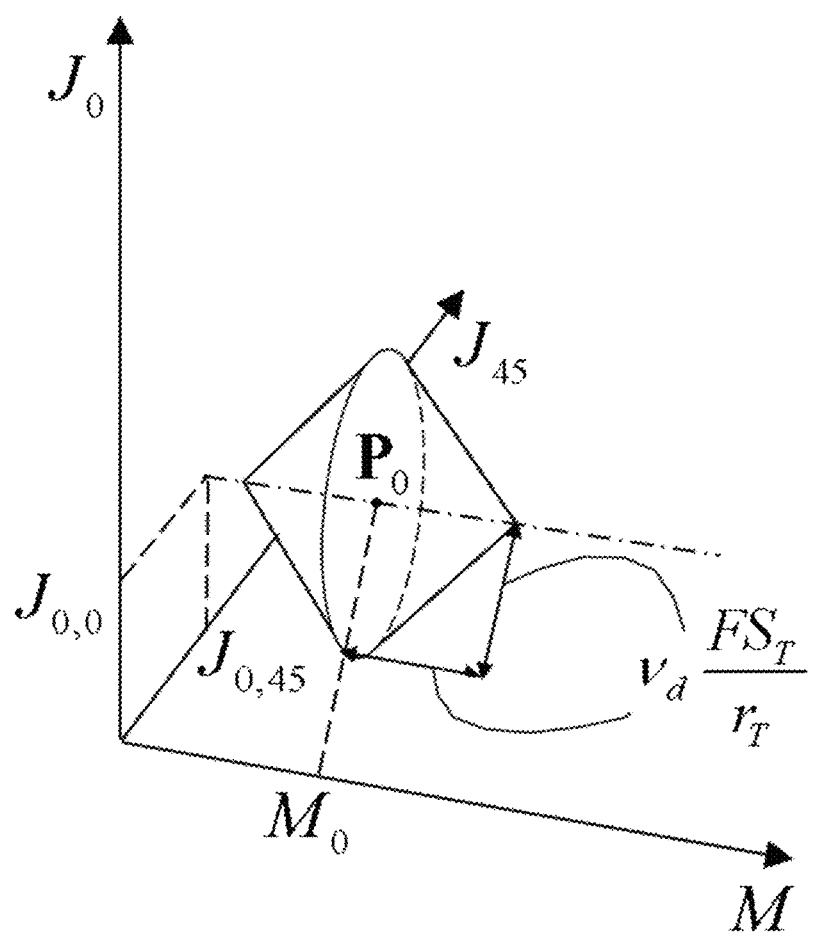
Figure 9:
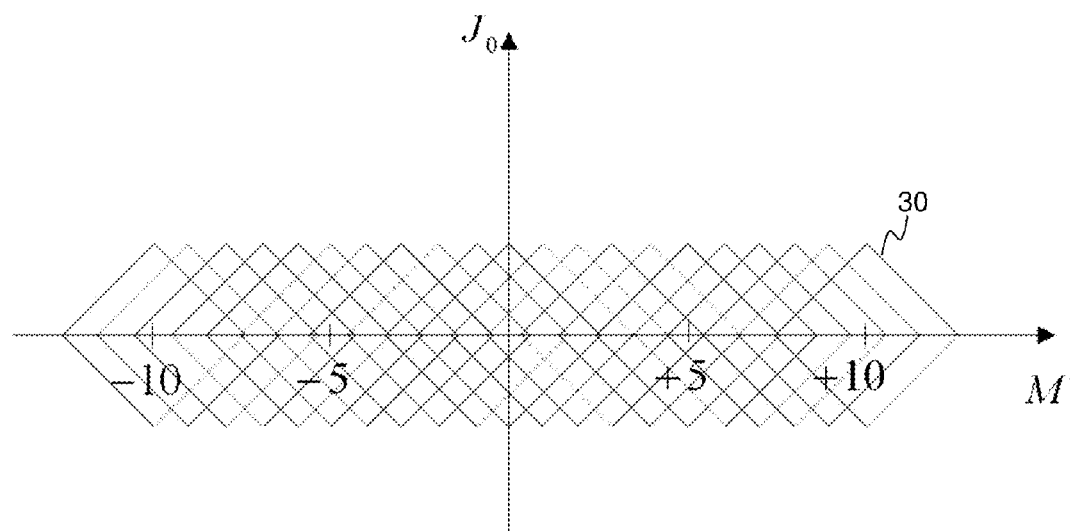
Figure 10:
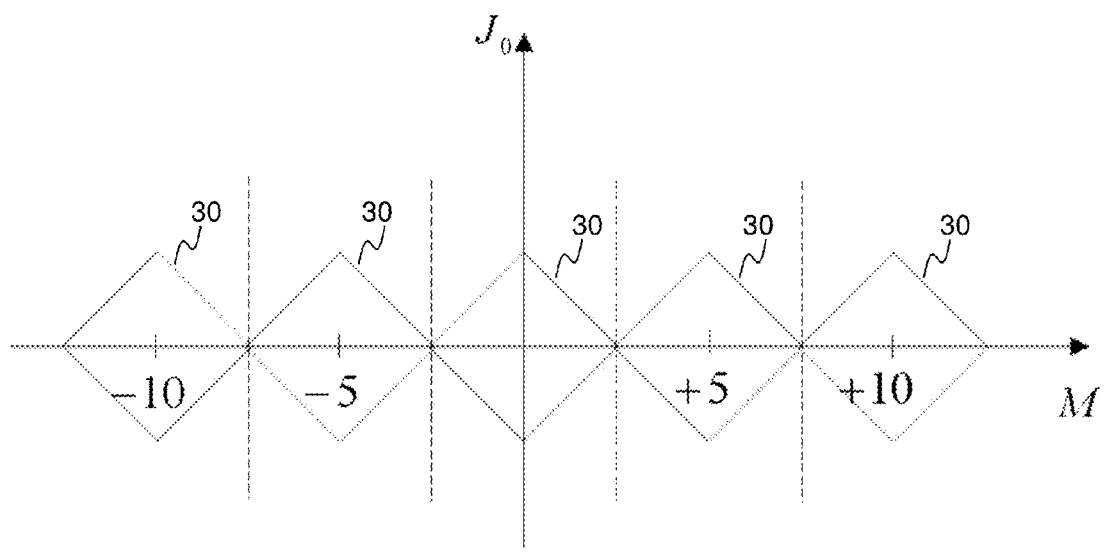
Figure 11:
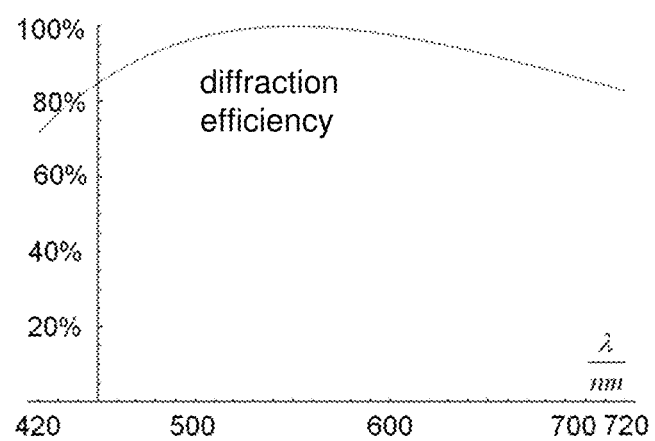
Figure 12:
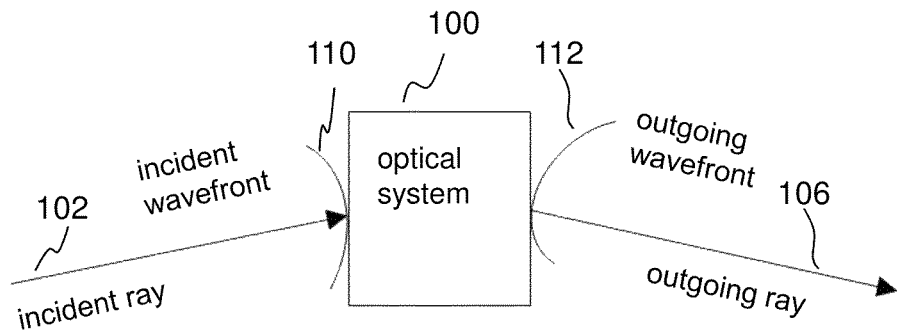
Figure 13:
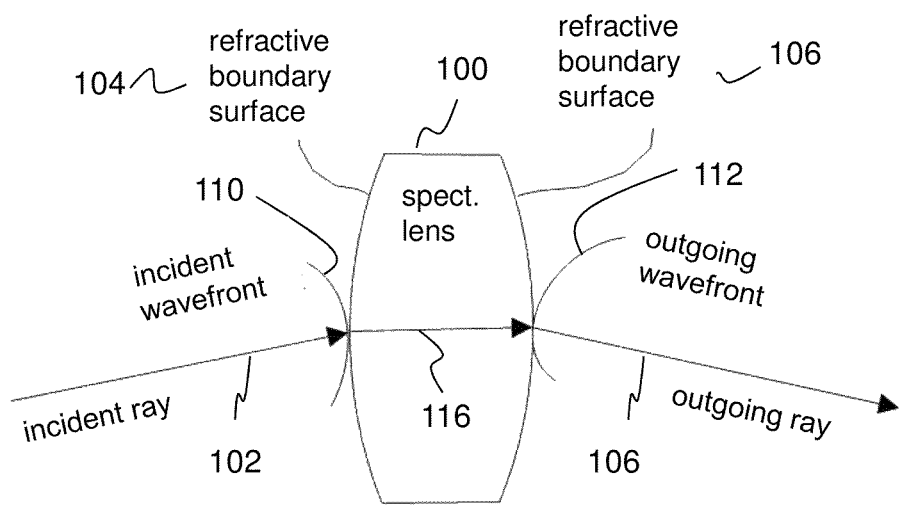
Figure 14:
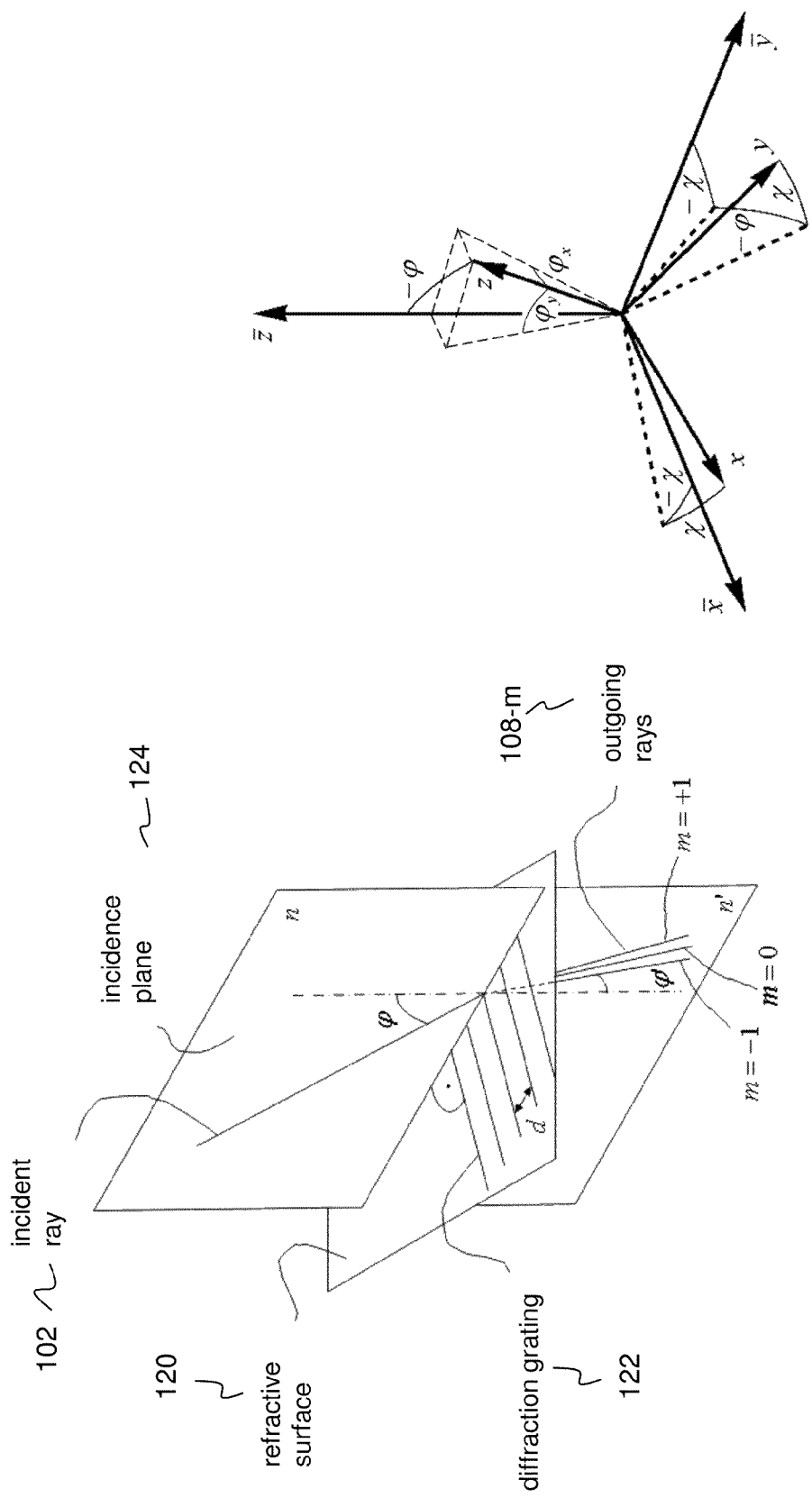
Figure 15:
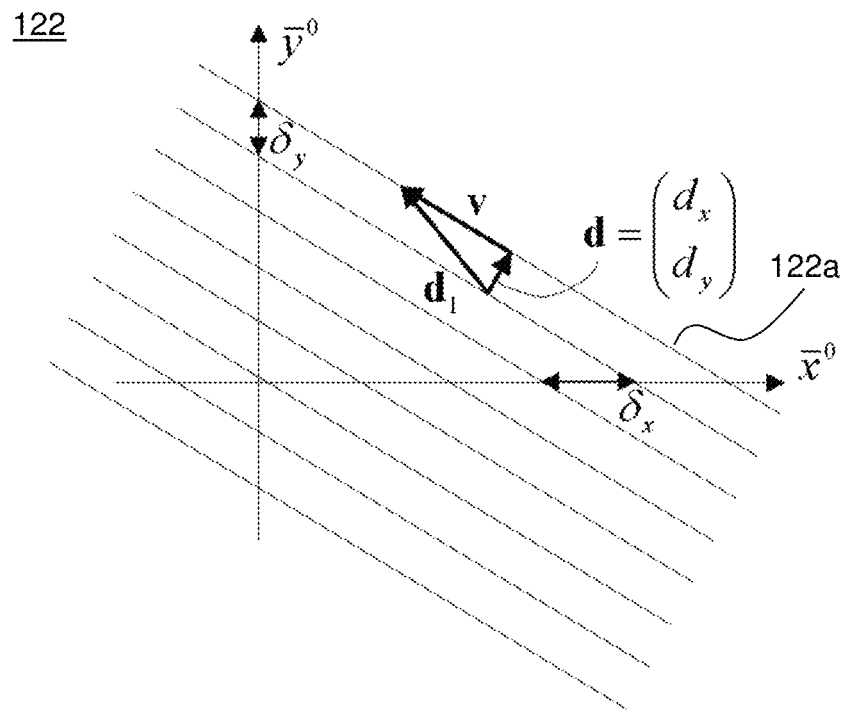
Figure 16:
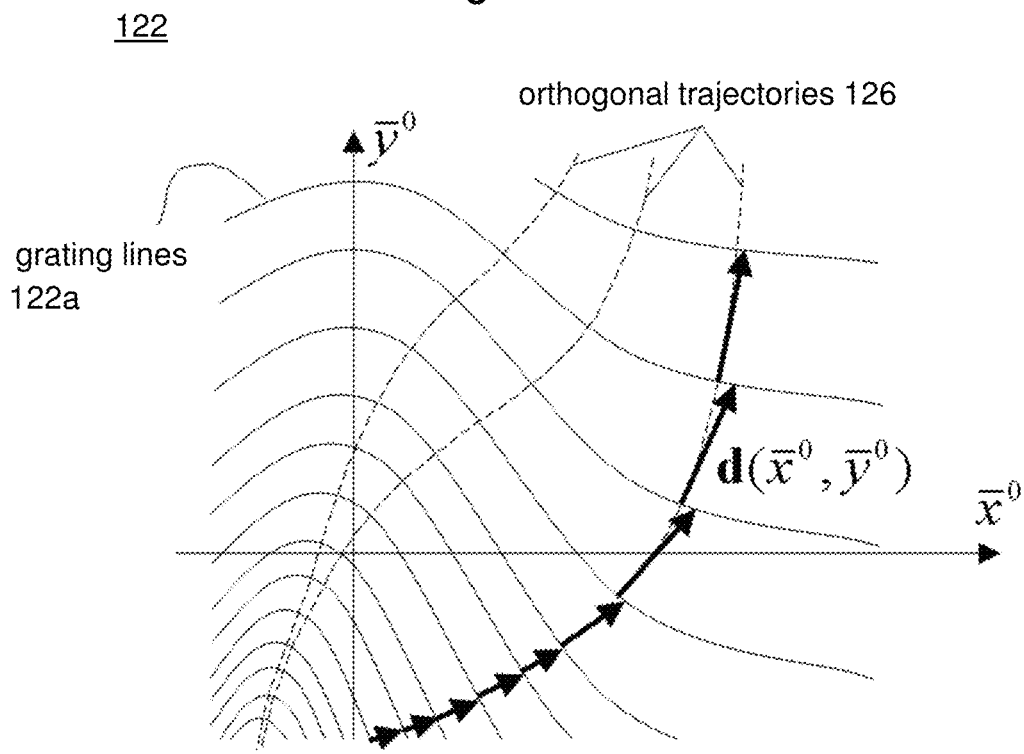
Figure 17:
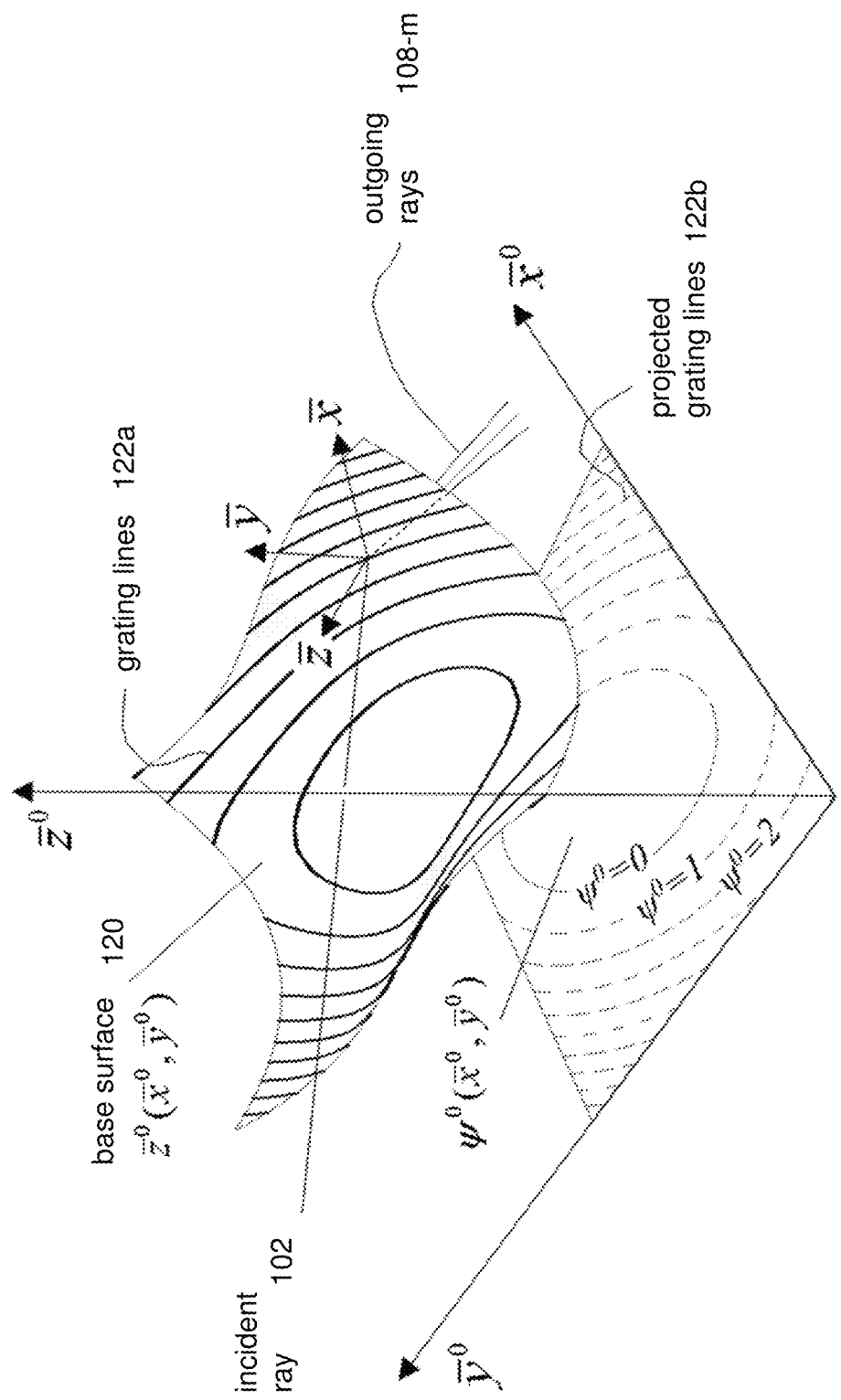
Figure 18:
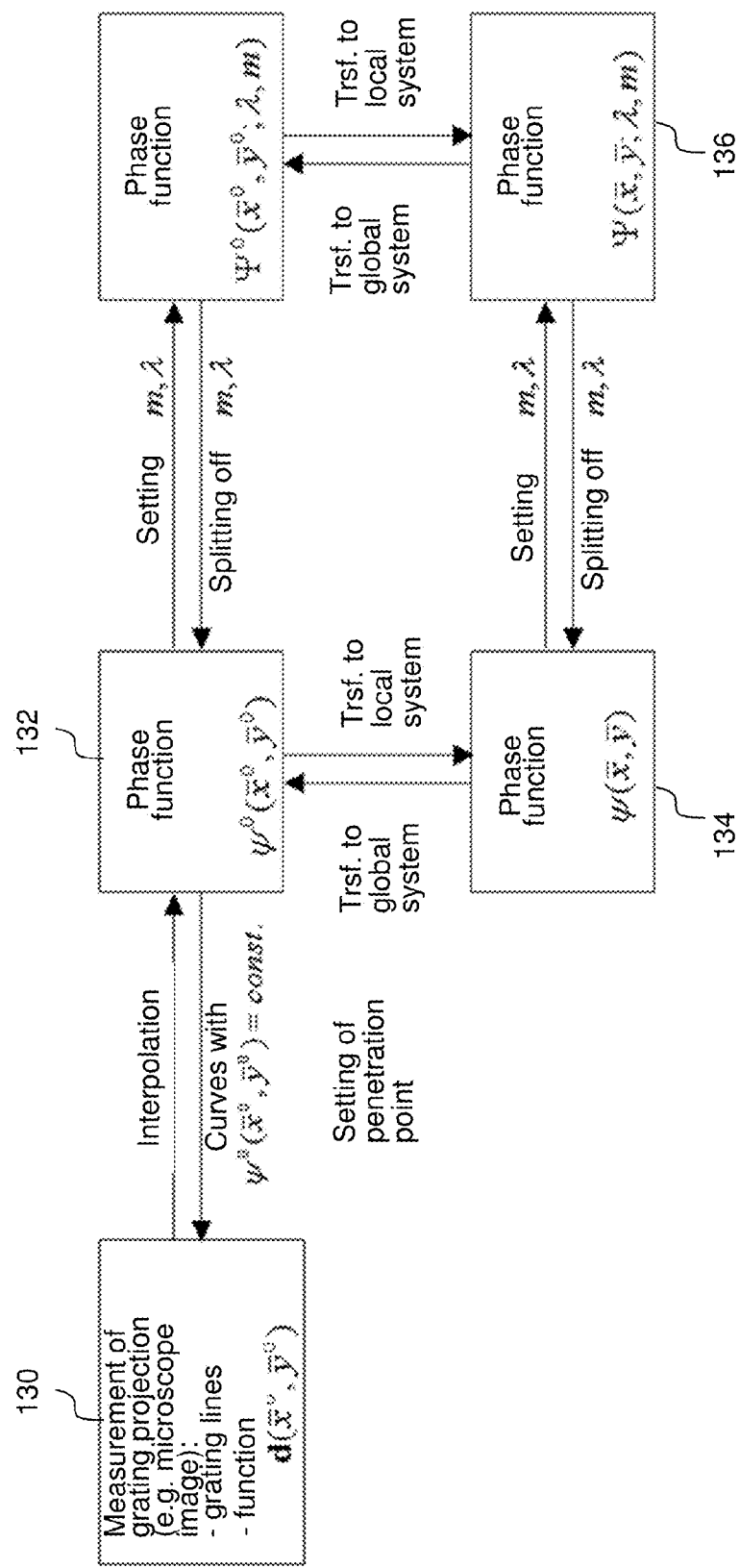

Further objects, features, and advantages of the present invention will become apparent from the following description of exemplary embodiments with reference to the drawings, which show:

FIG. 1 the diffraction of a plane wavefront upon incidence on a boundary surface with a periodic structure;

FIG. 2 the angular distribution of the intensity for a blazed grating applied to one of the surfaces of a prism;

FIG. 3 the principle of color fringe correction by a diffraction grating;

FIG. 4 the color fringe of a single-vision lens without diffraction grating as a function of the power of the spectacle lens for different radii r;

FIG. 5 the color fringe of a single-vision lens with a diffraction grating depending on the dioptric power of the spectacle lens for different radii r;

FIG. 6 an exemplary coverage of a predetermined power range of spherical lenses by 5 individual base lenses with different base gratings;

FIG. 7 an exemplary double-conical area of power vectors P of lenses the color fringe of which can be corrected by a diffraction grating adapted to a lens with the power vector $P_0$;

FIG. 8 the correction ranges of two base lenses with neighboring base powers;

FIG. 9 an exemplary coverage of a predetermined power range of spherocylindrical lenses by 20 base lenses with different rotationally symmetric base gratings;

FIG. 10 an exemplary coverage of the purely spherical power range with 5 gratings;

FIG. 11 the diffraction efficiency as a function of the wavelength;

FIG. 12 a schematic illustration of the ray path for ray tracing and wavefront tracing for an optical system;

FIG. 13 a schematic illustration of the ray path for ray tracing and wavefront tracing for a spectacle lens;

FIG. 14 the ray path in the case of a plane boundary surface with a diffraction grating;

FIG. 14A the mutual position of the coordinate system of the incident wavefront and the coordinate system of the base surface;

FIG. 15 the grating lines of a simple periodic diffraction grating on a plane boundary surface;

FIG. 16 the grating lines of a diffraction grating on a plane boundary surface;

FIG. 17 the grating lines of a diffraction grating on a curved boundary surface;

FIG. 18 a flow diagram illustrating the transition between the vector field $d(\bar{x}^0,\bar{y}^0)$ and the phase function $\psi(\bar{x}^0,\bar{y}^0)$.

FIG. 1 schematically shows the diffraction of light upon incidence of a plane wavefront 10 onto a boundary surface 12 with a periodic structure 14 (diffraction grating). Due to interference, an angle-dependent distribution of the intensity of the outgoing wavefront 16 having several diffraction maxima occurs. The interference condition is $d(n' \sin \phi') - d(n \sin \phi) = m\lambda$. Here, $\lambda$ is the wavelength, $\phi,\phi'$ are the angles of incidence and emergence, n,n' are the two refractive indices (in front of and behind the boundary surface with the grating), and d is the grating constant. The angular distribution of the intensity can be written as the product of two factors, namely the diffraction factor and the form factor. The positions of the maxima of the diffraction factor only depend on the grating constant d and on the number of grating lines, the maximum position of the form factor, however, only depends on the elementary structure of the grating (e.g. on the blazing angle $\beta$ in the case of a blazed grating).

A main feature of a diffraction grating is the diffraction factor, which describes that the intensity distribution includes several maxima that can be counted with respect to the diffraction orders m They follow a modified diffraction law $n' \sin \phi' - n \sin \phi = m\lambda/d$. Only the maximum of the $0^{th}$ diffraction order (m=0) satisfies the classic law of refraction. All other directions would not occur refractively. In the ray image, this means that a ray is split into several partial rays. The form factor determines the distribution of the intensity to the individual diffraction orders. FIG. 2 schematically shows the angular distribution of the intensity with a blazed grating 14 applied to one of the surfaces of a prism 20. The lines F and B correspond to the form factor and the diffraction factor, respectively.

When these basic facts are applied to optical elements (e.g. prisms, lenses, spectacle lenses, etc.), it has to be taken into account that an optical element has at least two boundary surfaces. Here, it is common to
1) neglect polarization effects, i.e. to still make do with the scalar diffraction theory,
2) consider the Rayleigh-Sommerfeld diffraction integral with Fraunhofer or at least Fresnel diffraction,
3) only consider far-field interferences, and
4) neglect scattering effects.

The third assumption is often made tacitly. However, it is valid as long as the two lens surfaces are further away from each other than the coherence length of day light or light from an incandescent lamp of 3 μm. This is usually the case for spectacle lenses.

The color fringe of optical elements in general is based on the fact that they have at least two refractive boundary surfaces, wherein the two combined refractive boundary surfaces of an optical element have a wavelength-dependent prismatic power $Pr_{ref}$. The use of diffractive optics for color fringe correction is based on the application of a diffraction grating to at least one of the refractive boundary surfaces of the optical element, for which grating an additional prismatic power $Pr_{diff}$ is introduced due to the diffractively modified law of refraction for m≠0.

With a suitable design or dimension of the diffraction grating (in particular the period d of the diffraction grating), there is an order $m=m_0$, for which the wavelength dependency of $Pr_{diff}$ is opposed to the ordinary dispersion of the refractive prism $Pr_{ref}$ and has such a size that the total prism $Pr=Pr_{ref}+Pr_{diff}$ is almost wavelength-independent. To obtain the highest possible intensity for this very order $m_0$, i.e. to maximize the diffraction efficiency, the grating form can be configured in a suitable manner. In the case of a blazed grating, this is accomplished by a suitable selection of the blazing angle.

Color Fringe and Optimum Color Fringe Compensation by a Diffraction Grating in a Refractive Prism As explained above, with an optical element (e.g. a lens, a prism, a spectacle lens, etc.) delimited by purely refractive surfaces, a color fringe forms as a results of two consecutive refractions in which short-wave light is refracted more strongly than long-wave light. The color fringe is a local phenomenon, which can be well described by the combined local prismatic power of both individual surfaces, i.e. by the total prism that forms by the local tilting of the two surfaces with respect to each other about a prism wedge angle α.

On the basis of such a prism, it is possible to describe the effect of additional diffraction gratings, which can be applied to the prism front surface (surface 1) or the prism back surface (surface 2) or to both surfaces (hereinafter also referred to as boundary surfaces).

For each grating applied to at least one of the surfaces 1 or 2 a corresponding phase function $\Psi_{1,2}$ can be introduced. The phase function $\Psi(\bar{x},\bar{y})$ represents the optical path length difference (optical path difference or OPD), which is introduced by the diffraction grating, as a function of the coordinates $\bar{x}$, $\bar{y}$ perpendicularly to the ray direction. The coordinate system $\bar{x},\bar{y},\bar{z}$ is a local coordinate system, which serves to describe the passage of a ray through a boundary surface, wherein it holds at the penetration point of the main ray with the boundary surface that $(\bar{x},\bar{y},\bar{z})=(0,0,0)$, and wherein the $\bar{z}$ axis is perpendicular to the base surface. A special possible choice of such a local system is to require that the incident ray be e.g. in the $\bar{x}$-$\bar{z}$ plane or in the $\bar{y}$-$\bar{z}$ plane. In general, however, this condition does not necessarily have to be satisfied. The use of local coordinate systems is known from WO 2008/089999 A1, for example, and is used in second-order wavefront tracing through surfaces without diffraction gratings. Typically, use is made of as many local systems as main rays are to be calculated. Further, a global coordinate system can be used.

The directional vector $$N = \begin{pmatrix} \sin\varphi_x \\ \sin\varphi_y \\ \sqrt{1 - \sin^2\varphi_x - \sin^2\varphi_y} \end{pmatrix}$$

can be assigned to the wavefront 14 incident on one of the boundary surfaces (cf. FIG. 1). The directional vector $$N' = \begin{pmatrix} \sin\varphi'_x \\ \sin\varphi'_y \\ \sqrt{1 - \sin^2\varphi'_x - \sin^2\varphi'_y} \end{pmatrix}$$

can be assigned to the outgoing wavefront 16 (cf. FIG. 1). A wavefront tracing for the tracing of rays, which are described in a local coordinate system $(\bar{x},\bar{y},\bar{z})$ by the directional vectors N,N', yields for the general laws of ray deviation:

$$n'_1 \sin\varphi'_1 - n_1 \sin\varphi_1 = \frac{\partial}{\partial r}\Psi_1(\bar{x}, \bar{y}; \lambda_1, m_1)$$

$$n'_2 \sin\varphi'_2 - n_2 \sin\varphi_2 = \frac{\partial}{\partial r}\Psi_2(\bar{x}, \bar{y}; \lambda, m_2)$$

where:
$n'_1$ is the refractive index of the material behind the boundary surface 1;
$n_1$ is the refractive index of the material in front of the boundary surface 1;
$n'_2$ is the refractive index of the material behind the boundary surface 2;
$n_2$ is the refractive index of the material in front of the boundary surface 2;
$\phi_1$ is the angle of incidence of the ray on the boundary surface 1;
$\phi'_1$ is the angle or emergence of the ray after refraction on the boundary surface 1;
$\phi_2$ is the angle of incidence of the ray on the boundary surface 2;
$\phi'_2$ is the angle of emergence of the ray after refraction on the boundary surface 2;
$m_1$ and $m_2$ are the diffraction orders.

In a first approximation of an optical element with a diffraction grating, the above general formula can be applied only to a spatial dimension x, instead of to the spatial dimensions x,y. Moreover, if only those rays that are perpendicular to the prism edge in the plane are considered, then it is sufficient to use an angle $\phi$ instead of the angles $\phi_x$ und $\phi_y$.

Then, it accordingly applies at the (boundary) surfaces 1 and 2:

$$n'_1 \sin\varphi'_1 - n_1 \sin\varphi_1 = \frac{\partial}{\partial r}\Psi_1(x; \lambda, m_1) \tag{1}$$

$$n'_2 \sin\varphi'_2 - n_2 \sin\varphi_2 = \frac{\partial}{\partial r}\Psi_2(x; \lambda, m_2)$$

In a paraxial approximation it holds that $\sin \phi'_1 \approx \phi'_1$, $\sin \phi'_2 \approx \phi'_2$ etc. Moreover, if the boundary surfaces 1 and 2 (e.g. the boundary surfaces of a spectacle lens) are surrounded by air, then it holds that $n_1=1$, $n'_1=n$, $n_2=n$, $n'_2=1$, where n is the refractive index of the optical material between the boundary surfaces.

$$n\varphi'_1 - \varphi_1 = \frac{\partial}{\partial r}\Psi_1(x; \lambda, m_1) \tag{1a}$$

$$\varphi'_2 - n\varphi_2 = \frac{\partial}{\partial r}\Psi_2(x; \lambda, m_2)$$

In this simple case, equation (1) can be applied to the light passage through a prism with a local prism wedge angle $\alpha(x)$. For the local wavelength-dependent angular deviation it holds that:

$$\Delta\varphi(x; \lambda) := \varphi'_2 - \varphi_1 + \alpha(x) = -(n(\lambda) - 1)\alpha(x) + \frac{\partial}{\partial x}\Psi(x; \lambda) \tag{2}$$

where $$\Psi(x; \lambda) := \Psi_1(x; \lambda, m_1) + \Psi_2(x; \lambda, m_2) \tag{3}$$

This means that the total angular change is additively composed of two contributions, namely a refractive portion and a diffractive portion:

$$\Delta\varphi(x; \lambda) = \Delta\varphi_{ref}(x; \lambda) + \Delta\varphi_{diff}(x; \lambda) \tag{4}$$

where $$\Delta\varphi_{ref}(x; \lambda) = -(n(\lambda) - 1)\alpha(x) \tag{5}$$

$$\Delta\varphi_{diff}(x; \lambda) = \frac{\partial}{\partial x}\Psi(x; \lambda)$$

Here, $\Delta\phi_{ref}(x;\lambda)$ can be referred to as the refractive prism or the base prism, $\Delta\phi_{diff}(x;\lambda)$ as the diffractive prism, and $\Delta\phi(x;\lambda)$ as the total prism.

A measure for the color fringe FS of an optical element (e.g. a refractive prism, a refractive lens, a spectacle lens, etc.) is the absolute angular width of the color fringe $$FS = |\Delta\phi(x;\lambda_{F'}) - \Delta\phi(x;\lambda_{C'})|,$$

where the indices e, F', C' designate the specific wavelengths by which the Abbe number $v_e=(n_e-1)/(n_{F'}-n_{C'})$ is defined. Here, $n_e$, $n_{F'}$, $n_{C'}$ are the refractive indices of the optical material at the wavelengths $\lambda_e=546.073$ nm, $\lambda_{F'}=479.99$ nm, $\lambda_{C'}=643.85$ nm.

Alternatively, as the measure for the color fringe, use can be made of the absolute angular width $$FS = |\Delta\phi(x;\lambda_F) - \Delta\phi(x;\lambda_C)|$$

corresponding to the alternative Abbe number $v_d=(n_d-1)/(n_F-n_C)$. In this case, the indices d, F, C designate the specific wavelengths by which the alternative Abbe number $v_d=(n_d-1)/(n_F-n_C)$ is defined. Here, $n_d$, $n_F$ and $n_C$ are the refractive indices of the optical material at the wavelengths $\lambda_d=587.562$ nm, $\lambda_F=486.134$ nm, and $\lambda_C=656.281$ nm.

In the following, as the measure for the color fringe, use will be made of the absolute angular width $FS=|\Delta\phi(x;\lambda_F)-\Delta\phi(x;\lambda_C)|$ corresponding to the alternative Abbe number $v_d=(n_d-1)/(n_F-n_C)$. Of course, the following formulae can also be applied accordingly in the case that the color fringe is defined by $FS=|\Delta\phi(x;\lambda_{F'})-\Delta\phi(x;\lambda_{C'})|$ or e.g. by other wavelengths. In this case, the index d is replaced by the index e, the index F by the index F', and the index C by the index C'.

It is expedient to use a sign-dependent definition of the color fringe, e.g.

$$FS(x) = \Delta\phi(x;\lambda_F) - \Delta\phi(x;\lambda_C) \tag{6}$$

wherein a negative angle designates a downward ray deviation (i.e. to smaller values of x), a positive angle an upward deviation (i.e. to larger values of x). Due to the additivity of the refractive and diffractive portions in equation (4), the color fringe can be represented as a sum of a refractive color fringe $FS_{ref}$ and of a diffractive color fringe $FS_{diff}$:

$$FS = FS_{ref} + FS_{diff}. \quad (7)$$

The refractive color fringe is determined by the prism divided by the Abbe number:

$$\begin{aligned} FS_{ref} &= FS_{ref}(x) \quad (8) \\ &= \Delta\varphi_{ref}(x; \lambda_F) - \Delta\varphi_{ref}(x; \lambda_C) \\ &= \frac{\Delta\varphi_{ref}(x; \lambda_F) - \Delta\varphi_{ref}(x; \lambda_C)}{\Delta\varphi_{ref}(x; \lambda_d)} \Delta\varphi_{ref}(x; \lambda_d) \\ &= \frac{-(n_F - 1)\alpha - (-(n_C - 1)\alpha)}{-(n_d - 1)\alpha} \Delta\varphi_{ref}(x; \lambda_d) \\ &= \frac{\Delta\varphi_{ref}(x; \lambda_d)}{v_d}, \end{aligned}$$

The diffractive color fringe contribution is determined by $$\begin{aligned} FS_{diff} &= FS_{diff}(x) \quad (9) \\ &= \Delta\varphi_{diff}(x; \lambda_F) - \Delta\varphi_{diff}(x; \lambda_C) \\ &= \frac{\partial}{\partial x}\Psi(x; \lambda_F) - \frac{\partial}{\partial x}\Psi(x; \lambda_C) \end{aligned}$$

In order to achieve an "ideal" color fringe compensation of the refractive color fringe by the diffractive contribution, it must hold that $$FS_{ref} + FS_{diff} = 0 \quad (10)$$

If the color fringe is to be corrected fully for a prism with refractive prismatic power $\Delta\phi_{ref} = \Delta\phi_{ref,0}$, the diffraction grating has to be selected such that $$FS_{diff}(x) = -\frac{\Delta\varphi_{ref,0}(x; \lambda_d)}{v_d} \quad (11)$$

$$\Delta\varphi_{diff}(x; \lambda_F) - \Delta\varphi_{diff}(x; \lambda_C) = -\frac{\Delta\varphi_{ref,0}(x; \lambda_d)}{v_d}$$

is satisfied. For example, this can be achieved by a grating with $$\Delta\varphi_{diff}(x; \lambda) = -\frac{\Delta\varphi_{ref,0}(x; \lambda_d)}{v_d} \cdot \frac{\lambda}{\lambda_F - \lambda_C} \quad (12)$$

In the case of a prism with plane surfaces and a refractive deviation $\Delta\phi_{ref,0}(\lambda_d)$ independent of x, a phase function of the form $\Psi(x;\lambda) = a_1 x + a_0$ is suitable. From equation (12), the parameter $a_1$ can be determined as follows:

$$a_1 = -\frac{\Delta\varphi_{ref,0}(\lambda_d)}{v_d} \cdot \frac{\lambda}{\lambda_F - \lambda_C}.$$

Since in this case the condition $$\frac{\partial \Psi(x; \lambda)}{\partial x} = a_1 = \frac{m\lambda}{d(x)}$$

is satisfied, it holds for the grating distance that $$d(x) = \frac{m\lambda}{a_1} = -\frac{m}{\Delta\varphi_{ref,0}(\lambda_d)} v_d(\lambda_F - \lambda_C) = const.$$

The diffraction order can be suitable determined. For example, m=−1.

If a color fringe correction is made fitting the base prism $\Delta\phi_{ref,0}$ and if the actual base prism is determined by $\Delta\phi_{ref}$, then the gratings compensates for the color fringe only partly and the remaining color fringe is determined by $$FS(x) = \frac{\Delta\varphi_{ref}(x; \lambda_d)}{v_d} - \frac{\Delta\varphi_{ref,0}(x; \lambda_d)}{v_d} = \frac{\Delta\varphi_{ref}(x; \lambda_d) - \Delta\varphi_{ref,0}(x; \lambda_d)}{v_d} \quad (13)$$

The total prism at wavelength $\lambda_d$ in the case of a partial color fringe compensation is determined by $$\Delta\varphi(x; \lambda_d) = \Delta\varphi_{ref}(x; \lambda_d) - \frac{\Delta\varphi_{ref,0}(x; \lambda_d)}{v_d} \cdot \frac{\lambda_d}{\lambda_F - \lambda_C} \quad (14)$$

In the case of a full color fringe compensation, the condition $\Delta\phi_{ref}(x;\lambda_d) = \Delta\phi_{ref,0}(x;\lambda_d)$ is satisfied. In this case, FS(x)= 0. The total prism at wavelength $\lambda_d$, according to equation (14), is determined by $$\Delta\varphi(x; \lambda_d) = \Delta\varphi_{ref,0}(x; \lambda_d)\left(1 - \frac{1}{v_d} \cdot \frac{\lambda_d}{\lambda_F - \lambda_C}\right) \quad (15)$$

Since $\lambda_F - \lambda_C < 0$, the bracket is larger than 1, so that the total prism $\Delta\phi$ is always slightly stronger with respect to the base prism $\Delta\phi_{ref,0}$.

Figure 3C:
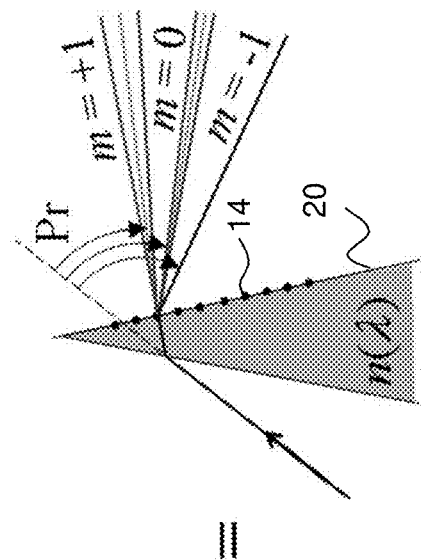
Figure 3B:
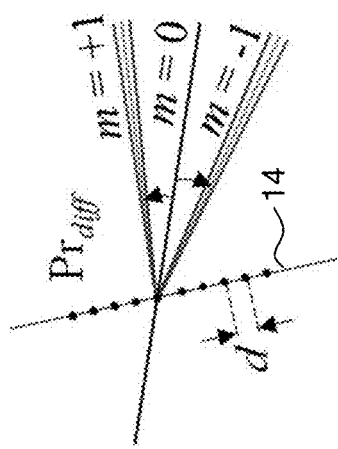
Figure 3A:
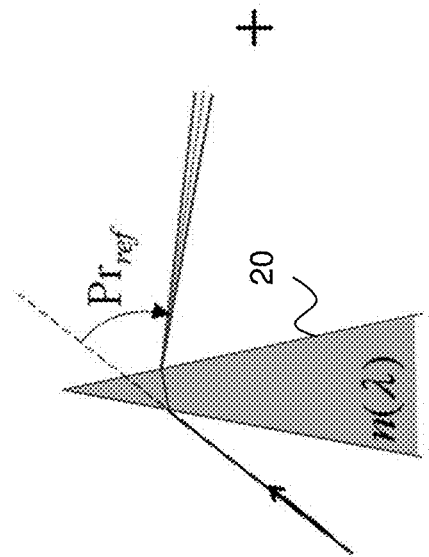

FIG. 3 shows the principle of color fringe correction by a diffraction grating with a refractive prism. FIG. 3A shows the color fringe of a prism 20 with a prism angle α, which is due to the wavelength-dependent prismatic power $Pr_{ref}$ of the prism 20.

FIG. 3B shows a wavelength-dependent diffraction by the diffraction grating 14. FIG. 3C shows the combined power of the prism 20 and of the diffraction grating 14. A color fringe correction in the order of m=−1 takes place for the specified grating constant d. The wavelength-dependent prismatic power of the prism 20 is $Pr_{ref} = -(n(\lambda) - 1)\alpha$. The diffraction grating 14 with the grating constant d has a prismatic power $$Pr_{diff} = \frac{m\lambda}{d}.$$

The combined power of the prism 20 and of the grating 14 is $Pr = Pr_{ref} + Pr_{diff}$. For a color fringe correction, it is required that $$\left.\frac{\partial Pr}{\partial \lambda}\right|_{\lambda = \lambda_D} = 0$$

for a predetermined design wavelength $\lambda_D$. It results for the grating constant that $$d \approx \frac{m}{\alpha \cdot \frac{\partial n}{\partial \lambda}}.$$

Color Fringe and (Optimum) Color Fringe Compensation by a Diffraction Grating in a Rotationally Symmetric Single-Vision Lens Rotationally symmetric spectacle lenses can be described by one single degree of freedom, instead of by two independent coordinates x and y. If this degree of freedom is designated with r, then equations (1) to (15) can be applied for the meridional rays by replacing x by r. According to Prentice's rule, $\Delta\varphi_{ref}(r;\lambda_d) = -S_{ref}(\lambda_d)r$. Here, $S_{ref}$ designates the refractive dioptric power of the lens, which results due to the surface curvatures, and r designates the distance from the optical center or the vertex of the spectacle lens. The "power" of the lens may be understood to be the vertex power of the lens, the refractive index, the refractive power, or any other measure for the power.

In this case, the refractive color fringe according to equation (8) is $$FS_{ref}(x) = \frac{-S_{ref}(\lambda_d)r}{v_d} \quad (16)$$

According to equation (11), the diffractive color fringe of a grating selected fitting the refractive power $S_{ref,0}$ is $$FS_{diff}(r) = -\frac{-S_{ref,0}(\lambda_d)r}{v_d} \quad (17)$$

The total color fringe results according to equation (13) for $$FS(r) = -\frac{(S_{ref} - S_{ref,0})r}{v_d} \quad (18)$$

The color fringe of a rotationally symmetric single-vision lens is proportional to the power and to the distance r, according to equation (16).

Figure 5B:
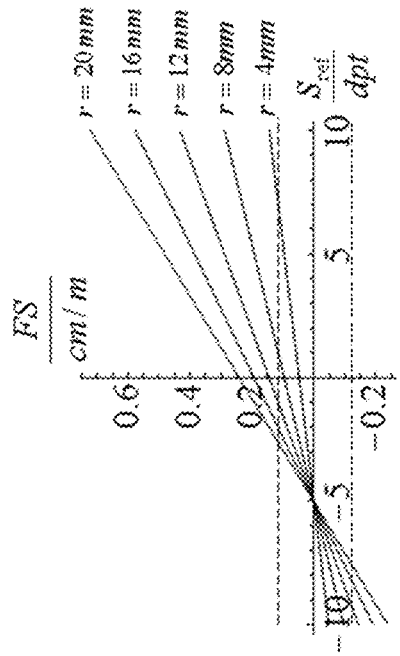
Figure 5D:
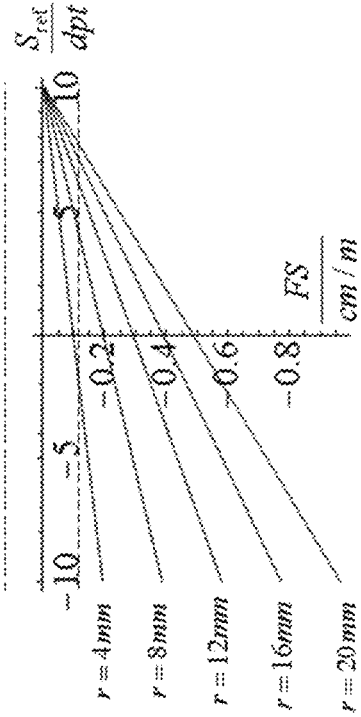
Figure 5A:
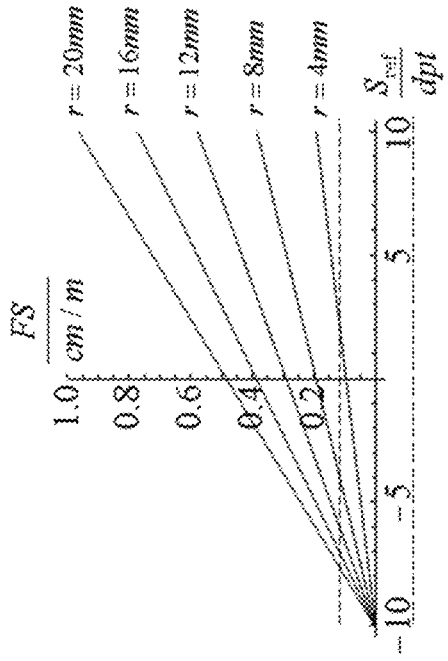
Figure 5C:
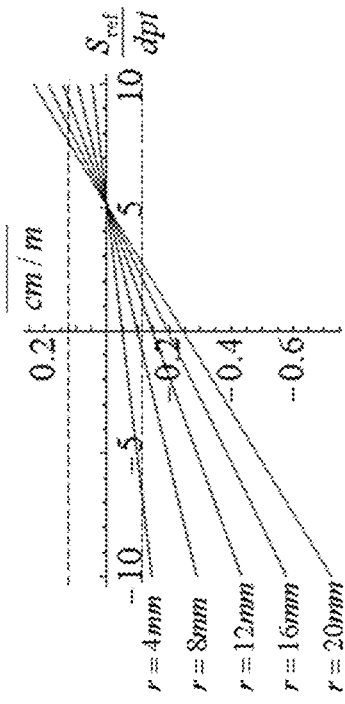

FIG. 4 shows the color fringe of a single-vision lens without diffraction grating as a function of the power of the spectacle lens for different radii r. The spectacle lens has an Abbe number $v_d$=42.41. FIGS. 5A to 5D each show the color fringe of a single-vision lens with a diffraction grating depending on the dioptric power of the spectacle lens for different radii r. The spectacle lens has an Abbe number $v_d$=42.41. The diffraction grating is selected fitting different base powers $S_{ref,0}$. In FIG. 5A, $S_{ref,0}$=−10 dpt, in FIG. 5B $S_{ref,0}$=−5 dpt, in FIG. 5C $S_{ref,0}$=+5 dpt, and in FIG. 5D $S_{ref,0}$=+10 dpt.

Moreover, plotted in FIGS. 4 and 5A to 5D is further a typical perception threshold for the color fringe of |FS|≤0.12 cm/m for the color fringe (cf. dashed line). However, the assumed perception threshold can be a different one, for example, the perception threshold can be between FS≈0.04 cm/m, and FS≈0.5 cm/m, preferably between FS≈0.04 cm/m, and FS≈0.2 cm/m.

As can be seen from FIG. 4, a rotationally symmetric single-vision lens is allowed to have a power of up to $|S_{ref}|$≈2.5 dpt in order for the color fringe to be below the perception threshold |FS|≤0.12 cm/m at a distance of up to r=20 mm from the optical center. The higher the power $S_{ref}$, the smaller the radius r on the spectacle lens within which the color fringe is still acceptable. For a lens with a higher power $S_{ref}$, it is therefore advantageous to perform a color fringe compensation by means of a rotationally symmetric diffraction grating.

Equation (18) means that the color fringe of a rotationally symmetric lens with a diffraction grating depends on the difference $(S_{ref} - S_{ref,0})$ like the color fringe of an uncorrected lens on $S_{ref}$ alone. A color fringe correction performed fitting the power $S_{ref,0}$ thus only causes a shift of the common point of intersection of all straight lines intersecting at $S_{ref}$=0 in FIG. 4 such that they intersect at $S_{ref}=S_{ref,0}$ (cf. FIGS. 5A to 5D).

If the color fringe is to be corrected fully for the lens with the refractive power $S_{ref}(\lambda_d)=S_{ref,0}(\lambda_d)$, the diffraction grating has to be selected so that equation (17) is satisfied, i.e. that the condition $$\Delta\varphi_{diff}(r;\lambda_F) - \Delta\varphi_{diff}(r;\lambda_C) = \frac{S_{ref,0}(\lambda_d)r}{v_d} \quad (11a)$$

is satisfied.

For example, this can be achieved by a grating with a phase function $$\Psi(r;\lambda) = \frac{a_2}{2}r^2 + a_0 \text{ with } a_2 = \frac{S_{ref,0}(\lambda_d)}{v_d} \cdot \frac{\lambda}{\lambda_F - \lambda_C}.$$

Due to the condition $$\frac{\partial\Psi(r;\lambda)}{\partial r} = a_2 r = \frac{m\lambda}{d(r)},$$

it holds for the grating distance that $$d(r) = \frac{m\lambda}{a_2 r} = \frac{m(\lambda_F - \lambda_C)v_d}{S_{ref,0}(\lambda_d) \cdot r} \propto \frac{1}{r}.$$

The diffractive contribution to the power of a grating selected fitting the refractive power $S_{ref,0}(\lambda_d)$ yields with respect to equation (12) for $$S_{diff}(\lambda_d) = -\frac{S_{ref,0}(\lambda_d)}{v_d} \cdot \frac{\lambda}{\lambda_F - \lambda_C}, \quad (19)$$

According to equation (14), the total power of a lens with partly corrected color fringe is determined by $$S(\lambda_d) = S_{ref}(\lambda_d) - \frac{S_{ref,0}}{v_d} \cdot \frac{\lambda_d}{\lambda_F - \lambda_C} \quad (20)$$

According to equation (15), the total power of a lens with full color fringe compensation is determined by $$S(\lambda_d) = S_0(\lambda_d) \quad (21)$$

with $$S_0(\lambda_d) = S_{ref,0}(\lambda_d)\left(1 - \frac{1}{v_d} \cdot \frac{\lambda_d}{\lambda_F - \lambda_C}\right) \quad (22)$$

Since in the case of incomplete color fringe compensation it holds that $$S(\lambda_d) - S_0(\lambda_d) = S_{ref}(\lambda_d) - S_{ref,0}(\lambda_d) \quad (22a)$$

equation (18) can also be written as $$FS(r) = -\frac{(S-S_0)r}{v_d} \quad (23)$$

Consequently, the color fringe can be described as a function of S by illustrations resulting from FIGS. 4 and 5A to 5D by replacement of the axis labeling $S_{ref}$ with the axis labeling S.

The extent to which the color fringe in the periphery of rotationally symmetric single-vision lenses cannot be corrected fully will mainly depend on the deviation between the prescribed spherical total power and the total power to which the grating is adapted.

Color Fringe and (Optimum) Color Fringe Compensation by a Diffraction Grating in a Spherocylindrical Single-Vision Lens If a single-vision lens also has a cylinder in addition to the power, the rotational symmetry is missing. In this case, two degrees of freedom x and y are required, which can be combined to a vector r. As can be seen from equation (1), instead of an angle $\phi$, there are two components $\phi_x$ and $\phi_y$ in this case, which can be combined to a vector $\phi$. The corresponding vector extension of equations (4, 5) in the case of a paraxial approximation can be represented as follows:

$$\Delta\phi(r;\lambda) = \Delta\phi_{ref}(r;\lambda) + \Delta\phi_{dif}(r;\lambda) \quad (4)$$

where $$\Delta\phi_{ref}(r;\lambda) = -(n(\lambda)-1)\alpha(r)$$

$$\Delta\phi_{dif}(r;\lambda) = \nabla_r \Psi(r;\lambda) \quad (5a)$$

To define the color fringe of a non-rotationally symmetric spectacle lens, equation (6) can be modified as follows:

$$FS(r) = |\Delta\phi(r;\lambda_F) - \Delta\phi(r;\lambda_C)| \quad (6a)$$

If a grating fits a spherocylindrical power other than the present one, a modification of equation (18) can be used to estimate the color fringe, in which the variables $S_{ref}$, $S_{ref,0}$ are replaced by refractive power matrices $$S_{ref} = \begin{pmatrix} S_{xx} & S_{xy} \\ S_{xy} & S_{yy} \end{pmatrix}, S_{ref,0} = \begin{pmatrix} S_{0xx} & S_{0xy} \\ S_{0xy} & S_{0yy} \end{pmatrix},$$

where preferably $S_{ref,0} = S_{ref,0} 1$.

The refractive power matrices depend on the spherocylindrical (SZA) values (sphere S, cylinder Z, axis A) of the wavefront or the refraction as follows:

$$S = \begin{pmatrix} S_{xx} & S_{xy} \\ S_{xy} & S_{yy} \end{pmatrix} = \begin{pmatrix} \left(S+\frac{Z}{2}\right) - \frac{Z}{2}\cos 2\alpha & -\frac{Z}{2}\sin 2\alpha \\ -\frac{Z}{2}\sin 2\alpha & \left(S+\frac{Z}{2}\right) + \frac{Z}{2}\cos 2\alpha \end{pmatrix}$$

$$Z = \sqrt{(S_{xx} - S_{yy})^2 + 4S_{xy}^2}$$

$$S = \frac{1}{2}(S_{xx} + S_{yy} - Z)$$

$$\tan\alpha = \frac{S - S_{xx}}{S_{xy}}.$$

In this case, it results for the color fringe:

$$FS(r) = \frac{|(S_{ref} - S_{ref,0})r|}{v_d} \quad (18a)$$

or according to equation (23)

$$FS(r) = \frac{|(S - S_0)r|}{v_d} \quad (23a)$$

The extent to which the color fringe in the periphery of spherocylindrical single-vision lenses is not corrected fully will thus mainly depend on a deviation, described by a matrix difference, between the prescribed spherocylindrical total power and the spherocylindrical total power to which the grating is adapted. This deviation is due to:
  the deviation between the prescribed spherical total power and the spherical total power to which the grating is adapted; and
  the deviation between the prescribed cylindrical total power and the cylindrical total power to which the grating is adapted.

Color Fringe and (Optimum) Color Fringe Compensation by a Diffraction Grating in a Progressive Lens To ideally compensate for the color fringe of a progressive lens by a diffraction grating, it is required to adapt the grating individually to the power course. This can be performed by a simultaneous optimization of spectacle lens surfaces and a diffraction grating, for example. Alternatively, this can be performed by selecting a grating with grating lines (substantially) perpendicular to the local cylinder axis (base setting) of the prism of the respective base lens.

The optimization is preferably performed in a predetermined wearing position of the spectacle lens. The wearing position can particularly be characterized by the face form angle, the forward inclination or pantoscopic angle, the corneal vertex distance, the pupillary distance, and optionally further parameters. The parameters of the wearing position can be average parameters. In addition, preferably, a predetermined object distance (preferably as a function of the viewing direction) is taken into consideration.

Preferably, the optimization is performed such that at least second-order aberrations are minimized. The optimization can comprise a minimization of a polychromatic target function in which the color fringe is taken into account as a target variable directly or indirectly due to a wavelength dependency. The second or higher-order aberrations are preferably determined by means of wavefront tracing taking the base grating and the wearing position of the spectacle lens into account.

For each grating not ideally adapted a rest color fringe remains, the distribution of which also depends on the special spectacle lens design of the progressive lens in addition to the grating and can thus not be described as generally as for single-vision lenses by equations (23) and (23a).

Selection of a Base Grating System

The above information on the ideal adaptation of a diffraction grating to a spectacle lens creates the impression that for each determined power course an individually adapted diffraction grating is actually needed. Such an impression is particularly created by equations (23) and (23a), since according to these equations already the color fringe of a single-vision lens with power S or S only disappears for all values of r or r if the grating fits precisely the power $S_0$ or $S_0$.

In the general case (e.g. with aspherical and in particular with progressive lenses), it is required to perform an individual, simultaneous optimization of the spectacle lens and of the grating in order to obtain a color fringe correction.

Surprisingly, it has been shown that this is not required to obtain a color fringe correction that is perceived to be the optimal. Instead, it is sufficient to use a color-fringe corrected grating only for a few base powers and to allow this grating also for neighboring powers as long as they are so close to each other that the color fringe remains below a predetermined threshold.

Rotationally Symmetric Single-Vision Lenses

An exemplary method for creating a base grating system for rotationally symmetric single-vision lenses can be explained with reference to FIGS. 4 and 5A to 5D. In a first step, a threshold $FS_T$ is determined for the color fringe (color fringe perception threshold). Preferably, this is a physiological perception threshold. Preferably, the threshold is in the range of approximately 0.04 cm/m to approximately 0.02 cm/m, particularly preferably the value is $FS_T \leq 0.12$ cm/m. However, it is possible to use any other color fringe perception threshold.

Moreover, the radius $r_T$ of a field of view is predetermined on the spectacle lens, preferably around the optical or geometric center (or around another predetermined reference point), within which ($r \leq r_T$) the color fringe is to remain below the predetermined threshold $FS_T$ (i.e. within which $|FS| \leq FS_T$ is required). Preferably, the value is $r_T = 20$ mm. However, any other value $r_T$ can be required.

Equation (23) can provide information on how great the value $(S-S_0)$ must at most be in order to not conflict with the specifications $|FS| \leq FS_T$ within the field of view with the radius $r_T$. To this end, the threshold $FS_T$ can be substituted into equation (23) and the equation can be solved with respect to $|S-S_0|$:

$$|FS(r_T)| = \left|\frac{-(S-S_0)r}{v_d}\right| \leq FS_T \Rightarrow |S-S_0| \leq v_d \frac{FS_T}{r_T} \quad (24)$$

For the preferred numerical values ($FS_T \leq 0.12$ cm/m, $r_T = 20$ mm) there yields $$|S-S_0| \leq 42.41 \times \frac{0.12 \text{ cm/m}}{20 \text{ mm}} = 2.54 \text{ dpt.}$$

This means that a grating (base grating), which corrects the color fringe of a lens with the base power $S_0 = 0$ in an ideal manner, can also be used for lenses with base powers of up to $|S| \leq 2.54$ dpt. An exemplary set of base gratings in this case only comprises those gratings that are selected fitting the base powers $S_0 = -10$ dpt, $S_0 = -5$ dpt, $S_0 = 0$, $S_0 = +5$ dpt, $S_0 = +10$ dpt. The regions 30 around each of these base powers, which have a width of $2 \times 2.54$ dpt $= 5.08$ dpt (i.e. the correction regions) overlap such that the requirements on a color fringe correction below the color fringe perception threshold can be met continuously in the power range of $-12.54$ dpt $\leq S \leq 12.54$ dpt by means of 5 base gratins. FIG. 6 schematically shows the coverage of the total power range by overlapping of the correction ranges of 5 individual base gratings.

Therefore, for rotationally symmetric single-vision lenses, a base grating system $B_G = \{S_{0G}^1, S_{0G}^2, \ldots, S_{0G}^K\}$ can be defined generally as a set of values or powers $S_0$ for which gratings are available. Preferably, a system is selected such that by an overlap of the correction ranges the total desired power range is covered. In the above case of a power range of $-12.54$ dpt $\leq S \leq 12.54$ dpt $K=5$ and the base grating system is defined as follows:

$$B_G = \{-10 \text{ dpt}, -5 \text{ dpt}, 0, +5 \text{ dpt}, 10 \text{ dpt}\} \quad (25)$$

As shown in FIG. 6, in accordance with equation (16), the maximum distance $\Delta S_{0G} := S_{0G}^{k+1} - S_{0G}^k$ between two base powers can be determined by the requirement $$|\Delta S_{0G}| \leq 2 v_d \frac{FS_T}{r_T} \quad (26)$$

In the above numerical example, this means that $$|\Delta S_{0G}| \leq 5.08 \text{ dpt} \quad (27)$$

Spherocylindrical Power Single-Vision Lenses

If the rotational symmetry is missing like in the case of single-vision lenses with cylindrical prescription, the exactly color fringe-corrected gratins would also have to be without rotational symmetry.

However, it has been found that a correction of the color fringe perceived to be optimal can also be obtained by means of a set of rotationally symmetric gratings. According to a preferred example of the invention, it is suggested using a base grating set $B_G$ of rotationally symmetric base gratings instead of a set of asymmetric base gratings. Here, it is accepted that these rotationally symmetric gratings do not correct the color fringe in the periphery of spherocylindrical single-vision lenses fully, but only to a certain extent. The remaining color fringe can be determined by applying equation (23a). However, it is also possible to use a set of non-spherical gratings.

By analogy with the creation of a base grating system for rotationally symmetric single-vision lenses, is can be generally required for the creation of a base grating system for spherocylindrical single-vision lenses that $$|FS(r)| \leq FS_T \quad (28)$$

be satisfied for all r with $|r| \leq r_T$.

In the case of equation (23a), this means that $$\left|\frac{|(S-S_0)r|}{v_d}\right| \leq FS_T \quad (28a)$$

has to be satisfied, where

S is the refractive power matrix of the prescription for the current lens; and $S_0$ is the refractive power matrix of the base lens.

This is ensured when for the two eigenvalues of $(S-S_0)$, i.e. for the two principal meridians $HS_1(S-S_0)$ and $HS_2(S-S_0)$ of $(S-S_0)$, the conditions:

$$\left|\frac{|HS_1(S-S_0)r_T|}{v_d}\right| \leq FS_T \wedge \left|\frac{|HS_2(S-S_0)r_T|}{v_d}\right| \leq FS_T \Rightarrow \quad (29)$$

$$|HS_1(S-S_0)| \leq v_d \frac{FS_T}{r_T} \wedge |HS_2(S-S_0)| \leq v_d \frac{FS_T}{r_T}$$

are met.

The matrices S and $S_0$ can be determined as follows:

$$S = \begin{pmatrix} M + J_0 & M - J_0 \\ J_{45} & J_{45} \end{pmatrix}, \quad S_0 = \begin{pmatrix} M_0 + J_{0,0} & J_{0,45} \\ J_{0,45} & M_0 - J_{0,0} \end{pmatrix}$$

M, $J_0$, $J_{45}$ are the components of the power vector $$P = \begin{pmatrix} M \\ J_0 \\ J_{45} \end{pmatrix} = \begin{pmatrix} sph + cyl/2 \\ -(cyl/2)\cos 2\alpha \\ -(cyl/2)\sin 2\alpha \end{pmatrix}$$

the lens with the grating (i.e. of the color fringe-corrected lens).

$M_0, J_{0,0}, J_{0,45}$ are the components of the power vector $$P_0 = \begin{pmatrix} M_0 \\ J_{0,0} \\ J_{0,45} \end{pmatrix} = \begin{pmatrix} sph_0 + cyl_0/2 \\ -(cyl_0/2)\cos 2\alpha_0 \\ -(cyl_0/2)\sin 2\alpha_0 \end{pmatrix}$$

of the lens with spherocylindrical (SZA) values ($sph_0$, $cyl_0$, $\alpha_0$) with respect to which the grating is optimized.

The respective power vector includes the sum of the refractive and diffractive portions of the powers of the lens.

It holds that:

$$HS_1(S-S_0) = (M-M_0) - \sqrt{(J_0-J_{0,0})^2 + (J_{45}-J_{0,45})^2}$$

$$HS_2(S-S_0) = (M-M_0) + \sqrt{(J_0-J_{0,0})^2 + (J_{45}-J_{0,45})^2} \quad (30)$$

The area of a power vector $$P = \begin{pmatrix} M \\ J_0 \\ J_{45} \end{pmatrix},$$

which satisfies equation (29), is in a double cone the axis of which is parallel to the M axis. The cone height and the base surface radius are each $$v_d \frac{FS_T}{r_T}.$$

The base surface center is determined by the power vector $$P_0 = \begin{pmatrix} M_0 \\ J_{0,0} \\ J_{0,45} \end{pmatrix}$$

of the lens with respect to which the grating is optimized.

FIG. 7 schematically shows the double-conical area of power vectors P of lenses the color fringe of which can be corrected by a diffraction grating adapted to a lens with the power vector $P_0$, in accordance with equation (20).

Consequently, for spherocylindrical single-vision lenses, a base grating system $B_G = \{P_{0G}^1, P_{0G}^2, \ldots, P_{0G}^K\}$ can generally be defined as the set of power vectors $P_0$ for which gratings are available. Preferably, a system is selected such that the power vectors are purely spherical, i.e. $J_{0,0G}^k = 0$, $1 \le k \le K$ and $J_{45,0G}^k = 0$, $1 \le k \le K$. Particularly preferably, a base grating system is selected such that by an overlap of the correction ranges, the total desired power range with respect to the spherical equivalent is covered.

If the base gratings are purely spherical, as in a preferred example, then there is the question how strongly they have to overlap so that a specific maximally existing cylinder $Zyl_{max}$ can still be covered for all relevant existing values of the spherical equivalent.

Figure 8A:
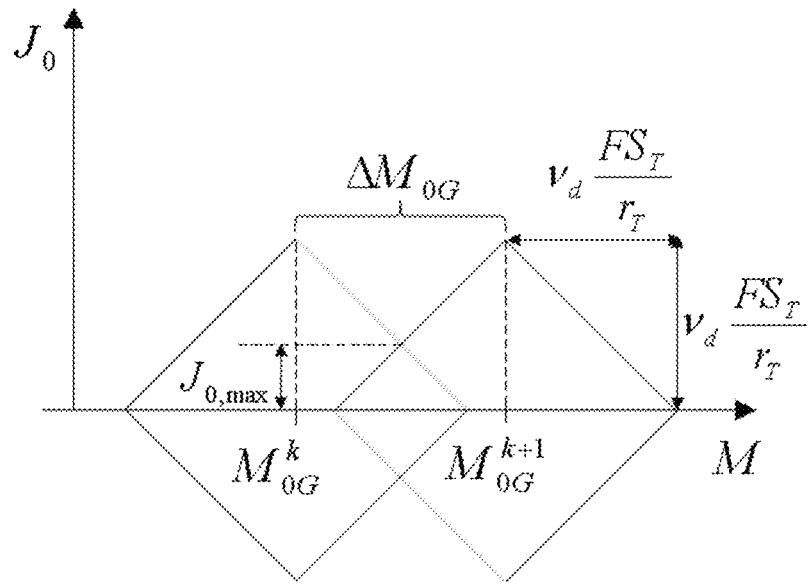
Figure 8B:
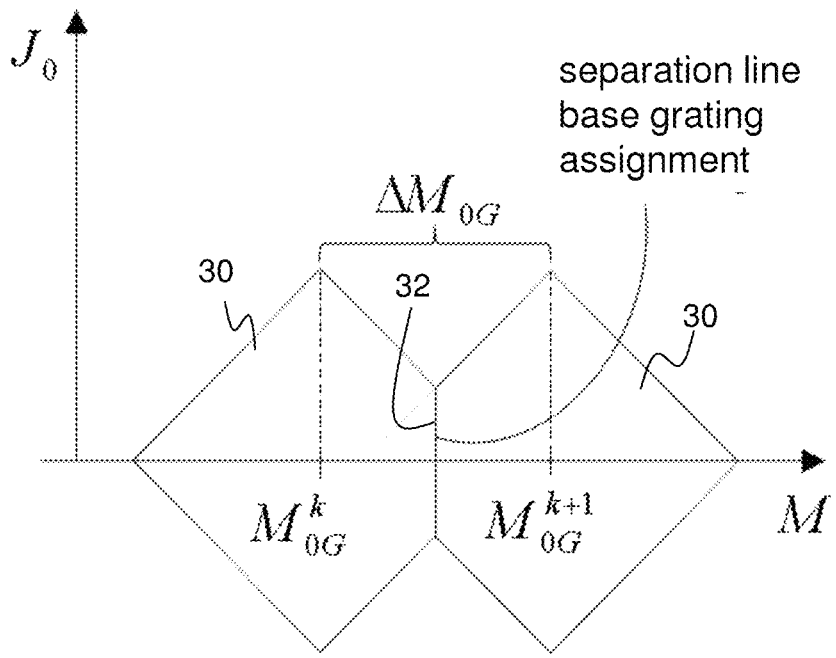

In FIG. 8, two (quadratic) ranges are illustrated in which the condition from equation (19) for the color fringe correction is satisfied when $S_0 = S_{0G}^k 1 = M_{0G}^k 1$ or $S_0 = S_{0G}^{k+1} 1 = M_{0G}^{k+1}$, wherein FIG. 8A shows the overlap of two cones (i.e. of the double-conical areas of two power vectors) in the plane for $J_{45} = 0$; and FIG. 8B shows the separation line for base grating assignment.

In the overlap area, both base gratings are possible for a color fringe correction. A preferred base grating assignment can be made such that the separation line 32 between both areas extends through the spherical equivalent $(M_{0G}^k + M_{0G}^{k+1})/2$ (cf. FIG. 8B).

As shown in FIG. 8, the distance $\Delta M_{0G}$ between the spherical equivalents of two base powers is connected with the maximally admissible cylinder $Zyl_{max}$ by $|\Delta M_{0G}| = 2v_d FS_T / r_T - Zyl_{max}$. This means that $\Delta M_{0G}$ has to satisfy the condition $$|\Delta M_{0G}| \le 2v_d \frac{FS_T}{r_T} - 2J_{0,max} = 2v_d \frac{FS_T}{r_T} - Zyl_{max} \quad (31)$$

in order for the base grating system to enable a color fringe correction within the predetermined threshold for all existing powers and cylinders.

A comparison of equation (30) with equation (26) shows that a closer overlap is required if cylindrical powers are to be covered as well. If the maximum cylinder is determined by $cyl_{max} = 4.0$ dpt, then it holds instead of equation (27) that $$|\Delta S_{0G}| \le 5.08 \text{ dpt} - 4.0 \text{ dpt} = 1.08 \text{ dpt} \quad (32a)$$

has to be demanded. To cover a power range with a strongest main portion between $-12.0$ dpt and $+12.0$ dpt according to amount and a maximum cylinder of 4.0 dpt, about 20 base gratings are required. FIG. 9 schematically shows the coverage of the complete power range of spherocylindrical lenses by 20 rotationally symmetric gratings. What is shown is a sectional view through 20 double cones in the plane $J_{45} = 0$. In comparison, only 5 base gratings are sufficient in the case of single-vision lenses without cylinder (cf. FIG. 6).

Coverage of the same power range with few base gratings can be achieved in that the base gratings themselves are already adapted to cylindrical base powers and thus are not rotationally symmetric any more. The required non-rotationally symmetric gratings can be determined on the basis of the overlap by double cones in space by analogy with the above case of rotationally symmetric gratings.

Preferably, however, coverage of the power range is achieved by purely rotationally symmetric gratings, as shown in FIGS. 8 and 9. The preferred base grating assignment is made analogously to FIG. 8B.

Another possibility of creating a base grating system with even fewer base gratings is to not demand the fulfillment of equation (19) for all spherocylindrical lenses of the power range a color fringe correction, but only for the purely spherical ones. In this case, for existing high cylinders (e.g. cylinders higher than 2 dpt), it can be accepted that the color fringe can also be above the threshold $FS_T$ within the circle with radius $r_T$ around the optical center. Instead, the base grating system can concentrate on the statistically prevailing low cylinders.

FIG. 10 shows an exemplary coverage of the purely spherical power range with 5 gratings, wherein it is accepted that there are spherocylindrical powers outside the coverage. The separation lines for the base grating assignment are illustrated with dashed lines.

Progressive Lenses

In progressive lenses, there is usually no symmetry at all. Surprisingly, it has been shown, however, that if a progressive lens has a specific spherical equivalent in its center, a diffraction grating rotationally symmetric around the optical center and fitting this value causes the color fringe outside the optical center to be corrected more or less strongly.

The extent to which the color fringe in the periphery of progressive lenses is not corrected fully will mainly depend on the deviation, described by a matrix difference, between the prescribed spherocylindrical total power and the spherocylindrical total power to which the grating is adapted. This deviation is due to:

the deviation between the prescribed spherical total power and the spherical total power to which the grating is adapted; and the deviation between the prescribed cylindrical total power and the cylindrical total power to which the grating is adapted; as well as the deviation of the local prism from the one the lens underlying the grating would have due to the power deviation and due to the peripheral astigmatism of the progressive lens.

Different from spherocylindrical single-vision lenses, a general specification or regulation for the creation of a minimum base grating system, which is consistent with a requirement like in equation (19), depends on the particulars of the spectacle lens design. According to a preferred example of the invention, however, a base grating system that covers the purely spherical portion of the power range sufficiently well, like in FIG. 6 or FIG. 10, is suggested. The preferred reference value for the selection of the base curve is the spherical equivalent of the lens in the optical center (which is e.g. the prism reference point $B_p$ for prescription prism zero and otherwise another suitable specified reference point in the lens, which can be determined numerically). Consequently, the position of this spherical equivalent in FIG. 7 determined the base grating assignment.

Another possible base grating assignment can be based on the spherical equivalent of the prescription power, which does not necessarily have to be equal to the spherical equivalent of the lens in the optical center, except in the case that the optical center is in the centration point $B_Z$ by chance.

The thus determined base gratings can each be applied to one of the surfaces (front surface, back surface, or other boundary surface) of base lenses with the base powers $S_0$. The set of base lenses with the base gratings can be present as a prefabricated set of semi-finished base lenses. In the production of spectacle lenses to be adapted to the prescription data of a spectacles wearer, a suitable semi-finished spectacle lens can be selected and the surface opposite to the surface with the base grating can be processed depending on the prescription data of the spectacles wearer.

In the following, the calculation of an optimum base grating for a specific spectacle lens with a predetermined base power by means of optimization will be described.

A determination of a diffraction grating, which serves to correct the color fringe of a predetermined spectacle lens, can be performed with the following steps, for example:

1) modeling in the wave-optical image;
2) A specific order is selected from the wave-optical intensity distribution. The grating constant is selected such that the peak of this order is wavelength-independent. This makes a color fringe correction possible. The form of the grating (e.g. the blazing angle in the case of a blazed grating) is set such that the diffraction efficiency is maximal for this order. Finally, the direction of emergence for this peak is described by a ray (geometric ray image, ray tracing);
3) Simultaneous optimization of the grating and of the refractive surface, wherein the second and higher-order image formation properties of the spectacle lens are taken into consideration with the grating. According to an aspect of the invention, a transition to geometric wavefronts and wave tracing is proposed in order to calculate the image formation properties of the spectacle lens (preferably in the wearing position) and to optimize them as required.

The first two steps are not limited to an optimization method and can also be performed independently of the third step.

Modeling in Wave-Optical Image

A crucial variable of wave optics is the distribution of amplitude and phase. By the calculation of the diffraction integral, the splitting into form and diffraction factors can be reproduced. Irrespective of how the diffraction orders can be used for color fringe correction then, it is advantageous to collect the intensity in only one single order if possible. For example, by means of a blazed grating with a specific blazing angle, it is possible, at least with a defined or predetermined design wavelength, to obtain a diffraction efficiency of basically almost 100% for the selected diffraction order. FIG. 11 shows the diffraction efficiency as a function of the wavelength. As can be taken from FIG. 11, it is possible that at the margin of the visible wavelength range, the diffraction efficiency typically still takes on values between 70% and 90%.

The form factor is a relatively wide bell function, which is centered precisely along the direction that, due to the slope of the surface portions in the grating, would already be the direction of emergence according to the classic law of refraction. Depending on the grating profile (e.g. depending on the blazing angle), this direction can be shifted to a diffraction maximum of a desired diffraction order (cf. FIG. 2). All other diffraction maxima are suppressed at the same time then. The directional dependence of the form factor applies independently of the grating constant and means that throughout the entire transition, which can be carried out by DOEs, MODs and also Fresnel gratings, light exits always near, or according to, the classic law of refraction.

Color Fringe Correction

If no diffraction grating is present, the intensity distribution will be determined by a curve, the maximum of which would be determined by the curve "F" of the form factor in FIG. 2. However, the peak would be much narrower and would be determined by the width of the single slit, which the complete lens represents. The wavelength dependency of the maximum position would then be determined by the ordinary dispersion.

This is not changed in the presence of a blazed diffraction grating, except that the width of the form factor peak now increases by orders and is determined by the single slit, which is now determined by a grating period (cf. curve "F" in FIG. 2). The dispersion behavior of this peak does not determine the intensity distribution alone any more, since it is additionally restricted by the sharp peaks of the diffraction factor. The one of the peaks that lies centrally on the form factor at an operating wavelength includes the entire intensity and de facto determines the direction of emergence of the light. The diffraction efficiency is almost 100% here. The aim is to make the position of this peak wavelength-independent, so that a color fringe correction is obtained (as this is the case in FIG. 3C for the order m=−1).

Now, if the wavelength varies, the form factor will move slowly with only little loss of diffraction efficiency over this constant peak (cf. FIG. 11).

Geometric Ray Image and Color Fringe Correction

As explained above, by suitably selecting the profile of the diffraction grating, all diffraction maxima can be neglected in favor of only one maximum. The direction of emergence of the remaining diffraction maximum can be described in the geometric ray image by the modified law of refraction n' sin φ'−n sin φ=mλ/d.

For a color fringe correction of a (local) prism, it is required for the prismatic deviation of a ray, which passes through both boundary surfaces of the prism and is deflected by the prism, to be wavelength-independent for a predetermined wavelength (design wavelength). The wavelength independence is to be understood as a vanishing derivative with respect to wavelength.

On the basis of this condition, the grating constant d can be determined, which is proportional to the Abbe number and the diffraction order and inversely proportional to the prism. Surprisingly, it has been found that the thus determined value of the grating constant is not in the order of the wavelength as expected, but at a value of greater than d≈100 µm for a prism of 4 cm/m and with an Abbe number of $v_d$=40. This can be explained by the fact that not a refractive power, but only the minor effect of color fringe correction is to be achieved.

As shown above, the diffraction order for which a color fringe correction occurs is always directed such that a reinforcement of the original prism occurs. The amount of the total prism Pr=$Pr_{ref}$+$Pr_{diff}$ is always approximately 5% to 10% higher than the amount |$Pr_{ref}$| of the purely refractive portion.

If, instead of on a prism, the color fringe is to be corrected on a lens (e.g. on a spectacle lens), the results of the color fringe correction by means of a prism can be applied to the color fringe correction of a lens by adjusting the value of d locally such that it corrects the local prism. Generally, the thus determined grating is not equidistant any more (i.e. does not have equidistant grating lines). For lenses (e.g. spectacle lenses), the now variable function d(r) varies so slowly that the model concept of periodicity used for the deduction of the wave-optical equations remains approximately valid.

Since the local prism is proportional to r according to Prentice's rule, the period d(r) of a grating to correct the color fringe of a spectacle lens can be selected to be inversely proportional to r, i.e. d(r)=A/r. Here, the constant A is proportional to the Abbe number and the diffraction order, and inversely proportional to the vertex power. By analogy with the prism, according to Prentice's rule, the amount of the vertex power is increased by 5% to 10% as well due to the diffractive contribution.

In the above approach, however, the actual wearing position of the lens is not taken into consideration. In particular, it is not taken into consideration that, in the wearing position of the lens, the prism can deviate from the prism determined according to Prentice's rule. Generally, the dependency of the period on r is therefore usually more complex. Therefore, the period d(r) can be represented in form of a power series with terms proportional to $r^2$, r, 1, 1/r, $1/r^2$, . . . . Preferably, the coefficients of the individual terms are determined by a simultaneous optimization of grating and refractive surface. However, it has been shown that in many cases, even with a complete tracing, the 1/r term dominates the other terms so strongly that these terms can basically be neglected.

These principles apply both to positive and negative lenses.

Geometric Wavefronts and Wave Tracing

In order to obtain second-order laws by means of wave tracing, an image with geometric wavefronts is introduced in addition to the above-mentioned geometric ray image. These wavefronts do not correspond to the wavefronts that describe the surfaces of same phase in the wave-optical image, but they form after selection of a diffraction order and by being introduced as surfaces with respect to which the rays of that diffraction order are vertical, or perpendicular.

In this image, the diffraction grating (also referred to as a diffractive optical element or DOE) plays the role of a phase grating which, depending on r, more generally depending on the coordinates x,y, introduces a phase function ψ(x,y) that is added to the optical wavelength of rays passing through. The function ψ(x,y) is introduced such that the rays that are perpendicular to the surfaces of constant optical wavelength then automatically satisfy the diffractive law of refraction n' sin φ'−n sin φ=mλ/d or its vector extension. As has been found out, the gradient of ψ(x,y) has to satisfy the condition |∇ψ|=mλ/d then.

Surprisingly, it has also been shown that a diffractive generalization of the Coddington equations exists, according to which the power vector of the surface power (except for/up to a prefactor) is extended additively by a vector consisting of the three second derivatives $ψ_{xx}$, $ψ_{xy}$, $ψ_{yy}$.

The passage of light through an arbitrary optical element, which can comprise several optical components, or through an arbitrary optical system 100 can be described on the basis of ray tracing and wavefront tracing, as is schematically shown in FIG. 12 and FIG. 13. Here, the object of ray tracing is to calculate, for a predetermined optical element/system 100, the outgoing ray 108 going out of the element/system at the exit surface 106 from an incident ray 102 existing up to the entrance surface 104 of the optical element/system. The object of wavefront tracing is to calculate, for a predetermined optical element/system 100, the outgoing wavefront 112 at the exit surface 106 of the element/system 100 from an incident wavefront 110 existing at the entrance surface 104 of the optical element/system 100. The object of local wavefront tracing is to calculate, for a predetermined optical element/system 100, the local properties of the outgoing wavefront 112 at the exit surface 112 of the element/system 100 from the local properties of an incident wavefront 112 existing at the entrance surface 104 of the optical element 100.

An optical element or optical system can be comprised of an arbitrary sequence of thin boundary surfaces, homogeneous materials, or inhomogeneous materials. In particular, an optical element (such as a spectacle lens, as shown in FIG. 13) can be comprised of the sequence of a curved refractive boundary surface 104 from air into a denser homogeneous material 114, the passage 116 through the material, and a second curved refractive boundary surface 106 back into air. FIG. 13 schematically shows the ray tracing and the wavefront tracing through such an optical element.

To improve optical elements or optical systems, in particular spectacle lenses, it may be advantageous to additionally introduce optical components into the ray path, which are based on other physical effects than a mere refraction at a curved boundary surface. For example, it has been suggested that diffractive optical elements be used, to which diffraction effects are of importance. In particular, such an element can be phase-delaying or phase-modulating, in fact such that by adding the element, the change of the optical path length depends on the penetration point of the ray.

However, methods allowing performing a precise tracing of the properties (in particular the image formation properties) of optical elements, which also comprise diffractive optical components, in particular taking a predetermined wearing position of the optical element into consideration, have not been known so far.

An extended wavefront tracing for the case of complex optical elements, which have at least one diffraction grating, will be described in detail in the following. The method can also be considered an extension of the wavefront tracing through purely refractive boundary surfaces, which is known from document WO 2008/089999A1, for the case of complex optical systems with at least one diffraction grating.

The most elementary description of a second-order wavefront tracing through a purely refractive boundary surface is known from the prior art (cf. e.g. the textbook "Optik und Technik der Brille" of H. Diepes and R. Blendowske, 2002 Optische Fachveröffentlichung GmbH, Heidelberg, pages 485 ff.) as the so-called BAD equation, or also vergence equation. In the case of a rotationally symmetric refractive surface and with a vertical, or perpendicular, incidence of rays, the BAD equation (vergence equation) reads as follow:

$$B = A + D. \tag{101}$$

Here, A is the vergence (i.e. a measure for the local wavefront curvature) of the incident wavefront, B is the vergence of the outgoing wavefront, and D is the surface power of the refractive surface.

If the requirements for rotational symmetry are not met, the BAD equation will be written vectorially for merely refractive surfaces according to the prior art (cf. e.g. the above-cited textbook "Optik und Technik der Brille"), i.e.

$$B = A + D. \tag{102}$$

Here, A is the power vector form of the vergence matrix of the incident wavefront, B is the power vector form of the vergence matrix of the outgoing wavefront, and D is the power vector form of the surface power matrix of the refractive surface. Instead of a power vector, linear combinations of power vector components, which have been combined to form a new vector, can be used as well. In particular, the normal curvatures and the torsion, i.e. the second derivatives with respect to transverse coordinates and the mixed derivative, can be used.

Instead of the symbols A and A, B and B, as well as D and D, the following symbols are often used:
A and A→S and S
B and B→S' and S'
D and D→F and F Accordingly, the equations (101) and (102) then read S'=S+F and S'=S+F If the incidence of rays is not perpendicular, further modifications of the BAD equation can be introduced for purely refractive boundary surfaces according to the prior art, with which the wavefront passage can again be described precisely (cf. e.g. G. Esser, W. Becken, W. Müller, P. Baumbach, J. Arasa, and D. Uttenweiler, "Derivation of the refraction equations for higher-order aberrations of local wavefronts at oblique incidence", JOSA. A, vol. 27, no. 2, February 2010, pages 218-237). These modifications are the Coddington equation and the generalized Coddington equation for second and higher-order aberrations. In particular, the publication of G. Esser et al. describes the power vector form of the generalized Coddington equation for second and higher-order aberrations.

The equations (in power vector form) known from the prior art for second and higher-order wavefront tracings in the case of a passage through a purely refractive boundary surface are summarized in table 1:

TABLE 1

| | vertical incidence + rotational symmetry | vertical incidence without rotational symmetry | no symmetry |
|---|---|---|---|
| $2^{nd}$ order | $S'^{(2)} = S^{(2)} + F^{(2)}$ alternative notation: $S' = S + F$ $B = A + D$ | $S'^{(2)} = S^{(2)} + F^{(2)}$ alternative notation: $S' = S + F$ $B = A + D$ | $T'_2 S'^{(2)} = T_2 S^{(2)} + vF^{(2)}$ |
| $3^{rd}$ order | $S'^{(3)} = S^{(3)} + F^{(3)} + R_3(S^{(2)}, F^{(2)})$ | $S'^{(3)} = S^{(3)} + F^{(3)} + R_3(S^{(2)}, F^{(2)})$ | $T'_3 S'^{(3)} = T_3 S^{(3)} + vF^{(3)} + Q_3(S^{(2)}, F^{(2)})$ |
| $4^{th}$ order | $S'^{(4)} = S^{(4)} + F^{(4)} + R_4(S^{(3)}, F^{(3)}, S^{(2)}, F^{(2)})$ | $S'^{(4)} = S^{(4)} + F^{(4)} + R_4(S^{(3)}, F^{(3)}, S^{(2)}, F^{(2)})$ | $T'_4 S'^{(4)} = T_4 S^{(4)} + vF^{(4)} + Q_4(S^{(3)}, F^{(3)}, S^{(2)}, F^{(2)})$ |
| etc. | | | |

Tables 1A to 1C include explanations on the equations for the second order listed in table 1 (table 1A), for the third order (table 1B), and for the fourth order (table 1C).

TABLE 1A

| | |
|---|---|
| $S^{(2)} = nW_{In}^{(2)}(0)$ | vergence of the incident wavefront: refractive index on the incidence side multiplied by the second derivative of the vertex depth of the incident wavefront |
| $S'^{(2)} = n'W'_{Out}^{(2)}(0)$ | vergence of the outgoing wavefront: refractive index on the emergence side multiplied by the second derivative of the vertex depth of the outgoing wavefront |
| $F^{(2)} = (n' - n)\overline{S}^{(2)}(0)$ | surface power of the refractive surface: refractive index difference multiplied by the second derivative of the vertex depth of the refractive surface |
| S and A | vergence of the incident wavefront |
| S' and B | vergence of the outgoing wavefront |
| F and D | surface power of the refractive surface |
| $S^{(2)} = n \begin{pmatrix} W_{In}^{(2,0)}(0,0) \\ W_{In}^{(1,1)}(0,0) \\ W_{In}^{(0,2)}(0,0) \end{pmatrix}$ | refractive index on the incidence side multiplied by the power vector of the second derivative of the vertex depth of the incident wavefront |

TABLE 1A-continued

| | |
|---|---|
| $S'^{(2)} = n' \begin{pmatrix} W'^{(2,0)}_{Out}(0,0) \\ W'^{(1,1)}_{Out}(0,0) \\ W'^{(0,2)}_{Out}(0,0) \end{pmatrix}$ | refractive index on the emergence side multiplied by the power vector of the second derivative of the vertex depth of the outgoing wavefront |
| $F^{(2)} = (n'-n) \begin{pmatrix} \overline{S}^{(2,0)}(0,0) \\ \overline{S}^{(1,1)}(0,0) \\ \overline{S}^{(0,2)}(0,0) \end{pmatrix}$ | refractive index difference multiplied by the power vector of the second derivative of the vertex depth of the refractive surface |
| S and A | power vector of the vergence of the incident wavefront |
| S' and B | power vector of the vergence of the outgoing wavefront |
| F and D | power vector of the surface power of the refractive surface |
| $T_2$ | incidence angle-dependent matrix for correction of oblique incidence |
| $T'_2$ | emergence angle-dependent matrix for correction of oblique incidence |
| $v = n'\cos \phi' - n \cos \psi$ | factor for correction of oblique incidence |

TABLE 1B

| | |
|---|---|
| $S^{(3)} = nW_{In}^{(3)}(0)$ | refractive index on the incidence side multiplied by the third derivative of the vertex depth of the incident wavefront |
| $S'^{(3)} = n'W'_{Out}^{(3)}(0)$ | refractive index on the emergence side multiplied by the third derivative of the vertex depth of the outgoing wavefront |
| $F^{(3)} = (n'-n)\overline{S}^{(3)}(0)$ | refractive index difference multiplied by the third derivative of the vertex depth of the refractive surface |
| $S^{(3)} = n \begin{pmatrix} W^{(3,0)}_{In}(0,0) \\ W^{(2,1)}_{In}(0,0) \\ W^{(1,2)}_{In}(0,0) \\ W^{(0,3)}_{In}(0,0) \end{pmatrix}$ | refractive index on the incidence side multiplied by the power vector of the third derivative of the vertex depth of the incident wavefront |
| $S'^{(3)} = n' \begin{pmatrix} W'^{(3,0)}_{Out}(0,0) \\ W'^{(2,1)}_{Out}(0,0) \\ W'^{(1,2)}_{Out}(0,0) \\ W'^{(0,3)}_{Out}(0,0) \end{pmatrix}$ | refractive index on the emergence side multiplied by the power vector of the third derivative of the vertex depth of the outgoing wavefront |
| $F^{(3)} = (n'-n) \begin{pmatrix} \overline{S}^{(3,0)}(0,0) \\ \overline{S}^{(2,1)}(0,0) \\ \overline{S}^{(1,2)}(0,0) \\ \overline{S}^{(0,3)}(0,0) \end{pmatrix}$ | refractive index difference multiplied by the power vector of the third derivative of the vertex depth of the refractive surface |
| $T_3$ | incidence angle-dependent matrix for correction of oblique incidence |
| $T'_3$ | emergence angle-dependent matrix for correction of oblique incidence |
| $v = n'\cos \phi' - n \cos \psi$ | factor for correction of oblique incidence |
| $R_3(S^{(2)}, F^{(2)})$ | additional term that only depencds on the lower-order (here $2^{nd}$ order) variables |
| $R_3(S^{(2)}, F^{(2)})$ | vectorial additional term that only depends on the lower-order (here $2^{nd}$ order) variables |
| $Q_3(S^{(2)}, F^{(2)})$ | vectorial additional term that considers the oblique incidence and only depends on the lower-order (here $2^{nd}$ order) variables |

TABLE 1C

| | |
|---|---|
| $R_4(S^{(3)}, F^{(3)}, S^{(2)}, F^{(2)})$ | additional term that only depends on the lower-order (here $2^{nd}$ and $3^{rd}$ order) variables |
| $R_4(S^{(3)}, F^{(3)}, S^{(2)}, F^{(2)})$ | vectorial additional term that only depends on the lower-order (here $2^{nd}$ and $3^{rd}$ order) variables |
| $Q_4(S^{(3)}, F^{(3)}, S^{(2)}, F^{(2)})$ | vectorial additional term that considers the oblique incidence and only depends on the lower-order (here $2^{nd}$ and $3^{rd}$ order) variables |

The form of the additional terms $R_3(S^{(2)},F^{(2)})$, $R_3(S^{(2)},F^{(2)})$, $Q_3(S^{(2)},F^{(2)})$ is further described in the publication [G. Esser, W. Becken, W. Müller, P. Baumbach, J. Arasa, and D. Uttenweiler, "Derivation of the refraction equations for higher-order aberrations of local wavefronts at oblique incidence", JOSA. A, vol. 27, no. 2, February 2010, pages 218-237]. These terms disappear as soon as the lower-order terms $S^{(2)},F^{(2)}$ and $S^{(2)},F^{(2)}$ disappear or are equal to zero.

The further explanations on the $4^{th}$ order, etc., are analogous to the explanations on the $2^{nd}$ and $3^{rd}$ orders.

Surprisingly, it has been shown that the equations describing the second and higher-order wavefront tracing by ordinary refractive boundary surfaces can be modified in a comparatively simple way, so that also diffractive optical elements or diffraction gratings can be taken into account. Here, either the passage of light through an isolated diffraction grating or the passage through a directly consecutive combination of a diffraction grating or a refractive boundary surface can be described.

Moreover, it has turned out that a generally vectorial variable $PK^{(k)}$, k=2, 3, 4, . . . , hereinafter referred to as a phase curvature (for k=2) or as phase derivatives (for k>2), can be assigned to any arbitrary, non-rotationally symmetric diffraction grating even under arbitrary, oblique-angled ray incidence conditions, so that the corresponding BAD equation and the higher-order equations for refractive surfaces substantially only have to be extended additively by the additional term $PK^{(k)}$, k=2, 3, 4, . . . in order to correctly describe the vergences for the wavefront passage in the presence of a non-rotationally symmetric diffraction grating.

In other words, however asymmetric a situation may be for which the wavefront tracing could be described precisely for merely refractive surfaces, it is sufficient to extend the corresponding equation substantially only by an additive additional term PK in order to also describe the diffraction grating correctly.

Further, it has been found that the vergence of the outgoing wavefront is independent of the order in which the refractive surface and the diffraction grating succeed one another.

In the case of a second-order wavefront tracing (i.e. for k=2) for a rotationally symmetric diffraction grating and with a vertical, or perpendicular, incidence of rays, equation (101) is extended additively by the additional term $PK^{(2)}$ in order to correctly describe the vergences for the wavefront passage also in the presence of a diffraction grating:

$$B = A + D + PK^{(2)}. \quad (103)$$

However, equation (101) is only valid exactly for the case that the ray impinges vertically, or perpendicularly, on the refractive surface and that the incident wavefront and the refractive surface are rotationally symmetric. But equation (101) is still a good approximation also for deviations from these prerequisites. Analogously, equation (103) is a good approximation in the presence of a diffraction grating.

In the case of a second-order wavefront tracing (i.e. for k=2) for a non-rotationally symmetric diffraction grating and with a vertical, or perpendicular, incidence of rays, the diffraction grating can be assigned a vectorial variable $PK^{(2)}$, so that the corresponding vectorial BAD equation only has to be extended additively by the vectorial additional term $PK^{(2)}$ in order to correctly describe the vergences for the wavefront passage in the presence of a non-rotationally symmetric diffraction grating. In this case, it holds that $$B = A + D + PK^{(2)}. \quad (104)$$

As will be explained in detail in the following, a generally vectorial variable $PK^{(k)}$ can be assigned to any arbitrary, non-rotationally symmetric diffraction grating even under arbitrary, oblique-angled ray incidence conditions, so that the corresponding general BAD equation and the higher-order equations for the wavefront tracing through refractive surfaces substantially only have to be extended additively by the additional term $PK^{(k)}$ ($PK^{(2)}, PK^{(3)} PK^{(4)}, \ldots$) in order to correctly describe the vergences for the wavefront passage in the presence of a non-rotationally symmetric diffraction grating.

Moreover, is has been shown that the components of the additive additional term $PK^{(k)}$ can be described by the vector of the second or higher-order derivatives of a phase function $\Psi(\bar{x}, \bar{y})$ with respect to the coordinates $\bar{x}, \bar{y}$ tangentially to the refractive surface (base surface). It holds for the additive second-order additional term that:

$$PK^{(2)} = -\begin{pmatrix} \Psi^{(2,0)}(0,0) \\ \Psi^{(1,1)}(0,0) \\ \Psi^{(0,2)}(0,0) \end{pmatrix} = -\begin{pmatrix} \partial^2 \Psi(\bar{x}, \bar{y})/\partial \bar{x}^2 \\ \partial^2 \Psi(\bar{x}, \bar{y})/\partial \bar{x} \partial \bar{y} \\ \partial^2 \Psi(\bar{x}, \bar{y})/\partial \bar{y}^2 \end{pmatrix}\Bigg|_{(\bar{x},\bar{y})=(0,0)} \quad (105)$$

For this reason, the additive second-order additional term $PK^{(2)}$ is also referred to as a "phase curvature".

The phase function $\Psi(\bar{x}, \bar{y})$ represents the optical path length difference (optical path difference or OPD), which is introduced by the diffraction grating, as a function of the coordinates $\bar{x}, \bar{y}$ tangentially to the refractive surface. The description of a diffraction grating by the phase function $\Psi(\bar{x}, \bar{y})$ allows determining the additive additional term $PK^{(k)}$ ($PK^{(2)}, PK^{(3)}, PK^{(4)}, \ldots$) constructively. Put differently, it is suggested that a phase function $\Psi(\bar{x}, \bar{y})$ be used to describe an arbitrary diffraction grating, the additive additional term $PK^{(k)}$ ($PK^{(2)}, PK^{(3)}, PK^{(4)}, \ldots$) being determined by the vector of the second and higher-order derivatives of the phase function with respect to the coordinates $\bar{x}, \bar{y}$ tangentially to the refractive surface (cf. equation (105) for k=2).

Table 2 summarizes the equations and wavefront equations (in power vector form) for the wavefront tracing in the case of a passage through a refractive boundary surface (base surface), to which a phase-modifying optical element is applied in addition. Tables 2A and 2B include explanations on the $2^{nd}$ order (table 2A) and $3^{rd}$ order (table 2B) equations listed in table 1.

TABLE 2

|  | vertical incidence + rotational symmetry | vertical incidence without rotational symmetry | no symmetry |
|---|---|---|---|
| $2^{nd}$ order | $S'^{(2)} = S^{(2)} + F^{(2)} - \Psi^{(2)}$<br>alternative notation:<br>$S' = S + F + PK^{(2)}$<br>$B = A + D + PK^{(2)}$ | $S'^{(2)} = S^{(2)} + F^{(2)} - \Psi^{(2)}$<br>alternative notation:<br>$S' = S + F + PK^{(2)}$<br>$B = A + D + PK^{(2)}$ | $T'_2 S'^{(2)} = T_2 S^{(2)} + vF^{(2)} - \Psi^{(2)}$<br>alternative notation:<br>$T'_2 S'^{(2)} = T_2 S^{(2)} + vF^{(2)} + PK^{(2)}$ |
| $3^{rd}$ order | $S'^{(3)} = S^{(3)} + F^{(3)} - \Psi^{(3)} + R_3(S^{(2)}, F^{(2)})$<br>alternative notation:<br>$PK^{(3)} = -\Psi^{(3)}$ | $S'^{(3)} = S^{(3)} + F^{(3)} - \Psi^{(3)} + R_3(S^{(2)}, F^{(2)})$<br>alternative notation:<br>$PK^{(3)} = -\Psi^{(3)}$ | $T'_3 S'^{(3)} = T_3 S^{(3)} + vF^{(3)} - \Psi^{(3)} + Q_3(S^{(2)}, F^{(2)})$<br>alternative notation:<br>$PK^{(3)} = -\Psi^{(3)}$ |
| $4^{th}$ order | $S'^{(4)} = S^{(4)} + F^{(4)} - \Psi^{(4)} + R_4(S^{(3)}, F^{(3)}, S^{(2)}, F^{(2)})$<br>alternative notation:<br>$PK^{(4)} = -\Psi^{(4)}$ | $S'^{(4)} = S^{(4)} + F^{(4)} - \Psi^{(4)} + R_4(S^{(3)}, F^{(3)}, S^{(2)}, F^{(2)})$<br>alternative notation:<br>$PK^{(4)} = -\Psi^{(4)}$ | $T'_4 S'^{(4)} = T_4 S^{(4)} + vF^{(4)} - \Psi^{(4)} + Q_4(S^{(3)}, F^{(3)}, S^{(2)}, F^{(2)})$<br>alternative notation:<br>$PK^{(4)} = -\Psi^{(4)}$ |
| etc. | | | |

TABLE 2A

| | |
|---|---|
| $\Psi^{(2)} = \Psi^{(2)}(0)$ | second derivative of the phase function |
| $PK^{(2)} = -\Psi^{(2)}(0)$ | phase curvature, i.e. negative second derivative of the phase function |
| $\Psi^{(2)} = \begin{pmatrix} \Psi^{(2,0)}(0,0) \\ \Psi^{(1,1)}(0,0) \\ \Psi^{(0,2)}(0,0) \end{pmatrix}$ | power vector of the second derivatives of the phase function |
| $PK^{(2)} = -\Psi^{(2)}(0,0)$ | power vector of the phase curvature, i.e. the negative second derivatives of the phase function |

TABLE 2B

| | |
|---|---|
| $\Psi^{(3)} = \Psi^{(3)}(0)$ | third derivative of the phase function |
| $PK^{(3)} = -\Psi^{(3)}(0)$ | additional term according to the invention, determined by negative third derivative of the phase function |
| $\Psi^{(3)} = \begin{pmatrix} \Psi^{(3,0)}(0,0) \\ \Psi^{(2,1)}(0,0) \\ \Psi^{(1,2)}(0,0) \\ \Psi^{(0,3)}(0,0) \end{pmatrix}$ | power vector of the third derivatives of the phase function |
| $PK^{(3)} = -\Psi^{(3)}(0,0)$ | vertical additional term according to the invention, determined by the power vector of the negative third derivatives of the phase function |

The equations for the $4^{th}$ order and all higher orders are made up analogously.

The coordinate system $\bar{x}, \bar{y}, \bar{z}$ is a local coordinate system, which serves to describe the passage of a ray through a boundary surface, wherein it holds at the penetration point of the main ray with the boundary surface that $(\bar{x}, \bar{y}, \bar{z}) = (0,0,0)$, and wherein the $\bar{z}$ axis is perpendicular to the base surface. A special possible choice of such a local system is to require that the incident ray be e.g. in the $\bar{x}$-$\bar{z}$ plane or in the $\bar{y}$-$\bar{z}$ plane. In general, however, this condition does not necessarily have to be satisfied. The use of local coordinate systems is known from WO 2008/089999 A1, for example, and is used in second-order wavefront tracing through surfaces without diffraction gratings. Typically, use is made of as many local systems as main rays are to be calculated. Further, a global coordinate system can be used.

Moreover, it has been found that a connection can be established between the grating lines of the diffractive optical element or the diffraction grating and the phase function $\Psi(\bar{x}, \bar{y})$, which is based on the fact that the grating lines lie on curves with $\Psi(\bar{x},\bar{y})=$const. The determination of the phase function $\Psi(\bar{x},\bar{y})$ on the basis of parameters of the diffraction grating will be described in detail in the following.

Moreover, it has been found that different from a refraction at a merely refractive boundary surface (such as described in WO 2008 089999 A1), the incident main ray, the outgoing main ray, and the normal vector of the refractive surface generally will not have to be in one and the same plane any more if a diffraction grating is present.

In the simplest case of a refractive, homogeneous boundary surface between two media with the refractive indices n and n' without diffractive optical elements or diffraction gratings, the ray deviation is described by the law of refraction n' sin $\phi'$ − n sin $\phi$=0, where $\phi$ is the angle of incidence and $\phi'$ is the angle of emergence.

FIG. 14 schematically illustrates the ray path upon diffraction on a boundary surface 120 with a diffraction grating 122 in a special simple case in which it is possible to describe the ray deviation by a closed law. This law can be understood to be a modification of this law of refraction. This case is characterized in that the refractive surface 120 is a plane and that the diffraction grating 122 is an irregularity of this surface 120, which is translation-invariant perpendicular to the plane of incidence 124 and equidistant with period d in the direction of the plane of refraction (the plane of the refractive surface 120) (cf. FIG. 14). The irregularity can be a blazed grating, a rectangular grating, an alternation of translucent and opaque zones, or any other deviation from the homogeneous, plane, translucent, refractive surface. In this simple case, an incident monochromatic ray 102, which belongs to light with the wavelength $\lambda$, is split into many individual rays 108-$m$, which belong to the different diffraction order m, m= . . . , −2, −1, 0, 1, 2, . . . , by diffraction. The diffraction order m can be selected arbitrarily, but fixedly, and the situation for the ray pertaining to the diffraction order m can be described in an isolated manner, i.e. irrespective of the possible other diffraction orders, in the following. For a ray pertaining to the diffraction order m, the modified law of refraction applies n' sin $\phi'$−n sin $\phi$=m$\lambda$/d, where n and n' designate the refractive index of the material before and after the boundary surface 120, $\phi$ is the angle of incidence, and $\phi'$ is the angle of emergence.

For every more general case, e.g. for rays being incident obliquely to the grating lines, for a non-equidistant grating and/or for a grating with curved grating lines and/or for a curved surface, no comprehensive laws on ray deviation and wavefront calculation have been known so far. In order to be able to calculate or optimize an optical element with arbitrary, in particular aspherical surfaces and at least one diffraction grating in the wearing position taking the second-order aberrations (e.g. refractive power and astigmatism) and optionally higher-order aberrations (e.g. coma or spherical aberration) into consideration, it is advantageous to also be able to perform exact wavefront tracing also for the general case.

In the following, the principles of ray and wavefront tracing in the general case of an optical element or an optical system (e.g. a spectacle lens) with a diffraction grating will be described in more detail.

Coordinate Systems

First of all, variables capable of describing a boundary surface including at least one diffraction grating as generally as possible will be introduced. To this end, by analogy with the case of merely refractive surfaces, two types of coordinates or coordinate systems are used in principle.

One type is global coordinates $\bar{x}^0, \bar{y}^0, \bar{z}^0$, which serve to describe the base surface (i.e. the merely refractive surface without the diffraction grating by its vertex depth $\bar{z}^0(\bar{x}^0,\bar{y}^0)$. Here, the possibly existing vertex depth of the diffraction grating is not added to the vertex depth of the base surface. Instead, the diffraction grating itself is described by a separate property $h(\bar{x}^0,\bar{y}^0)$. Here, $h(\bar{x}^0,\bar{y}^0)$ can play the role of an additional vertex depth, so that the real (microscopic) physical vertex depth of the base surface is determined by $\bar{z}_m^0(\bar{x}^0,\bar{y}^0) = \bar{z}^0(\bar{x}^0,\bar{y}^0)+h(\bar{x}^0,\bar{y}^0)$. However, it is possible for $h(\bar{x}^0,\bar{y}^0)$ to play the role of a transmission property or another property of the POE.

The other type of coordinates is—as described above—local coordinates $\bar{x},\bar{y},\bar{z}$, which serve to describe the passage of a ray through the boundary surface such that $(\bar{x},\bar{y},\bar{z})=(0,0,0)$ applies at the penetration point and that the z axis is perpendicular to the base surface there. A special possible choice of such a local system is to require that the incident ray be e.g. in the $\bar{x}$-$\bar{z}$ plane or in the $\bar{y}$-$\bar{z}$ plane, for example. In general, however, this condition does not necessarily have to be satisfied. The use of local systems is known from WO 2008/089999 A1, for example, and is used in second-order wavefront tracing through surfaces without a diffraction grating. Typically, use is made of only a global coordinate system, but of as many local systems as main rays are to be calculated.

FIG. 14A illustrates the position of the coordinate system x,y,z of the incident wavefront with respect to the coordinate system $\bar{x},\bar{y},\bar{z}$ of the refractive surface (base surface), expressed by the angles $\phi_x$, $\phi_y$, $\phi$, and $\chi$.

For the sake of simplicity, FIG. 14A only shows the coordinate system of the incident wavefront and the coordinate system of the refractive surface. The coordinate system x',y',z' of the outgoing wavefront can be specified by analogy with the coordinate system of the incident wavefront. Moreover, reference is made to FIG. 1 of the publication [G. Esser, W. Becken, W. Müller, P. Baumbach, J. Arasa, and D. Uttenweiler, "Derivation of the refraction equations for higher-order aberrations of local wavefronts at oblique incidence", JOSA. A, vol. 27, no. 2, February 2010, pages 218-237], which shows a two-dimensional representation of the corresponding mutual position for all three coordinate systems.

Description of a Diffraction Grating by the Phase Function $\Psi(\bar{x},\bar{y})$ The phase function $\Psi(\bar{x},\bar{y})$ represents the optical path length difference (optical path difference or OPD), which is introduced by the diffraction grating, as a function of the coordinates $\bar{x},\bar{y}$ tangentially to the refractive surface (base surface). The phase function $\Psi(\bar{x},\bar{y})$ can be determined by means of the grating lines. Conversely, with a predetermined phase function, it is possible to determine the grating lines of the corresponding diffraction grating.

In the simplest case of a constant, equidistant diffraction grating 122 on a plane surface 120 (cf. e.g. FIG. 14 and FIG. 15), which is described in global coordinates by $\bar{z}^0(\bar{x}^0,\bar{y}^0)=a_x \bar{x}^0+a_y \bar{y}^0+t$, it is possible to differentiate between a single-periodic and a double-periodic grating.

In a single-periodic grating, a period vector $d_1$ exists, so that $$h(\vec{r}^0 + d_1) = h(\vec{r}^0) \tag{106a}$$

holds for all points $\vec{r}^0 = (\overline{x}^0, \overline{y}^0)$. Moreover, there exists a direction with translation invariance, i.e. a vector v with $$h(\vec{r}^0 + \alpha v) = h(\vec{r}^0) \tag{106b}$$

for all $\alpha$.

In such a case, the grating lines 112a face toward v, whereas $d_1$ does not necessarily have to describe the distance between the grating lines 122a, since $d_1$ does not necessarily have to be perpendicular to v. In such a case, the vector $d_1$ can be replaced by the vector with the components $$d = \begin{pmatrix} d_x \\ d_y \end{pmatrix},$$

which is defined by $$d = d_1 - (d_1 \cdot v)v \tag{107}$$

This vector d is perpendicular to v and it holds that $$\begin{aligned} h(\vec{r}^0 + d) &= h(\vec{r}^0 + d_1 - (d_1 \cdot v)v) \\ &= h(\vec{r}^0 + d_1 - \alpha v) \\ &= h(\vec{r}^0 + d_1) \\ &= h(\vec{r}^0) \end{aligned} \tag{108}$$

so that the vector d is also a period vector. However, in contrast to $d_1$, the vector d also indicates the distance between two grating lines (cf. FIG. 15). The grating period is determined by the amount $d = |d|$.

In a single-periodic grating 122, as shown in FIG. 15, for example, two further period vectors of practical importance exist in addition. They depend on the coordinate system and are determined by the vectors $$\delta_x = \begin{pmatrix} \delta_x \\ 0 \end{pmatrix}, \delta_y = \begin{pmatrix} 0 \\ \delta_y \end{pmatrix}, \tag{109}$$

which face toward the coordinate axes (cf. FIG. 15). The connection between d and the vectors $\delta_x, \delta_y$ is determined by:

$$\delta_x = \frac{|d|^2}{d_x}, \delta_y = \frac{|d|^2}{d_y}, \tag{110a}$$

and $$d_x = \frac{\delta_x \delta_y^2}{\delta_x^2 + \delta_y^2}, d_y = \frac{\delta_y \delta_x^2}{\delta_x^2 + \delta_y^2} \tag{110b}$$

In a double-periodic grating 122, two period vectors $d_1, d_2$ with $$h(\vec{r}^0 + d_1) = h(\vec{r}_S)$$

$$h(\vec{r}^0 + d_2) = h(\vec{r}_S) \tag{111}$$

exist. Double-periodic within this scope means that there is no translation invariance in any direction, i.e. there is no vector v with $h(\vec{r}^0 + \alpha v) = h(\vec{r}_S)$ for all $\alpha$.

From an inspection of the wave optics, one can say that a plane monochromatic wave of the wavelength $\lambda$, which is incident on a single- or double-periodic grating in an oblique manner, leads to a direction-dependent intensity distribution on the side of emergence due to interference. This distribution can be represented as a product of two direction-dependent factors, wherein said one factor (the form factor) is only determined by the form of the diffraction grating within the grating period, and the second factor (the grating or diffraction factor) is determined only by the grating periodicity. The second factor takes on a maximum in each of such directions in which the path difference between two points of the wave field on the boundary surface, which are displaced by one grating period, is an integer multiple of the wavelength of the light on the side of emergence.

If, in the image of the geometric ray optics, the incident wave field is assigned the directional vector $$N = \begin{pmatrix} \sin\varphi_x \\ \sin\varphi_y \\ \sqrt{1 - \sin^2\varphi_x - \sin^2\varphi_y} \end{pmatrix} \tag{112a}$$

and, on the side of emergence of each direction in which a maximum of the grating factor exists, a directional vector of the form $$N' = \begin{pmatrix} \sin\varphi'_x \\ \sin\varphi'_y \\ \sqrt{1 - \sin^2\varphi'_x - \sin^2\varphi'_y} \end{pmatrix} \tag{112b}$$

then the rays will be described by the laws $$n' \sin\varphi'_x - n\sin\varphi_x = \frac{m_x \lambda}{\delta_x}$$

$$n' \sin\varphi'_y - n\sin\varphi_y = \frac{m_y \lambda}{\delta_y} \tag{113}$$

where $m_x = \ldots -3, -2, -1, 0, 1, 2, 3, \ldots$ and $m_y = \ldots, -3, -2, -1, 0, 1, 2, 3, \ldots$ are integers. The laws (113) can be considered to be the extended laws of refraction in the presence of a diffraction grating. In particular, the case $m_x = 0$, $m_y = 0$, i.e. the zeroth diffraction order, describes the situation without diffraction elements.

In a double-periodic diffraction element, all integers $m_x, m_y$ can be found independent of each other. In a single-periodic grating, only diffraction orders $m_x = \sigma \cdot m_y$ of the same amount can be found, where $\sigma = +1$ applies to the case that the grating lines decrease for increasing values of $\overline{x}^0$ (such as in FIG. 15, $\partial \overline{y}^0 / \partial \overline{x}^0 < 0$) and $\sigma = -1$ applies in the case of increasing grating lines ($\partial \overline{y}^0 / \partial \overline{x}^0 > 0$).

In the following, single-periodic diffraction gratings ($m := m_x = \sigma \cdot m_y$) will be discussed. However, all calculations can be modified accordingly for the case of double-periodic diffraction gratings.

The equation (113) with $m := m_x = \sigma \cdot m_y$ on the right side can be interpreted such that two rays, which are refracted at two neighboring grating lines, have a non-vanishing path difference, i.e. a phase difference proportional to m and proportional to $\lambda$. Thus, there is the possibility of characterizing the course of the grating lines, namely on the one hand by grating properties that can be measured (e.g. with a microscope) and are based on the vector d, and on the other hand by the abstract property of introducing an additional location-dependent path difference into the ray path. In the second case, the course of the grating lines is determined by the difference between the values of a phase function $\Psi^0(\bar{x}^0,\bar{y}^0;\lambda,m)$, which in addition to the coordinates $\bar{x}^0,\bar{y}^0$ also depends on the wavelength $\lambda$ and on the diffraction order m. Since this phase function is in any case proportional to $\lambda$ and m, these factors can be split off. Instead of the phase function $\Psi^0(\bar{x}^0,\bar{y}^0;\lambda,m)$, the phase function $\psi^0(\bar{x}^0,\bar{y}^0)$ can be used, where $$\Psi^0(\bar{x}^0,\bar{y}^0;\lambda,m)=m\lambda\cdot\psi^0(\bar{x}^0,\bar{y}^0). \tag{114}$$

FIG. 16 shows grating lines of a diffraction grating 122 on a plane boundary surface 120, and FIG. 17 shows grating lines of a diffraction grating 122 on a curved boundary surface 122.

Except for the simplest case of a constant, equidistant grating on a plane surface, the grating lines extend in a different direction at each point of an optical element in the general case, as is shown in FIG. 16 and FIG. 17, for example. Moreover, their distance is generally different at each point (cf. e.g. FIG. 16). Strict periodicity is not present any more in principle. Consequently, the period vector d cannot be defined any more. Therefore, it is suggested replacing the period vector d by a coordinate-dependent function $d(\bar{x}^0,\bar{y}^0)$ or, put differently, by a vector field $d(\bar{x}^0,\bar{y}^0)$ defined as the tangential vector field with respect to the trajectories 126, which are orthogonal to the grating lines 122a.

In addition, in the general case of a curved base surface 120, as shown in FIG. 17, it has be to taken into account that the grating 122 is specified in global coordinates $\bar{x}^0,\bar{y}^0$ on the one hand, but local properties are relevant for an effect on the ray passage on the other hand, such as the local grating distance the grating 122 has along the tilted axes of a local coordinate system $\bar{x},\bar{y}$.

Instead of $d(\bar{x}^0,\bar{y}^0)$, the effect of the grating 122 can be described by the phase function $\psi(\bar{x}^0,\bar{y}^0)$ in this general case as well.

The phase function of a diffraction grating $\psi^0(\bar{x}^0,\bar{y}^0)$ is more suitable for wavefront tracing than the vector field $d(\bar{x}^0,\bar{y}^0)$, but it cannot be measured directly. In order to perform a wavefront tracing based on the phase function $\psi^0(\bar{x}^0,\bar{y}^0)$, a method for determining the transition between the functions $d(\bar{x}^0,\bar{y}^0)$ and $\psi^0(\bar{x}^0,\bar{y}^0)$ in both directions (i.e. $d(\bar{x}^0,\bar{y}^0)\leftrightarrow\psi^0(\bar{x}^0,\bar{y}^0)$) is proposed. The flow diagram shown in FIG. 18 illustrates the transition between the vector field $d(\bar{x}^0,\bar{y}^0)$ and the phase function $\psi^0(\bar{x}^0,\bar{y}^0)$.

In particular, in a predetermined grating, which can be known e.g. by measuring (cf. block 130 in FIG. 18) the microscope image of a grating projection or by a projection of another measurable property of the grating (e.g. a transmission property), the phase function $\psi^0(\bar{x}^0,\bar{y}^0)$ can be obtained in the global coordinate system (cf. block 132 in FIG. 18) by counting the grating lines and interpreting them as curves $\psi^0(\bar{x}^0,\bar{y}^0)=$const. For the curves, the values $\psi^0(\bar{x}^0,\bar{y}^0)=0$, $\psi^0(\bar{x}^0,\bar{y}^0)=1$, $\psi^0(\bar{x}^0,\bar{y}^0)=2$, etc., are assumed successively (cf. FIG. 18). For all points $(\bar{x}^0,\bar{y}^0)$ not on but between the grating lines, the values of the phase function can be determined by suitable interpolation. Conversely, if the phase function $\psi^0(\bar{x}^0,\bar{y}^0)$ is known, the grating lines can be determined by calculating the curves $\psi^0(\bar{x}^0,\bar{y}^0)=$const. with $\psi^0(\bar{x}^0,\bar{y}^0)=0$, $\psi^0(\bar{x}^0,\bar{y}^0)=1$, $\psi^0(\bar{x}^0,\bar{y}^0)=2$, etc.

After a local coordinate system $(\bar{x},\bar{y},\bar{z})$ has been set, the phase function relevant for local ray tracing is the function $$\psi(\bar{x}^0,\bar{y}^0)=\psi^0(\bar{x}^0(\bar{x},\bar{y}),\bar{y}^0(\bar{x},\bar{y})), \tag{115}$$

(cf. block 134 in FIG. 18), where the connections $\bar{x}^0(\bar{x},\bar{y})$, $\bar{y}^0(\bar{x},\bar{y})$ result from the transformation from the global coordinate system to the local coordinate system (for the respective penetration point). By setting (cf. block 136 in FIG. 18)

$$\Psi(\bar{x},\bar{y};\lambda,m)=m\lambda\cdot\psi(\bar{x},\bar{y}) \tag{116}$$

analogously to equation (114), the local phase function can be obtained taking the diffraction order and the wavelength into account.

Wavefront Tracing in the Case of an Optical Element/System Comprising at Least One Diffraction Grating First-Order Properties (Ray Deviation)

For the tracing of rays described by the vectors N,N' in the local system (cf. equations (112a) and (112b)), the wavefront tracing yields the laws for the ray deviation $$n'\sin\varphi'_x - n\sin\varphi_x = \frac{\partial}{\partial\bar{x}}\Psi(\bar{x},\bar{y};\lambda,m) \tag{117}$$

$$n'\sin\varphi'_y - n\sin\varphi_y = \frac{\partial}{\partial\bar{y}}\Psi(\bar{x},\bar{y};\lambda,m).$$

EXAMPLE 1

In the simplest case of a constant equidistant grating on a plane surface, which corresponds e.g. to FIG. 15, the phase function in the global system is determined by $$\psi^0(\bar{x}^0,\bar{y}^0) = \frac{\bar{x}^0}{\delta_x} + \frac{\bar{y}^0}{\delta_y} + \psi_0 \tag{118}$$

where $\psi_0$ is a constant. Since the base surface is plane, the local system can be selected identically with the global system, so that $\psi(\bar{x},\bar{y})=\psi^0(\bar{x},\bar{y})$. Since in this case it holds that $$\frac{\partial}{\partial\bar{x}}\Psi(\bar{x},\bar{y};\lambda,m) = \frac{m\lambda}{\delta_x} \tag{119}$$

$$\frac{\partial}{\partial\bar{y}}\Psi(\bar{x},\bar{y};\lambda,m) = \frac{m\lambda}{\delta_y}$$

equation (117) leads exactly to the special case of equation (113).

EXAMPLE 2

If, for an arbitrary grating, the local system $\bar{x},\bar{y},\bar{z}$ is selected at the penetration point such that the incident ray is in the $\bar{y}$-$\bar{z}$ plane, then $\phi_x=0$. If the phase function in this local system is determined by $\Psi(\bar{x},\bar{y};\lambda,m)$, then the laws for ray deviation according to equation (117) will read $$n'\sin\varphi'_x = \frac{\partial}{\partial\bar{x}}\Psi(\bar{x},\bar{y};\lambda,m) \tag{120}$$

$$n'\sin\varphi'_y - n\sin\varphi_y = \frac{\partial}{\partial\bar{y}}\Psi(\bar{x},\bar{y};\lambda,m).$$

If $\partial\Psi(\bar{x},\bar{y};\lambda,m)/\partial\bar{x}\neq0$, then $\phi'_x\neq0$. This means that—if the grating lines are not perpendicular to the plane of incidence—a ray deviation to the side will take place and the plane of emergence will not coincide with the plane of incidence (other than in the case of a mere refraction). If, conversely, $\partial\Psi(\bar{x},\bar{y};\lambda,m)/\partial\bar{x}=0$, then $\phi'_x=0$ and the ray deviation will take place only in the $\bar{y}$-$\bar{z}$ plane.

Second-Order Properties (Curvature Properties of the Wavefront)

In order to describe wavefront properties, it is suggested that the ray tracing of a main ray passing through an evaluation point of the optical element be performed first. Thus, the main ray differs from possible neighboring rays that pass off the evaluation point. In the exemplary case of a spectacle lens, a main ray is particularly a light ray that, starting from the object point, passes through the center of the entrance pupil. Upon eye movements, the entrance pupil coincides with the ocular center of rotation, and not necessarily with the physical pupil of the eye. The angles $\phi_x$, $\phi_y$, $\phi'_x$, $\phi'_y$, and thus the vectors N,N' in equations (112a) and (112b) are known after this step.

In addition, it is suggested that except for a local coordinate system, which serves to describe the base surface and in which also the incident and the outgoing rays are described, yet further coordinate systems be introduced as well.

The coordinate system (x,y,z) serves to describe the incident wavefront and is directed such that the z axis is directed in the direction of light along the incident ray direction N and that the origin (x,y,z)=(0,0,0) coincides with the point $(\bar{x},\bar{y},\bar{z})$=(0,0,0).

The coordinate system (x',y',z') serves to describe the outgoing wavefront and is directed such that the z' axis is directed in the direction of light along the outgoing ray direction N' and that the origin (x', y', z')=(0,0,0) also coincides with the point $(\bar{x},\bar{y},\bar{z})$=(0,0,0).

The coordinates of a spatial vector can be described either by the variable $v=(v_x,v_y,v_z)$ in the coordinate system (x,y,z), by the variable $v'=(v'_x,v'_y,v'_z)$ in the coordinate system (x',y', z'), or by the variable $\bar{v}=(\bar{v}_x,\bar{v}_y,\bar{v}_z)$ in the coordinate system $(\bar{x},\bar{y},\bar{z})$. The mutual position of the coordinate systems depends on the rays and is only set except for the degrees of freedom, which corresponds to a rotation of the system (x,y,z) about the incident ray and to a second independent rotation of the system (x',y',z') about the outgoing ray.

Preferably, the mutual position of the coordinate systems is set by $$v = R \cdot \bar{v} \quad v' = R' \cdot \bar{v}$$

$$R = R_z(\chi) R_x(\phi) R_z(-\chi) \quad R' = R_z(\chi') R_x(\phi') R_z(-\chi') \tag{121}$$

where $$R_x(\varepsilon) = \begin{pmatrix} 1 & 0 & 0 \\ 0 & \cos\varepsilon & -\sin\varepsilon \\ 0 & \sin\varepsilon & \cos\varepsilon \end{pmatrix}, \tag{122}$$

$$R_y(\varepsilon) = \begin{pmatrix} \cos\varepsilon & 0 & \sin\varepsilon \\ 0 & 1 & 0 \\ -\sin\varepsilon & 0 & \cos\varepsilon \end{pmatrix},$$

$$R_z(\varepsilon) = \begin{pmatrix} \cos\varepsilon & -\sin\varepsilon & 0 \\ \sin\varepsilon & \cos\varepsilon & 0 \\ 0 & 0 & 1 \end{pmatrix}.$$

The auxiliary angles $\phi$, $\phi'$, $\chi$, $\chi'$ in equation (121) must be expressed by the variables $\phi_x$, $\phi_y$, $\phi'_x$, $\phi'_y$, known before the wavefront tracing. The matrices R, R' are constructed such that $\phi$, $\phi'$ are the angles of incidence and emergence with respect to the surface normal, and it holds that $$\cos\phi = \sqrt{1 - \sin^2\varphi_x - \sin^2\varphi_y} \quad \cos\phi' = \sqrt{1 - \sin^2\varphi'_x - \sin^2\varphi'_y} \tag{123}$$

$$\sin\phi = \sqrt{\sin^2\varphi_x + \sin^2\varphi_y} \quad \sin\phi' = \sqrt{\sin^2\varphi'_x + \sin^2\varphi'_y}$$

and $$\sin\chi = \frac{-\sin\varphi_x}{\sqrt{\sin^2\varphi_x + \sin^2\varphi_y}} \quad \sin\chi' = \frac{-\sin\varphi'_x}{\sqrt{\sin^2\varphi'_x + \sin^2\varphi'_y}} \tag{124}$$

$$\cos\chi = \frac{\sin\varphi_y}{\sqrt{\sin^2\varphi_x + \sin^2\varphi_y}} \quad \cos\chi' = \frac{\sin\varphi'_y}{\sqrt{\sin^2\varphi'_x + \sin^2\varphi'_y}}.$$

From the above equations (123) and (124), it follows that $$\tan\chi = -\frac{\sin\varphi_x}{\sin\varphi_y}, \quad \tan\chi' = -\frac{\sin\varphi'_x}{\sin\varphi'_y}. \tag{126}$$

If the incident wavefront in the local coordinate system (x,y,z) is determined by $W_{In}(x,y)$, the refractive base surface in the system $(\bar{x},\bar{y},\bar{z})$ will be determined by $\bar{S}(\bar{x},\bar{y})$, and the sought-for outgoing wavefront in the system (x',y',z') is determined by $W'_{Out}(x',y')$ then the following formulae (127) and (128) will describe the dependence of the second local derivatives of the wavefronts (i.e. the incident and outgoing wavefronts), of the base surface, and of the phase $\Psi(\bar{x},\bar{y};\lambda,m)$.

$$n' R_2(\chi') C'_2 R_2(-\chi') \begin{pmatrix} W'^{(2,0)}_{Out}(0,0) \\ W'^{(1,1)}_{Out}(0,0) \\ W'^{(0,2)}_{Out}(0,0) \end{pmatrix} - \tag{127}$$

$$n R_2(\chi) C_2 R_2(-\chi) \begin{pmatrix} W^{(2,0)}_{In}(0,0) \\ W^{(1,1)}_{In}(0,0) \\ W^{(0,2)}_{In}(0,0) \end{pmatrix} =$$

$$v \begin{pmatrix} \bar{S}^{(2,0)}(0,0) \\ \bar{S}^{(1,1)}(0,0) \\ \bar{S}^{(0,2)}(0,0) \end{pmatrix} - \begin{pmatrix} \Psi^{(2,0)}(0,0) \\ \Psi^{(1,1)}(0,0) \\ \Psi^{(0,2)}(0,0) \end{pmatrix},$$

where $$v = n'\cos\varphi' - n\cos\varphi \tag{128}$$

$$= n'\sqrt{1 - \sin^2\varphi'_x - \sin^2\varphi'_y} - n\sqrt{1 - \sin^2\varphi_x - \sin^2\varphi_y}$$

is satisfied. The phase $\Psi(\bar{x},\bar{y};\lambda,m)$ is the phase defined in equation (116).

The individual terms of equation (127) correspond to the terms of the BAD equation $B-A=D+PK^{(2)}$.

In equation (127), the superscript symbols represent derivatives. It holds for an arbitrary function h(x,y) that:

$$h^{(k-m,m)}(0,0) := \partial^k / \partial x^{k-m} \partial y^m h(x,y)|_{x=0,y=0}. \tag{129}$$

The function h(x,y) in the formula (129) optionally plays the role of the functions $W_{In}(x,y)$, $W'_{Out}(x',y')$, $\bar{S}(x,y)$ and $\Psi(x,y;\lambda,m)$, wherein in the case of $\Psi(\bar{x},\bar{y};\lambda,m)$, the derivatives refer to $\bar{x},\bar{y}$. The matrices $C_2$ and $C'_2$ are defined as in the purely refractive case (cf. e.g. G. Esser, W. Becken, W. Müller, P. Baumbach, J. Arasa and D. Uttenweiler, "*Derivation of the refraction equations for higher-order aberrations of local wavefronts at oblique incidence*", J. Opt. Soc. Am. A/Vol. 27, No. 2/February 2010):

$$C_2 = \begin{pmatrix} 1 & 0 & 0 \\ 0 & \cos\varphi & 0 \\ 0 & 0 & \cos^2\varphi \end{pmatrix}, \quad (130)$$

-continued
$$C'_2 = \begin{pmatrix} 1 & 0 & 0 \\ 0 & \cos\varphi' & 0 \\ 0 & 0 & \cos^2\varphi' \end{pmatrix}.$$

In addition, the matrix $R_2(\chi)$ is taken into account in equation (127), which describes the rotation of the wavefront. If, generally, a wavefront is determined by the function w(x,y), it will be described in rotated coordinates $$\begin{pmatrix} \tilde{x} \\ \tilde{y} \end{pmatrix} = Rot(\alpha) \begin{pmatrix} x \\ y \end{pmatrix} \text{ with} \quad (132)$$

$$Rot(\alpha) = \begin{pmatrix} \cos\alpha & -\sin\alpha \\ \sin\alpha & \cos\alpha \end{pmatrix}$$

by the transformed function $$\tilde{w}(\tilde{x},\tilde{y}) = w(x(\tilde{x},\tilde{y}), y(\tilde{x},\tilde{y})) \quad (133)$$

The $k^{th}$-order derivative $$\frac{\partial^k}{\partial \tilde{x}^m \partial \tilde{y}^{k-m}} \tilde{w}(\tilde{x}, \tilde{y})$$

with respect to the rotated coordinates can be expressed as a linear combination of the derivatives $$\frac{\partial^k}{\partial x^l \partial y^{k-l}} w(x, y)$$

with respect to the original coordinates. The $(k+1) \times (k+1)$ matrix $R_k(\chi)$ describes the transition between the $k^{th}$-order derivative in the coordinate system (x,y) and the $k^{th}$ order derivative in the coordinate system $(\tilde{x},\tilde{y})$.

$$\frac{\partial^k}{\partial \tilde{x}^m \partial \tilde{y}^{k-m}} \tilde{w}(\tilde{x}, \tilde{y}) = \sum_{l=0}^{k} (R_k(\chi))_{(m+1),(l+1)} \frac{\partial^k}{\partial x^l \partial y^{k-l}} w(x, y), \quad (134)$$

$$m = 0, \ldots, k, \; l = 0, \ldots, k$$

It explicitly holds for the first three orders that $$R_1(\alpha) = \begin{pmatrix} \cos\alpha & -\sin\alpha \\ \sin\alpha & \cos\alpha \end{pmatrix} = Rot(\alpha) \quad (135)$$

$$R_2(\alpha) = \begin{pmatrix} \cos^2\alpha & -2\cos\alpha\sin\alpha & \sin^2\alpha \\ \cos\alpha\sin\alpha & \cos^2\alpha - \sin^2\alpha & -\cos\alpha\sin\alpha \\ \sin^2\alpha & 2\cos\alpha\sin\alpha & \cos^2\alpha \end{pmatrix}$$

$$R_3(\alpha) = \begin{pmatrix} \cos^3\alpha & -3\cos^2\alpha\sin\alpha & 3\cos\alpha\sin^2\alpha & -\sin^3\alpha \\ \cos^2\alpha\sin\alpha & \cos^3\alpha - 2\cos\alpha\sin^2\alpha & \sin^3\alpha - 2\cos^2\alpha\sin\alpha & \cos\alpha\sin^2\alpha \\ \cos\alpha\sin^2\alpha & -(\sin^3\alpha - 2\cos^2\alpha\sin\alpha) & \cos^3\alpha - 2\cos\alpha\sin^2\alpha & -\cos^2\alpha\sin\alpha \\ \sin^3\alpha & 3\cos\alpha\sin^2\alpha & 3\cos^2\alpha\sin\alpha & \cos^3\alpha \end{pmatrix}$$

$$R_4(\alpha) = \ldots$$

In the following, some special cases of optical systems, in particular spectacle lenses with POE, will be discussed. In the case of a perpendicular incidence of light, it holds that:

$v = n' - n;$ $R_1 = 1;$ $C_2 = 1;$ $C'_2 = 1.$

It yields for equation (127):

$$n' \begin{pmatrix} W'^{(2,0)}_{Out}(0,0) \\ W'^{(1,1)}_{Out}(0,0) \\ W'^{(0,2)}_{Out}(0,0) \end{pmatrix} - n \begin{pmatrix} W^{(2,0)}_{In}(0,0) \\ W^{(1,1)}_{In}(0,0) \\ W^{(0,2)}_{In}(0,0) \end{pmatrix} = \quad (127a)$$

$$(n'-n) \begin{pmatrix} \overline{S}^{(2,0)}(0,0) \\ \overline{S}^{(1,1)}(0,0) \\ \overline{S}^{(0,2)}(0,0) \end{pmatrix} - \begin{pmatrix} \Psi^{(2,0)}(0,0) \\ \Psi^{(1,1)}(0,0) \\ \Psi^{(0,2)}(0,0) \end{pmatrix}$$

With a one-dimensional problem (meridional plane), instead of mixed derivatives with respect to $\overline{x},\overline{y}$, only derivatives with respect to one coordinate (e.g. $\overline{y}$) occur. Moreover, it holds that $R_2 = R_2 = 1;$ $C_2 = C_2 = \cos^2\phi;$ $C'_2 = C'_2 = \cos^2\phi'.$ Consequently, equation (127) can be written as $n'\cos^2\phi' W'^{(2)}_{Out}(0) - n\cos^2\phi W^{(2)}_{In}(0) = v\overline{S}^{(2)}(0) - \Psi^{(2)}(0)$ \quad (127b)

With a perpendicular incidence of light and a one-dimensional problem, instead of mixed derivatives with respect to $\overline{x}$, $\overline{y}$, only derivatives with respect to one coordinate (e.g. $\overline{y}$) occur. Moreover, it holds that $\nu = n' - n$ $R_2 = R_2 = 1$ $C_2 = C_2 = 1$ $C'_2 = C'_2 = 1$ Consequently, equation (127) can be written as $$n'W'_{Out}(0) - nW_{In}^{(2)}(0) = (n'-n)\overline{S}^{(2)}(0) - \Psi^{(2)}(0) \quad (127c)$$

Higher-Order Properties of the Wavefront ($3^{rd}$, $4^{th}$, ... -Order Properties)

By analogy with equation (127), it holds for $3^{rd}$-order derivatives that $$n'R_3(\chi')C'_3R_3(-\chi')\begin{pmatrix} W'^{(3,0)}_{Out}(0,0) \\ W'^{(2,1)}_{Out}(0,0) \\ W'^{(1,2)}_{Out}(0,0) \\ W'^{(0,3)}_{Out}(0,0) \end{pmatrix} - \quad (136)$$

$$nR_3(\chi)C_3R_3(-\chi)\begin{pmatrix} W^{(3,0)}_{In}(0,0) \\ W^{(2,1)}_{In}(0,0) \\ W^{(1,2)}_{In}(0,0) \\ W^{(0,3)}_{In}(0,0) \end{pmatrix} = =$$

$$\nu\begin{pmatrix} \overline{S}^{(3,0)}(0,0) \\ \overline{S}^{(2,1)}(0,0) \\ \overline{S}^{(1,2)}(0,0) \\ \overline{S}^{(0,3)}(0,0) \end{pmatrix} - \begin{pmatrix} \Psi^{(3,0)}(0,0) \\ \Psi^{(2,1)}(0,0) \\ \Psi^{(1,2)}(0,0) \\ \Psi^{(0,3)}(0,0) \end{pmatrix} + Q_3(S^{(2)}, F^{(2)})$$

wherein analogously to equation (130), it holds that:

$$C_3 = \begin{pmatrix} 1 & 0 & 0 & 0 \\ 0 & \cos\varphi & 0 & 0 \\ 0 & 0 & \cos^2\varphi & 0 \\ 0 & 0 & 0 & \cos^3\varphi \end{pmatrix}, \quad (137)$$

$$C'_3 = \begin{pmatrix} 1 & 0 & 0 & 0 \\ 0 & \cos\varphi' & 0 & 0 \\ 0 & 0 & \cos^2\varphi' & 0 \\ 0 & 0 & 0 & \cos^3\varphi' \end{pmatrix}.$$

Equations for even higher orders k=4, 5, . . . can be formed analogously.

With the above-described procedure, it is possible to describe an optical system (e.g. a spectacle lens) with at least one diffraction grating in an exact manner. In particular, it is possible to describe the second and higher-order properties of the wavefront exiting the optical system in an exact manner. On the basis of the second and higher-order properties of the wavefront, the aberrations of the optical element (e.g. of the spectacle lens) can be determined in a manner per se known. In this respect, special reference is made to document WO 2008/089999 A1, to the article by W. Becken et al. "Brillengläser im Sport: Optimierung der Abbildungseigenschaften unter physiologischen Aspekten", Z. Med. Phys., 17 (2007), pages 56-66, or to the article by G. Esser "Derivation of the refraction equations for higher-order aberrations of local wavefronts at oblique incidence", JOSA A, vol. 27, no. 2, February 2010, pages 218-237. These documents are explicitly referred to with regard to the technical terminology used as well as the symbols used in equations (121) to (137) and the connection of sphere, cylinder, axis (SZA values) to wavefront properties. Thus, the corresponding explanations constitute an integral part of disclosure of the present application.

The base grating of each base lens can be calculated and optimized taking the second- and/or optionally higher-order image formation properties into consideration. As described above, the second- and/or optionally higher-order image formation properties can be calculated exactly by means of the above-described wavefront tracing. Alternatively, instead of optimizing the base grating and at least one refractive surface, the grating can be calculated only generally depending on the prescription power of the spectacle lens or on a target power determined depending on the prescription power. As explained above, a thus calculated base grating is suitable for at least partly correcting the color fringe for a range of powers also for non-rotationally symmetric spectacle lenses.

REFERENCE NUMERAL LIST 10 incident wavefront
12 boundary surface
14 periodic structure (diffraction grating)
16 outgoing wavefront
20 prism
30 correction ranges
32 separation line of the correction ranges
100 optical element/system (e.g. spectacle lens)
102 incident ray
104,106 refractive boundary surfaces
108 outgoing ray
108-m outgoing ray of the $m^{th}$ diffraction order
110 incident wavefront
112 outgoing wavefront
122 diffraction grating
114 optical material
116 passage through the optical material
122a grating lines
112b projected grating lines
124 plane of incidence
126 orthogonal trajectories
130-134 steps of the transition between a period function and a phase function

The invention claimed is:

1. A method for producing a series of base lenses, which cover a predetermined power range, wherein the base lenses are lens blanks, each base lens of the series has a base power, which is different from the base powers of the other base lenses of the series, and each base lens of the series has at least one diffractive base grating, the method comprising:
assigning one correction range to each of the base lenses;
specifying the base powers of each base lens of the series, wherein the base powers are specified such that the correction ranges of the individual base lenses cover the predetermined power range; and
calculating the base grating of each base lens of the series so as to minimize the color fringe in a predetermined region of a spectacle lens manufactured from the base lens and having the specified base power,
wherein
the base grating of the base lens in the respective correction range corrects the color fringe of a spectacle lens with a power within the correction range assigned to the base lens such that the color fringe of the spectacle lens within a predetermined region of the spectacle lens is smaller than or equal to a predetermined threshold, and the predetermined region of the spectacle lens within which the maximum color fringe is smaller than or equal to the predetermined threshold has a diameter of at least 40 mm, and the predetermined threshold is 0.5 cm/m.

2. The method according to claim 1, wherein the base lenses are spherocylindrical or spherical single-vision lenses.

3. The method according to claim 1, wherein calculating the base grating comprises simultaneously optimizing at least one of the refractive surfaces of the base lens and of the base grating.

4. The method according to claim 1, wherein the grating lines of the respective base grating are elliptical.

5. The method according to claim 1, wherein the grating lines of the respective base grating are rotationally symmetric.

6. The method according to claim 5, wherein the distance of the grating lines of each of the base gratings is calculated as a function of the radial distance d(r) from the optical or geometric center according to the formula $$d(r) = \frac{m(\lambda_F - \lambda_C)v_d}{S_{ref,0}(\lambda_d)} \cdot \frac{1}{r}$$

where
$S_{ref,0}(\lambda_d)$ is the refractive portion of the dioptric power of the base lens at a wavelength $\lambda_d$;
$v_d$ is the Abbe number of the base lenses;
$\lambda_F$ is the F-Fraunhofer line, which is taken into account in the definition of the Abbe number;
$\lambda_C$ is the C-Fraunhofer line, which is taken into account in the definition of the Abbe number; and
m is a predetermined diffraction order.

7. The method according to claim 1, wherein specifying the base powers is performed such that the condition $$|\Delta M_{0G}| \leq 2v_d \frac{FS_T}{r_T} - cyl_{max}$$

or the condition $$|\Delta M_{0G}| \leq 2v_d \frac{FS_T}{r_T}$$

applies to the maximum distance $|\Delta M_{0G}|$ of the spherical equivalents of the base lenses of the series, where
$v_d$ is the Abbe number of the base lenses;
$FS_T$ is a predetermined threshold;
$2 \cdot r_T$ is the diameter of a predetermined region of the respective base lens in which the maximally admissible color fringe is smaller than or equal to the threshold $FS_T$; and
$cyl_{max}$ is the maximally existing astigmatism in the power range to be covered.

8. The method according to claim 1, wherein the power range to be covered comprises at least one of spherical powers of −12 dpt to +12 dpt and cylindrical powers of up to 4 dpt.

9. A device for producing a series of base lenses that cover a predetermined power range, wherein the base lenses are lens blanks, each base lens of the series has a base power, which is different from the base powers of the other base lenses of the series, and each base lens of the series has at least one diffractive base grating, comprising:

base grating calculator adapted to calculate the base grating of each of the spectacle lenses of the series, wherein calculating comprises assigning one correction range to each of the base lenses and specifying the base powers of each base lens of the series, wherein the base powers are specified such that the correction ranges of the individual base lenses cover the predetermined power range; and is performed so as to minimize the color fringe in a predetermined region of a spectacle lens manufactured from the base lens and having the specified base power, wherein the base grating of the base lens in the respective correction range corrects the color fringe of a spectacle lens with a power within the correction range assigned to the base lens such that the color fringe of the spectacle lens within a predetermined region of the spectacle lens is smaller than or equal to a predetermined threshold, and the predetermined region of the spectacle lens within which the maximum color fringe is smaller than or equal to the predetermined threshold has a diameter of at least 40 mm; and the predetermined threshold is 0.5 cm/m.

10. A series of base lenses comprising at least two base lenses, wherein each base lens of the series is a lens blank and comprises:

each base lens of the series is configured for a base power different from the base powers of the other base lenses of the series, and each base lens of the series has at least one diffractive base grating adapted such that the maximum color fringe within a predetermined region of a spectacle lens manufactured from the base lens having the specified base power with a diameter of at least 40 mm is equal to or smaller than a predetermined threshold of 0.5 cm/m, wherein:

each of the base lenses of the series is assigned a correction range such that the base grating of the base lens in the respective correction range corrects the color fringe of a spectacle lens with a power within the correction range assigned to the base lens such that the color fringe of the spectacle lens within the predetermined region of the spectacle lens is smaller than or equal to the predetermined threshold, and the power distance of the base lenses of the series is such that the correction ranges of the individual base lenses cover a predetermined power range.

11. The series of base lenses according to claim 10, wherein the maximum color fringe within the predetermined region of the spectacle lens is smaller than or equal to 0.4 cm/m.

12. The series of base lenses according to claim 10, wherein the predetermined power range comprises at least one of spherical powers from −12 dpt to +12 dpt and cylindrical powers of up to 4 dpt.

13. The series of base lenses according to claim 10, wherein the number of base lenses is between 5 and 20.

14. The series of base lenses according to claim 10, wherein the base lenses are single-vision lenses, multifocal lenses, or progressive lenses.

15. The series of base lenses according to claim 10, wherein the base grating is applied to at least one of the front surface and to the back surface of each of the base lenses, or wherein the base grating is applied to at least one boundary surface in the interior of the compound system comprising a main lens and a cover lens.

16. The series of base lenses according to claim 10, wherein the at least one diffractive base grating is a diffraction grating with elliptically extending grating lines.

17. The series of base lenses according to claim 10, wherein the at least one diffractive base grating is a diffraction grating with rotationally symmetrically extending grating lines.

18. The series of base lenses according to claim 17, wherein it holds for the distance of the grating lines of each of the base gratings as a function of the radial distance d(r) from the optical or geometric center of the respective base lens that:

$$d(r) = \frac{m(\lambda_F - \lambda_C)v_d}{S_{ref,0}(\lambda_d)} \cdot \frac{1}{r},$$

where $S_{ref,0}(\lambda_d)$ is the refractive portion of the dioptric power of the base lens at a wavelength $\lambda_d$;
$v_d$ is the Abbe number of the base lenses;
$\lambda_F$ is the F-Fraunhofer line, which is taken into account in the definition of the Abbe number;
$\lambda_C$ is the C-Fraunhofer line, which is taken into account in the definition of the Abbe number; and
m, m=±1, ±2, . . . is the diffraction order.

19. The series of base lenses according to claim 10, wherein the maximally existing distance $|\Delta M_{0G}|$ of the spherical equivalents of the base lenses of the series satisfies the condition $$|\Delta M_{0G}| \le 2v_d \frac{FS_T}{r_T} - cyl_{max} \text{ or } |M\Delta_{0G}| \le 2v_d \frac{FS_T}{r_T},$$

where $v_d$ is the Abbe number of the base lenses;
$FS_T$ is the predetermined threshold;
$2 \cdot r_T$ is the diameter of the predetermined region;
$cyl_{max}$ is the maximally existing astigmatism.

20. The series of base lenses according to claim 10, wherein the grating structures of the individual base gratings are realized by switchable structures.

21. A method for producing a spectacle lens, comprises:
obtaining prescription data of a spectacles wearer, wherein the prescription data comprises at least one spherical prescription power;
determining the target power of the spectacle lens in at least one predetermined reference point of the spectacle lens depending on the obtained prescription data;
selecting a base lens from the series of base lenses with the features according to claim 12 depending on the obtained prescription data or on the target power of the spectacle lens; and
machining the base lens such that the power of the finished spectacle lens in the at least one reference point is substantially equal to the previously determined target power in said reference point.

22. A device for producing a spectacle lens, comprising:
obtaining means for obtaining prescription data of a spectacles wearer, wherein the prescription data comprises at least one spherical prescription power;
target power calculating means for determining the target power of the spectacle lens in at least one predetermined reference point of the spectacle lens depending on the obtained prescription data;
selecting means for selecting a base lens from the series of base lenses with the features according to claim 10 depending on the obtained prescription data or on the target power of the spectacle lens; and
machining means for machining the base lens such that the power of the finished spectacle lens in the at least one reference point is substantially equal to the previously determined target power in said reference point.

23. A series of spectacle lenses with different powers, which cover a power range of at least −12 dpt to +12 dpt of the spherical power, wherein each spectacle lens of the series is a lens blank and has at least one diffraction grating, and wherein the number of the different gratings of all spectacle lenses of the series is smaller than the number of spectacle lenses, and
wherein the maximum color fringe of each of the spectacle lenses of the series within a predetermined region with a diameter of at least 40 mm is equal to or smaller than a predetermined threshold of 0.5 cm/m.

24. The series of spectacle lenses according to claim 23, wherein the predetermined power range further comprises cylindrical powers of up to 4 dpt.

25. The series of spectacle lenses according to claim 23, wherein the number of different gratings is between 5 and 20.

26. The series of spectacle lenses according to claim 23, wherein the spectacle lenses are single-vision lenses, multifocal lenses, or progressive lenses.

27. The series of spectacle lenses according to claim 23, wherein the at least one diffraction grating of each spectacle lens of the series is a diffraction grating with elliptically or rotationally symmetrically extending grating lines.

28. The series of spectacle lenses according to claim 23, wherein the grating structures of the individual base lenses are realized by switchable structures.

29. The method according to claim 1, at least one of wherein the predetermined region of the spectacle lens within which the maximum color fringe is smaller than or equal to the predetermined threshold has a diameter of at least 40 mm, and wherein the predetermined threshold is 0.4 cm/m.

30. The method according to claim 1, at least one of wherein the predetermined region of the spectacle lens within which the maximum color fringe is smaller than or equal to the predetermined threshold has a diameter of at least 40 mm, and wherein the predetermined threshold is 0.12 cm/m.

31. The method according to claim 1, wherein the power range to be covered comprises at least one of spherical powers of −12 dpt to +12 dpt and cylindrical powers of up to 6 dpt.

32. The series of base lenses according to claim 10, wherein the maximum color fringe within the predetermined region of the spectacle lens is smaller than or equal 0.12 cm/m.

33. The series of base lenses according to claim 10, wherein the predetermined power range comprises at least one of spherical powers from −12 dpt to +12 dpt and cylindrical powers of up to 6 dpt.

34. The series of spectacle lenses according to claim 23, wherein the predetermined power range further comprises cylindrical powers of up to 6 dpt.

* * * * *